(12) United States Patent
Andreoli-Fang et al.

(10) Patent No.: US 12,262,250 B2
(45) Date of Patent: *Mar. 25, 2025

(54) SYSTEMS AND METHODS FOR LATENCY REDUCTION

(71) Applicant: Cable Television Laboratories, Inc., Louisville, CO (US)

(72) Inventors: Jennifer Andreoli-Fang, Boulder, CO (US); Bernard McKibben, Golden, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,068

(22) Filed: Jul. 4, 2023

(65) Prior Publication Data

US 2023/0354102 A1 Nov. 2, 2023

Related U.S. Application Data

(63) Continuation of application No. 17/740,049, filed on May 9, 2022, now Pat. No. 11,696,183, which is a (Continued)

(51) Int. Cl.
*H04W 4/00* (2018.01)
*H04W 28/02* (2009.01)
(Continued)

(52) U.S. Cl.
CPC ....... *H04W 28/20* (2013.01); *H04W 28/0268* (2013.01); *H04W 28/0278* (2013.01);
(Continued)

(58) Field of Classification Search
CPC ............ H04W 28/02; H04W 28/0268; H04W 28/0278; H04W 72/1268; H04W 72/542;
(Continued)

(56) References Cited

U.S. PATENT DOCUMENTS 6,157,614 A 12/2000 Pasternak et al.
6,807,193 B1 10/2004 Beser
(Continued)

OTHER PUBLICATIONS

International Search Report in PCT/US17/21918, mailed Aug. 16, 2017.

*Primary Examiner* — Phuongchau Ba Nguyen
(74) *Attorney, Agent, or Firm* — PdZ Patent Law, PLLC

(57) ABSTRACT

Systems and methods presented herein provide for reducing latency in wireless service through a communication link comprising a Modem Termination System (MTS) and a modem. The communication link is coupled with a virtualized wireless link. In one embodiment, a method includes transferring a buffer status report (BSR) from a user equipment (UE) through the communication link to a control portion of the virtualized wireless link, generating a wireless grant to allow the data of the UE through virtualized wireless link, and generating a backhaul grant for the UE to transfer data through the communication link based on the wireless grant information.

20 Claims, 32 Drawing Sheets

Related U.S. Application Data continuation of application No. 16/126,889, filed on Sep. 10, 2018, now Pat. No. 11,330,476, which is a continuation of application No. PCT/US2017/021918, filed on Mar. 10, 2017, which is a continuation of application No. 15/454,668, filed on Mar. 9, 2017, now Pat. No. 11,064,393, and a continuation of application No. 15/453,146, filed on Mar. 8, 2017, now Pat. No. 10,237,786, and a continuation of application No. 15/447,419, filed on Mar. 2, 2017, now Pat. No. 10,321,351, and a continuation of application No. 15/236,147, filed on Aug. 12, 2016, now Pat. No. 10,492,104.

(60) Provisional application No. 62/357,770, filed on Jul. 1, 2016, provisional application No. 62/353,755, filed on Jun. 23, 2016, provisional application No. 62/345,634, filed on Jun. 3, 2016, provisional application No. 62/339,463, filed on May 20, 2016, provisional application No. 62/306,360, filed on Mar. 10, 2016.

(51) Int. Cl.
| | |
|---|---|
| *H04W 28/20* | (2009.01) |
| *H04W 72/1268* | (2023.01) |
| *H04W 72/542* | (2023.01) |
| *H04W 72/56* | (2023.01) |
| *H04W 76/14* | (2018.01) |
| *H04W 28/24* | (2009.01) |
| *H04W 84/04* | (2009.01) |
| *H04W 84/12* | (2009.01) |

(52) U.S. Cl.
CPC ..... *H04W 72/1268* (2013.01); *H04W 72/542* (2023.01); *H04W 72/56* (2023.01); *H04W 76/14* (2018.02); *H04W 28/24* (2013.01); *H04W 84/042* (2013.01); *H04W 84/12* (2013.01)

(58) Field of Classification Search
CPC ..... H04W 72/56; H04W 76/14; H04W 28/24; H04W 84/042; H04W 84/12; H04W 28/18; H04W 72/23; H04W 28/04; H04W 72/04; H04W 72/042; H04W 88/08; H04W 28/08; H04W 28/084; H04W 36/22; H04W 72/12; H04L 5/0007
See application file for complete search history.

(56) References Cited

U.S. PATENT DOCUMENTS

| | | | |
|---|---|---|---|
| 7,899,451 | B2 | 3/2011 | Hu et al. |
| 8,867,490 | B1 | 10/2014 | Krishna et al. |
| 8,897,312 | B2 | 11/2014 | Pesola |
| 8,929,319 | B2 | 1/2015 | Anderson et al. |
| 9,754,454 | B2 | 9/2017 | Onorato et al. |
| 10,237,786 | B2 * | 3/2019 | Andreoli-Fang ..... H04W 72/56 |
| 10,321,351 | B2 * | 6/2019 | Andreoli-Fang ..... H04W 72/23 |
| 10,420,085 | B2 | 9/2019 | Andreoli-Fang |
| 11,064,393 | B2 | 7/2021 | Andreoli-Fang et al. |
| 11,330,476 | B2 * | 5/2022 | Andreoli-Fang ..... H04W 28/20 |
| 2005/0159162 | A1 | 7/2005 | Park |
| 2008/0020797 | A1 | 1/2008 | Denney et al. |
| 2008/0260389 | A1 | 10/2008 | Zheng |
| 2009/0109922 | A1 | 4/2009 | Livanos |
| 2009/0156213 | A1 | 6/2009 | Spinelli et al. |
| 2009/0304055 | A1 | 12/2009 | Nino et al. |
| 2010/0118752 | A1 | 5/2010 | Suzuki et al. |
| 2010/0172368 | A1 | 7/2010 | Eng |
| 2010/0284314 | A1 | 11/2010 | Pelletier et al. |
| 2012/0287784 | A1 | 11/2012 | Shatzkamer et al. |
| 2012/0321312 | A1 | 12/2012 | Timm et al. |
| 2013/0010686 | A1 | 1/2013 | Shatzkamer et al. |
| 2013/0142157 | A1 | 6/2013 | Pesola |
| 2013/0242726 | A1 | 9/2013 | Zhu et al. |
| 2013/0286988 | A1 | 10/2013 | Zhang |
| 2013/0287784 | A1 | 10/2013 | Brouxhon et al. |
| 2014/0056130 | A1 | 2/2014 | Grayson et al. |
| 2014/0269293 | A1 | 9/2014 | Patrick et al. |
| 2014/0321318 | A1 | 10/2014 | Persson et al. |
| 2014/0328190 | A1 | 11/2014 | Lord et al. |
| 2015/0358838 | A1 | 12/2015 | Wei et al. |
| 2016/0142934 | A1 | 5/2016 | Ahmadzadeh et al. |
| 2016/0262169 | A1 | 9/2016 | Das et al. |
| 2016/0315675 | A1 * | 10/2016 | Seok ..................... H04L 1/1854 |
| 2016/0330715 | A1 * | 11/2016 | Chen ..................... H04W 72/04 |
| 2017/0244539 | A1 | 8/2017 | Hanna et al. |
| 2017/0265106 | A1 | 9/2017 | Andreoli-Fang et al. |
| 2017/0265216 | A1 | 9/2017 | Andreoli-Fang et al. |
| 2017/0280467 | A1 | 9/2017 | Zhu et al. |
| 2017/0330408 | A1 | 11/2017 | Onorato et al. |
| 2018/0069618 | A1 | 3/2018 | Loehr et al. |
| 2018/0255557 | A1 | 9/2018 | Andreoli-Fang |
| 2018/0270103 | A1 | 9/2018 | Chapman et al. |
| 2018/0279359 | A1 | 9/2018 | Liu et al. |
| 2019/0297522 | A1 | 9/2019 | Andreoli-Fang |
| 2019/0297535 | A1 * | 9/2019 | Andreoli-Fang ............ H04W 28/0268 |
| 2022/0124535 | A1 * | 4/2022 | Manolakos ........... H04W 64/00 |

\* cited by examiner

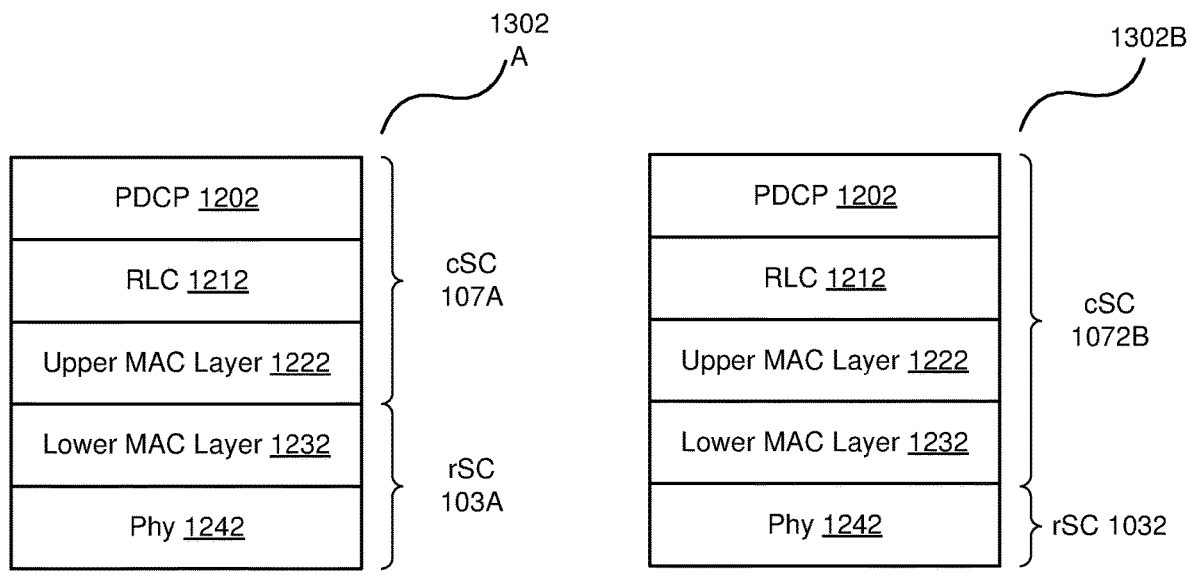
FIG. 11A  FIG. 11B
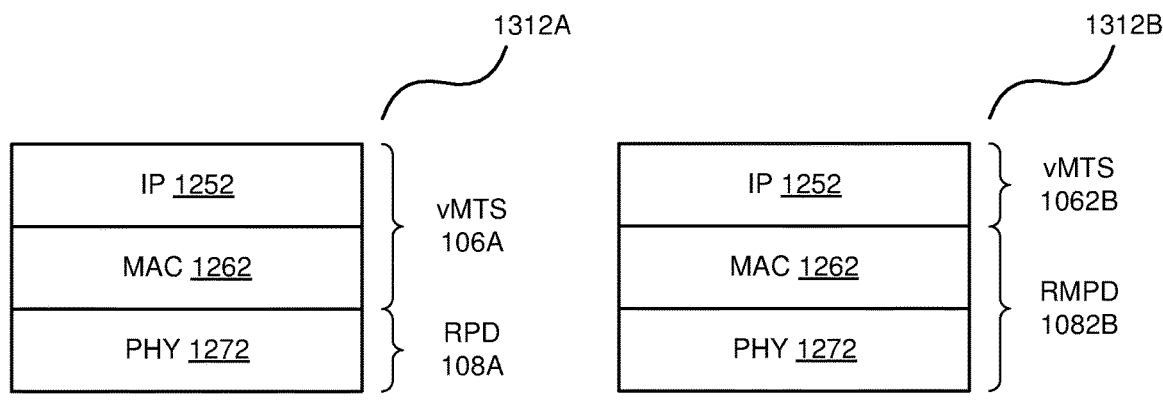
FIG. 12A  FIG. 12B

SYSTEMS AND METHODS FOR LATENCY REDUCTION

CROSS-REFERENCE TO RELATED APPLICATIONS

This application is a continuation of U.S. patent application Ser. No. 17/740,049, filed on May 9, 2022, which is a continuation of U.S. patent application Ser. No. 16/126,889, filed on Sep. 10, 2018, which application is a continuation of PCT application no. PCT/US17/21918, filed on Mar. 10, 2017, which application claims the benefit of U.S. provisional patent application No. 62/357,770 filed on Jul. 1, 2016, U.S. provisional patent application No. 62/345,634 filed on Jun. 3, 2016, U.S. provisional patent application No. 62/353,755 filed on Jun. 23, 2016, U.S. provisional patent application No. 62/339,463 filed on May 20, 2016, and U.S. provisional patent application No. 62/306,360 filed on Mar. 10, 2016, the disclosures and benefits of which are incorporated in their entireties by reference herein. PCT application no. PCT/US17/21918 also claims the benefit of U.S. patent application Ser. No. 15/236,147 filed on Aug. 12, 2016, U.S. patent application Ser. No. 15/447,419 filed on Mar. 2, 2017, U.S. patent application Ser. No. 15/453,146 filed Mar. 8, 2017, and U.S. patent application Ser. No. 15/454,668 filed Mar. 9, 2017, the disclosures and benefits of which are also incorporated in their entireties by reference herein.

TECHNICAL FIELD

The present invention relates to systems and methods for latency reduction.

BACKGROUND

Mobile Network Operators (MNOs) operate a mobile core to provide wireless service to a variety of wireless user equipment (UEs, such as cell phones, laptop computers, tablet computers, etc.). The wireless networks of these MNOs exist in a variety of forms and operate using a variety of modulations, signaling techniques, and protocols, such as those found in Wifi, 3G, 4G, 5G and Long Term Evolution (LTE) networks. Some MNOs even operate with Multiple-System Operators (MSOs), Telecommunications Companies (telcos), satellite operators (including high speed satellite broadband services), fiber operators, and UAV internet providers, collectively referred to as "Operators". For example, Operators routinely provide internet services to the MNOs for backhaul traffic, while the MNO provides wireless services for the Operator. In addition, some Operators operate both the wired services and MNO services.

Now, MSOs are even providing "small cells" such that a UE can communicate through its MNO via an MSO. For example, an MSO may deploy an antenna/interface that a UE can communicate with via its respective wireless protocol. The MSO packages the communications between the UE and the MNO via the MSO's protocol, for example Data Over Cable Service Interface Specification (DOCSIS). However, latency is incurred because of the serial nature of data transfer grants between DOCSIS and the wireless protocol.

Now, MSOs are even providing "small cells" such that a UE can communicate through its MNO via an MSO. For example, an MSO may deploy an antenna/interface that a UE can communicate with via its respective wireless protocol. The MSO packages the communications between the UE and the MNO via the MSO's protocol, for example Data Over Cable Service Interface Specification (DOCSIS).

In some instances, functionality of a small cell may be spread across a communication link via virtualization of the components thereof. But, granting data transfer requests from UEs through the communication link is problematic because latency incurs from the serial nature of data transfer grants between the wireless protocol and that of the communication link.

Now, Operators are even providing "small cells" such that a UE can communicate through its MNO via the Operator. For example, an MSO may deploy an antenna/interface that a UE can communicate with via its respective wireless protocol. The MSO packages the communications between the UE and the MNO's mobile core via the MSO's protocol, for example Data Over Cable Service Interface Specification (DOCSIS). However, inefficiencies in the communication session setups of the Operator and the MNO create latencies that negatively affect the user's Quality of Experience (QoE).

Mobile Network Operators (MNOs) provide wireless service to a variety of user equipment (UEs), and operate using a variety of techniques such as those found in 3G, 4G LTE networks. The wireless service network can consist of macro and/or small cells.

Some MNOs operate with Multi System Operators (MSOs) of the cable industry for backhauling traffic for wireless networks. The MSO packages the communications between the UE and the MNO via the MSOs protocol, for example Data Over Cable Service Interface Specification (DOCSIS).

Since the wireless and backhaul networks are controlled by separate entities, DOCSIS backhaul networks and wireless radio networks each lack visibility into the other's network operations and data. This causes the scheduling algorithms for the wireless and DOCSIS network to operate separately, which can result in serial operations during the transfer of data from UE to the mobile core. The DOCSIS network does not have insights into the amount and the priority of wireless data being backhauled, since this knowledge is only known to the wireless portion of the network.

SUMMARY

Systems and methods presented herein provide for a latency reduction in wireless service through a request-grant based communication link, for example a DOCSIS communication link. In one embodiment, a method includes linking a modem to a Modem Termination System (MTS) via the DOCSIS communication link and detecting, at the modem, a message from a wireless service link indicating that a user equipment (UE) has data to transmit to a Mobile Network Operator (MNO). Other embodiments contemplated utilizing an optical network. An optical network may be formed with, for example, an Optical Network Terminal (ONT) or an Optical Line Termination (OLT), and an Optical Network Unit (ONU), and may utilize optical protocols such as EPON, RFOG, or GPON. Embodiments also contemplated exist in other communication systems capable of backhauling traffic, for example, a satellite operator's communication system. To simplify description, a termination unit such as a CMTS, an ONT, an OLT, a Network Termination Units, a Satellite Termination Units, and other termination systems are collectively called a "Modem Termination System (MTS)". To simplify description a modem unit such as a satellite modem, a modem, an Optical Network Units (ONU), a DSL unit, etc. collectively called a "modem."

Further, to simplify description a protocol such as DOCSIS, EPON, RFOG, GPON, Satellite Internet Protocol, is called a "protocol."

In an embodiment, the present system and method handles a data request for transmitting from a modem to a mobile core via the wireless service link. In an embodiment, the processing of the data request from the modem occurs at least in part at the MTS. The system and method are capable of processing a wireless request to result in a wireless grant substantially simultaneous to the backhaul negotiation of the transmission of UE data over the backhaul network.

In an embodiment, the UE is an LTE wireless device in wireless communication with an eNodeB, although it will be understood that the present invention is equally applicable for use with 2G, 3G, 5G, and other wireless protocol systems.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

Systems and methods presented herein provide for reducing latency in wireless service through a request-grant based communication link, for example a DOCSIS communication link. In one embodiment, the communication link comprises a virtualized Modem Termination System (vMTS) and a modem. The communication link is coupled with a virtualized wireless link (e.g., configured from a remote small cell and a central small cell). Other embodiments contemplated utilizing an optical network. An optical network may be formed with, for example, an Optical Network Terminal (ONT) or an Optical Line Termination (OLT), and an Optical Network Unit (ONU), and may utilize optical protocols such as EPON, RFOG, or GPON. Embodiments also contemplated exist in other communication systems capable of backhauling traffic, for example, a satellite operator's communication system. To simplify description, a termination unit such as a CMTS, an ONT, an OLT, a Network Termination Units, a Satellite Termination Units, and other termination systems are collectively called a "Modem Termination System (MTS)". To simplify description a modem unit such as a satellite modem, a modem, an Optical Network Units (ONU), a DSL unit, etc. collectively called a "modem." Further, to simplify description a protocol such as DOCSIS, EPON, RFOG, GPON, Satellite Internet Protocol, is called a "protocol."

In some embodiments, the present system and method handles transferring a bandwidth request message, such as a buffer status report (BSR), from a UE through the communication link to a control portion of the virtualized wireless link, for example residing with the central Small Cell (cSC). For example, in one embodiment, the control portion of the virtualized wireless link signals the vMTS to generate a grant, (e.g., a backhaul grant), for the transmission of the UE data on the communication link. The control portion of the virtualized wireless link also generates a wireless grant for the UE to transfer the data on the virtualized wireless link. It will be understood that the control portion of the virtualized wireless link, e.g., the central Small Cell (cSC), may be configured in a cloud computing system in communication with the wireless core or may be configured in the wireless core. In backhaul wireless core integrated embodiment, the control portion of the virtualized wireless link may be configured with an MTS or vMTS.

In another embodiment, the control portion of the virtualized wireless link signals of a grant for the transmission of the UE data on the communication link. Again, the control portion of the virtualized wireless link also generates a wireless grant for the UE to transfer the data on the virtualized wireless link.

In a separate embodiment, a mediator intercepts or generates a copy of one or both of the BSR sent from the UE to the cSC and the UL grant sent from the cSC to the UE. The mediator unpacks or otherwise decodes all or a portion of the BSR and/or the UL grant to provide data to the vMTS for the generation of a MAP or an unsolicited grant for transmission to the modem. It will be understood that the mediator may be configured with the vMTS or the cSC, configured between the vMTS and the cSC, or configured between the RPD and the vMTS.

In another embodiment, the functionality detailed above for the mediator is integrated into the vMTS itself, such that the vMTS unpacks or otherwise decodes all or a portion of the BSR and/or the UL grant so the vMTS may generate a MAP or an unsolicited grant for transmission to the modem. In this way the modem is prepared for the transmission of UL data as soon as it arrives at the modem thereby significantly reducing latency.

In a separate embodiment, the RPD is replaced with a Remote Device (RD) configured to implement both the PHY and MAC layers (similar to PHY 127 and MAC 126 of FIG. 12) and the mediator is configured between the RD and the vMTS. In this embodiment the mediator intercepts or generates a copy of one or both of the BSR sent from the UE to the cSC and the UL grant sent from the cSC to the UE. The mediator unpacks or otherwise decodes all or a portion of the BSR and/or the UL grant to provide data to a remote device (RD) for the generation of a MAP or an unsolicited grant for transmission to the modem.

In another embodiment, the functionality for the mediator, detailed immediately above, is integrated into the Remote Device itself, such that the RD unpacks or otherwise decodes all or a portion of the BSR and/or the UL grant so the RD may generate a MAP or an unsolicited grant for transmission to the modem. In this way the modem is prepared to transmit UL data as soon as it arrives at the modem, thereby significantly reducing latency.

In an embodiment, the UE implements LTE protocol, although it will be understood that the present invention is equally applicable for use with 2G, 3G, 5G, Wi-Fi and other wireless protocol systems. In an embodiment, the Modem 102 implements DOCSIS protocol, although it will be understood that the present invention is equally applicable for use with satellite, EPON, GPON, and other wired protocol systems.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

Systems and methods presented herein provide for expediting the setup of a wireless service through a request-grant based communication link, for example, a DOCSIS communication link. In one embodiment, a method comprises intercepting setup information for a wireless session from a mobile core (e.g., operated by an MNO) servicing the UE, initiating a communication session between a Modem Termination System (MTS) and a modem based on the intercepted setup information to support a forthcoming wireless session, and providing the wireless session through the communication session setup.

Other embodiments contemplated utilizing an optical network. An optical network may be formed with, for example, an Optical Network Terminal (ONT) or an Optical Line Termination (OLT), and an Optical Network Unit (ONU), and may utilize optical protocols such as EPON, RFOG, or GPON. Embodiments also contemplated exist in other communication systems capable of backhauling traffic, for example, a satellite operator's communication system. To simplify description, a termination unit such as a CMTS, an ONT, an OLT, a Network Termination Units, a Satellite Termination Units, and other termination systems are collectively called a "Modem Termination System (MTS)". To simplify description a modem unit such as a satellite modem, a modem, an Optical Network Units (ONU), a DSL unit, etc. collectively called a "modem." Further, to simplify description a protocol such as DOCSIS, EPON, RFOG, GPON, Satellite Internet Protocol, is called a "protocol."

In an embodiment, the UE is an LTE wireless device, although it will be understood that the present invention is equally applicable for use with 2G, 3G, 5G, Wi-Fi and other wireless protocol systems.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

Other embodiments contemplated utilizing an optical network. An optical network may be formed with, for example, an Optical Network Terminal (ONT) or an Optical Line Termination (OLT), and an Optical Network Unit (ONU), and may utilize optical protocols such as EPON, RFOG, or GPON. Embodiments also contemplated exist in other communication systems capable of x-hauling traffic, examples include without limitation satellite operator's communication systems, Wi-Fi networks, optical networks, DOCSIS networks, MIMO communication systems, microwave communication systems, short and long haul coherent optic systems, etc. X-hauling is defined here as any one of or a combination of front-hauling, backhauling, and midhauling. To simplify description, a termination unit such as a CMTS, an ONT, an OLT, a Network Termination Units, a Satellite Termination Units, and other termination systems are collectively called a "Modem Termination System (MTS)". To simplify description a modem unit such as a satellite modem, a modem, an Optical Network Units (ONU), a DSL unit, etc. collectively called a "modem." Further, to simplify description a protocol such as DOCSIS, EPON, RFOG, GPON, Satellite Internet Protocol, is called a "protocol."

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE DRAWINGS

FIG. 11A is a block diagram of an exemplary protocol stack of a virtual base station (vBS).

FIG. 11B is a block diagram of another exemplary protocol stack of a virtual base station (vBS).

FIG. 12A is a block diagram of an exemplary protocol stack of a Remote PHY Device (RPD) and vMTS.

FIG. 12B is a block diagram of an exemplary protocol stack of a Remote MAC PHY Device (RMPD) and vMTS.

DETAILED DESCRIPTION

Figure 1:
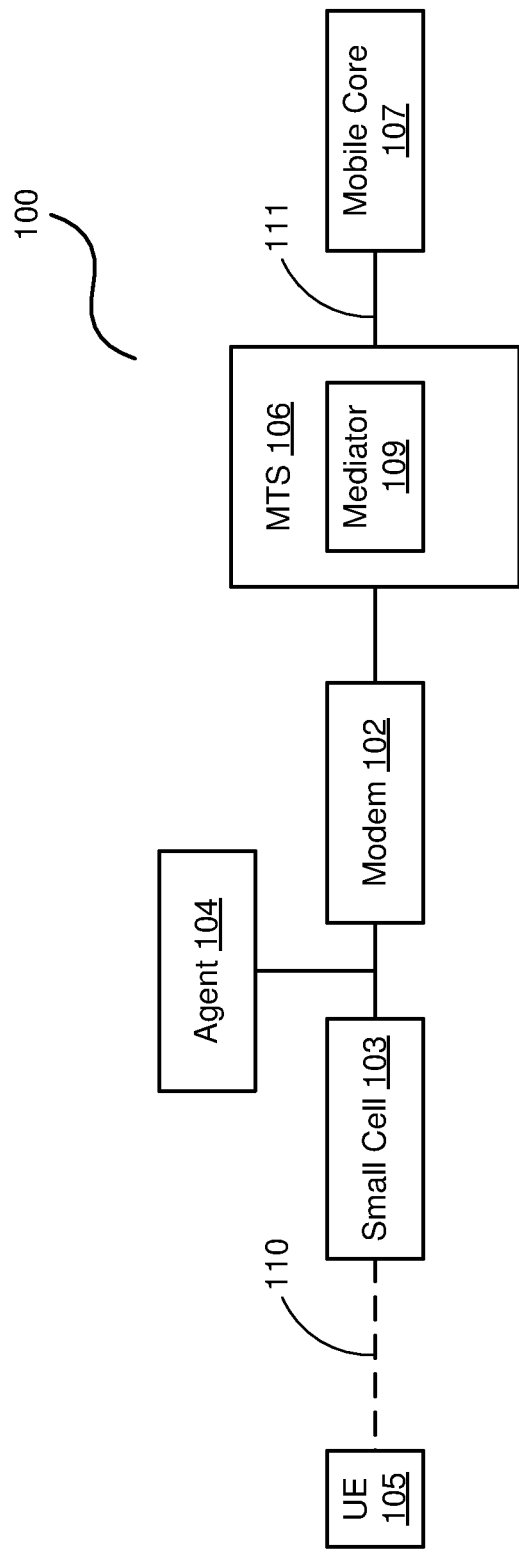
FIG. 1 is a block diagram of an exemplary wireless service link through an MTS.

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below. For example, the following description is discussed as applied to an LTE-DOCSIS cooperative network for implementing latency reduction in wireless service between a user device and a wireless core. It will be appreciated that the present latency reduction in wireless service system and method may equally be applied in systems utilizing macrocells, WiFi, satellite communication systems, optical backhaul systems (EPON, GPON, RFOG), MU-MIMO, laser communication, and even aerial vehicles such as unmanned aerial vehicles (UAV) and balloons that provide wireless and/or laser communication. That is, the present invention may be used in many wireless-to-backhaul systems where at least one of the wireless system or backhaul system utilizes a request-grant protocol for data transmission. For example, the following description is discussed as suggestive of an LTE-DOCSIS cooperative network for expediting a grant assignment for a wireless service through a request-grant based communication link between a user device (e.g., a UE) and a wireless core (also called herein a "first network core", e.g., a mobile core or Wi-Fi core). Generically, a LTE-DOCSIS cooperative network may be any first network-second network cooperative communication system and is not limited to either LTE or DOCSIS networks. For example, the present system and method may be used in a polling service based system, such as Real-Time Publish-Subscribe (RTPS). Polling is similar enough to a request-grant system that it may take advantage of the present invention. One difference between a request-grant system and a polling service system is polling occurs without having to contend with other devices when a request is sent. It will be appreciated that the present system and method for prioritized grant assignment in wireless services may equally be applied in systems utilizing microcells, picocells, macrocells, Wi-Fi, satellite communication systems, optical backhaul systems (EPON, GPON, RFOG), MU-MIMO, laser communication, and even aerial vehicles such as unmanned aerial vehicles (UAV) and balloons that provide wireless and/or laser communication. That is, the present invention may be used in many wireless-to-backhaul systems where at least one of the wireless system or backhaul system utilizes a request-grant protocol for data transmission.

FIG. 1 is a block diagram of an exemplary wireless service link 100 including a mediator 109 configured with an MTS 106. It will be understood that mediator 109 may be integrated with or communicatively coupled with MTS 106. The MTS 106 may be, for example, a CMTS, a Fiber Node, a Fiber Hub, an optical network unit (ONU), or other termination device. Mediator 109 may be implemented, for example, as a software agent in any of such devices. If mediator 109 is integrated with an MTS, integration may be via software or hardware.

A UE 105 may wirelessly communicate with other UEs (not shown) in a wireless service network for the purpose of transmitting and/or receiving data. A mobile core 107 (i.e., operated by an MNO) controls the operations of the UE 105 within the wireless network. This includes, among other things, managing subscription information (e.g., data communication, data plans, roaming, international calling, etc.) and ensuring that the UE 105 can place calls and transmit data within the wireless network. Mediator 109 cooperates with the MTS to provide a communication link between the UE 105 and the mobile core 107 such that the mobile core 107 can control the operations of the UE 105, for example, when the UE 105 is within range of a "small cell" 103.

In the past, MNOs often maintained, operated, and controlled wireless base stations themselves for the purposes of providing communications with UEs. For example, an MNO employing LTE communications may operate a plurality of eNodeBs in an area to provide wireless services to subscribing UEs in that area.

Now operators are capable of acting as backhaul operators. For example, MSOs are seeking to increase their value to the MNOs by providing alternative backhaul paths for communication between UEs, such as UE 105, and the mobile core, such as mobile core 107. MSOs and small/independent wireless operators currently employ wireless devices, such as the small cell 103, for capturing a wireless data transmission and passing it through a backhaul system, as shown in FIG. 1. In the embodiment of FIG. 1, the backhaul system includes modem 102, MTS 106, and meditator 109 and may additionally include an optional agent 104, which is discussed further below. The small cell 103 comprises many of the features of a larger base station such as the air-to-air interface and protocol handling. In some instances, the small cell 103 may be a multi-radio hotspot providing for WiFi, as well as LTE Licensed Assisted Access (LTE-LAA) or LTE Unlicensed (LTE-U).

In an alternative embodiment communication is only WiFi communication and is between a STA (not shown) a WiFi core (not shown). To modify the system of FIG. 1 to accommodate the WiFi embodiment the skilled artisan would replace small cell 103 with a WiFi station (STA) and the mobile core 107 with a WiFi core.

Small cells and similar wireless technologies (collectively discussed and represented herein as small cells) represent new opportunities for MNOs. These new small cells allow operators to access additional spectrum, use existing spectrum more efficiently, and promote greater deployment flexibility, all at a lower cost. Small cells also reduce radio access network build-out and backhaul investment, while improving the end user experience by providing increased access to mobile networks. Additionally, because small cells are much smaller, they can reduce a base station's footprint and have less environmental impact (e.g., in terms of power consumption).

The MSOs and MNOs, evolving from different technologies, generally employ different communication protocols and offer little insight to each other. For example, the MSOs may employ the DOCSIS protocol to transport data to and from a modem 102. The MNOs, on the other hand, may employ a variety of wireless protocols including EDGE (Enhanced Data rates for GSM Evolution), 2G, 3G, 4G, 5G, LTE, or the like. While an MTS and a modem may be able to transport the wireless service traffic of the UE and the mobile core, the MTS and the modem need not process the data transmitted. Rather, the MTS and the modem simply route the traffic between the appropriate parties. In the example of FIG. 1, traffic is routed between UE 105 and mobile core 107 via small cell 103, modem 102, and MTS 106.

This lack of insight by the backhaul system into the wireless system's data, and vice versa (e.g., LTE system into the DOCSIS system, and vice versa), causes the grant of a request to transmit data across the wireless service link 100 to occur in a serial manner. For example, when the small cell 103 provides a grant to the UE 105 to transfer data to the small cell 103, the modem 102 and the MTS 106 are unaware that the small cell 103 has provided a grant for a data transfer from the UE 105. When the data arrives at the small cell 103 it is then forwarded to the modem 102. Only when the data arrives at the modem 102 from the small cell 103 does the modem transmit a request to the MTS 106. The modem-to-MTS grant alerts the MTS 106 that the modem 102 has data to transmit and requires resources to do so. The MTS 106 can then schedule resources for the modem 106 and transmits that as a "grant" back to the modem 102. The data is then transferred from the modem 102 to the MTS 106 and then forwarded on to the mobile core 107. This serial granting of data transfers results in unnecessary latency to the overall data transfer from UE 105 to mobile core 107.

In the case of high-priority data, such as voice data, the unnecessary latency may result in the data being irrelevant by the time it reaches the intended recipient. For example, the UE 105 transfers blocks of data representing relatively small portions of a conversation. When some of the blocks of data are delayed, they may no longer be relevant to the conversation and are as such dropped. When this occurs regularly, the quality of the conversation and the user's quality of experience (QoS) are degraded significantly. Similar issues exist when non-voice data is transmitted across the network, such as video data (live or stored), security data, access and control over remotely located resources, machine-to-machine applications, etc.

In this embodiment, the modem 102 learns from the small cell 103 that the UE 105 has issued a scheduling request to transfer data to the small cell 103. For example, the small cell 103 may be an eNodeB operable to communicate in an LTE network, or a WiFi Access Point (STA) operable to communicate in a WiFi network. The UE 105, when it needs to transfer data across the wireless service link 100, issues a scheduling request (SR) to the eNodeB. The eNodeB then determines when the UE 105 can transfer data to the eNodeB and issues an uplink (UL) grant to the UE 105. The UE 105 then transfers its data to the eNodeB such that the eNodeB can propagate it through the wireless service link 100 to the mobile core 107 operated by an MNO for subsequent processing, routing, and the like.

When the UE 105 has data to transmit the preparation for the transmission process can be a multistep process by itself. For example, if the UE 105 does not have a valid grant, the UE 105 issues an SR then, after receiving the grant, transfers a buffer status report (BSR) to the eNodeB indicating how much data it is requesting to be transferred. The eNodeB then issues the subsequent grant indicating the actual amount of data that can be transmitted. Upon receiving the grant, the UE 105 transfers its data to the eNodeB.

The small cell 103 informs the modem 102 of the SR just after the small cell 103 receives it. In an embodiment, this is accomplished by the small cell 103 transmitting an out of band message to the modem 102 to indicate that the small cell 103 has received the SR. Alternatively or additionally, a modem 102 that is configured with functionality to read the SR may do so. The modem 102 may read the SR to learn, for example, that the UE 105 is requesting to transfer data to the small cell 103. For example, the modem 102 may be configured with and/or include a portion of an eNodeB such that it can detect and read the LTE protocol, and therefore the SR, from the UE 105.

In a separate embodiment, the agent 104 (e.g., formed in software, hardware, or a combination thereof) may exist between the small cell 103 and the modem 102 (or as a part of the small cell 103 and/or the modem 102). Agent 104 is configured to intercept the SR or generate a copy of the SR during its transit from the small cell 103 to the modem 102, unpacks the SR (or the copy), and transmits an out of band message to the modem 102 pertaining to the data containing within the SR. Once the modem 102 learns of the SR from agent 104, the modem 102 can alert the MTS 106 that it will need to transfer data when the modem 102 receives it from the UE 105 (e.g., through the small cell 103). Alternatively, the modem 102 simply forwards the SR in a manner similar to that of any other received data. It is then up to the MTS 106 or Mediator 109 to process the SR.

Thus, while the UE 105 and the small cell 103 are negotiating the transfer of data through the wireless service link 100, the modem 102 and the MTS 106 can negotiate their transfer of data before the data of the UE 105 arrives at the modem 102. This allows the data transfer scheduling and granting processes of the wireless service link 100 and the backhaul communication link to occur in parallel or substantially in parallel.

Alternatively or additionally, an MTS may be configured with functionality of the mobile core 107. For example, in a DOCSIS protocol embodiment, the MTS 106 is a CMTS, and may include functionality of an LTE gateway that is operable to intercept a scheduling request from the UE 105 indicating that it needs to transfer data to the mobile core 107. This may direct the MTS 106 to initiate the establishment of a communication session between the MTS 106 and the modem 102.

In another embodiment, the modem 102 and/or the MTS 106 may be configured to wait until the message is received from the small cell 103 pertaining to the amount of data to be transferred from the UE 105. For example, when the small cell 103 receives an initial SR, the small cell 103 understands that another detailed request will follow with a BSR requesting a data transfer of a particular size. The small cell 103 will then know when that data transfer will occur and how much data will be sent. Accordingly, this information is then conveyed to the modem 102 and/or the MTS 106 to initiate the granting through the backhaul's protocol based on when the actual data transfer will occur and the data size.

Based on the foregoing, the UE 105 is any device, system, software, or combination thereof operable to communicate wirelessly with a wireless network using any one or more wireless protocols including, 2G, 3G, 4G, 5G, LTE, LTE-U, LTE-LAA, or the like, as well as with a WiFi network using any one or more wireless service protocols including 802.11ax. Examples of the UE 105 include, but are not limited to, laptop computers, tablet computers, and wireless telephones such as smart phones. The small cell 103 is any device, system, software, or combination thereof operable to provide an air-to-air interface for the mobile core 107, one example of which is a WiFi core. Examples of the small cell 103 include WiFi access points and base stations operating as eNodeBs in a wireless network. The modem 102 is any device, system, software, or combination thereof operable to provide data transfers with an MTS. Examples of the modem 102 include DOCSIS enabled set-top boxes. The MTS 106 is any device, system, software, or combination thereof operable to communicate with the modem 102 as well as provide a wireless service session through the communication link provided by the modem 102 and the MTS 106. Other exemplary embodiments are shown and described below.

Figure 2:
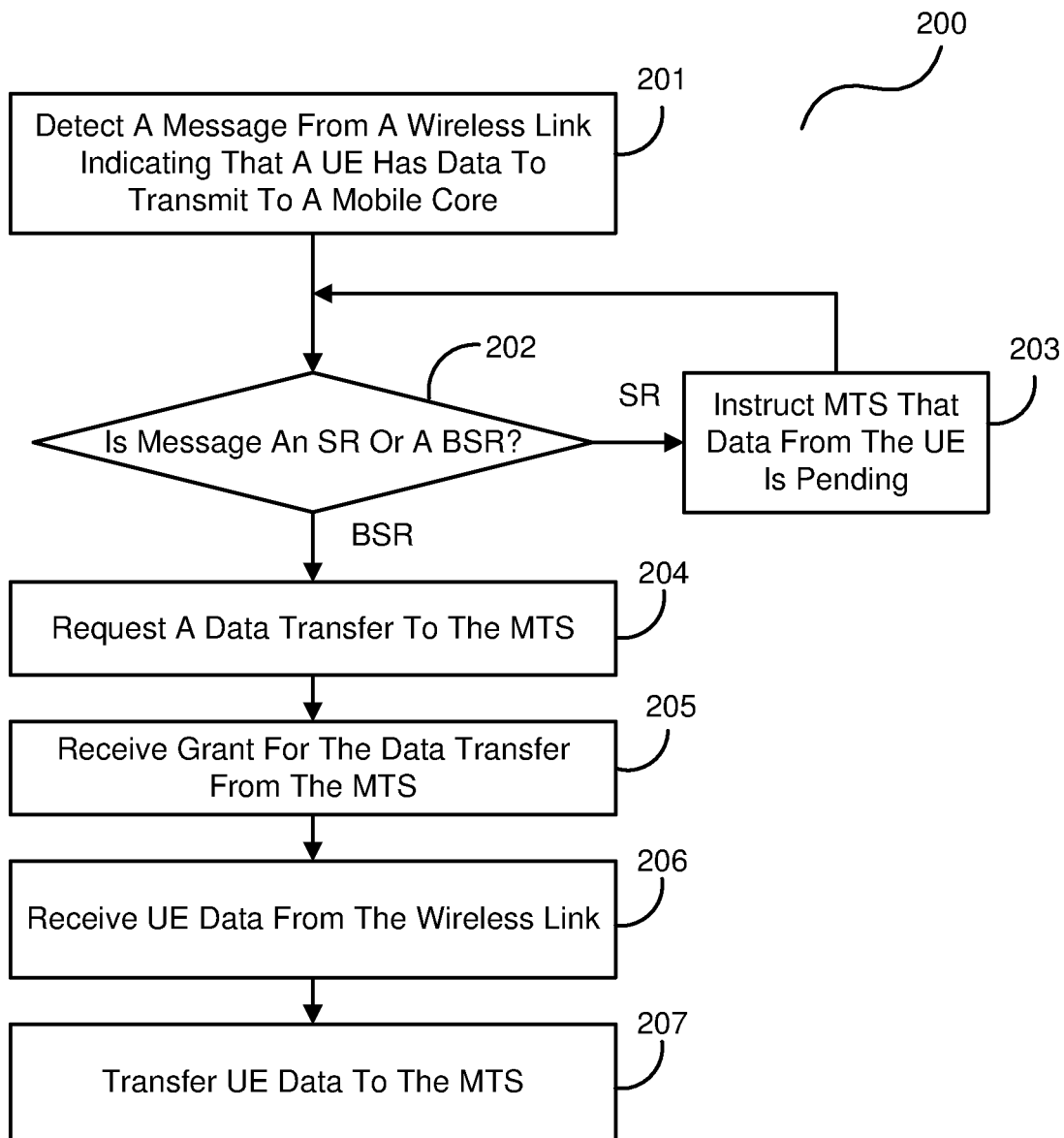
FIG. 2 is a flowchart illustrating an exemplary process operable with a modem of the wireless service link of FIG. 1.

FIG. 2 is a flowchart illustrating an exemplary process 200 operable with the modem 102 of the wireless service link 100 of FIG. 1. In this embodiment, the modem 102 detects a message from a wireless service link 100 indicating that the UE 105 has data to transmit to the mobile core 107, in the process element 201. For example, the modem 102 may receive an out of band signaling message from the small cell 103 and/or unpack an SR received by the small cell 103 indicating that the UE 105 requests a data transmission. Alternatively, the agent 104 may receive, intercept or generate a copy of an SR sent from the small cell 103 to the modem 102, unpack the SR, and send an out of band signaling message to the modem 102 to alert the modem 102 of the scheduling request by the UE 105.

From there, the modem 102 or the agent 104 may determine whether the message is an SR or a BSR, in the process element 202. For example, if the UE 105 wishes to transmit its data to the small cell 103, the UE 105 transmits an SR to the small cell 103 without indicating how much data it wishes to transmit. The UE 105 then receives a grant from the small cell 103, which allows the UE 105 to respond to the small cell 103 with information regarding the amount of data it has to transmit. If the small cell 103 receives the initial SR, then the modem 102 instructs the MTS 106 that data from the UE 105 is pending, in the process element 203. Such will alert the MTS 106 that the modem 102 will be requesting a grant through the communication link established between the modem 102 and the MTS 106. The MTS 106 may further anticipate that the modem 102 will send additional signaling messages, such as the BSR message or the grant for the wireless service link 100 issued by the small cell 103, by issuing a grant for the modem 102 over the communication link established between the modem 102 and the MTS 106. The BSR message indicates the amount and the quality of service (QoS) requirement of data the UE 105 wishes to transfer to the small cell 103. The grant is generated by the small cell 103 for the UE 105 that indicates the amount of data the UE 105 is to transmit and the time of transmission. Knowing the precise amount, the timing, and the QoS assignment of the expected data arrival at the small cell 103 helps the MTS 106 to determine the size, timing, and the QoS assignment of the grant over the DOCSIS communication link. This will also give the MTS 106 ample time to schedule a grant for the modem 102 to transfer data from the UE 105 to the MTS 106 over the communication link.

If the message from the UE 105 is a BSR indicating the amount and the QoS requirement of data being transferred by the UE 105 or a grant that is issued by the small cell 103 indicating the amount of data for transmission, and expected time of data arrival at the small cell 103, then the modem 102 may request a data transfer to the MTS 106, in the process element 204. For example, the modem 102 may generate and transmit a message to the MTS 106 requesting to transfer an amount of data from the UE 105 indicated by the BSR or as indicated by the grant. Alternatively, the modem 102 may simply encapsulate the BSR and/or the grant message and transmit it to the MTS 106. The MTS 106, upon scheduling the data transfer from the modem 102, issues a grant granting the data transfer from the modem 102.

Once the grant by the MTS 106 has been issued, the modem 102 can simply receive the data from the UE 105 in the wireless service link 100, in the process element 206, and transfer the data of the UE 105 to the MTS 106 at its allocated time as indicated by the MAP grants, in the process element 207. That is, requesting/granting of data transfers between the modem 102 and the MTS 106 is performed substantially in parallel with the requesting/granting of data transfers between the UE 105 and the small cell 103, thereby reducing latency in the overall data transfer.

Figure 3:
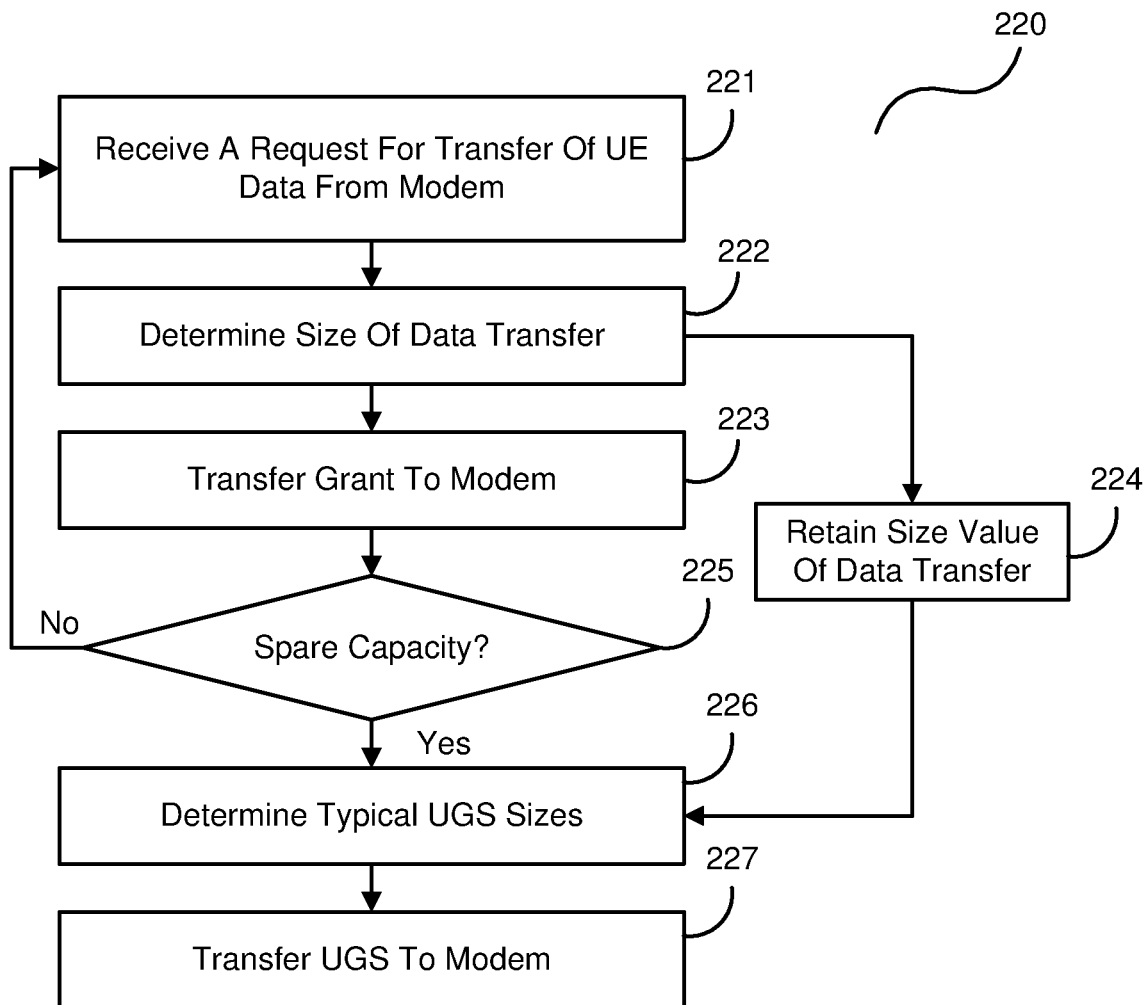
FIG. 3 is a flowchart illustrating an exemplary process operable with the MTS of FIG. 1.

FIG. 3 is a flowchart illustrating an exemplary process 220 operable with the MTS 106 of FIG. 1. In this embodiment, the MTS 106 receives and processes the request from the modem 102 to transfer data of the UE 105, in the process element 221. As mentioned, the request may include information pertaining to the size and the QoS requirement of the data transfer retrieved from a BSR issued by the UE 105 or information pertaining to the size, and the precise time of the data transfer retrieved from a grant issued by the small cell 103. Accordingly, the MTS 106 may determine the size, the QoS assignment, and the timing of the data transfer, either based on the BSR, the grant information, or another internal process, in the process element 222, and schedule a grant of the data transfer. Once the data transfer has been scheduled, the MTS 106 transfers the grant to the modem 102, in the process element 223. Then, when the modem 102 receives the data from the UE 105 through the small cell 103, the modem 102 can quickly transfer the data to the MTS 106 because the grant is issued substantially in parallel with the grant by the small cell 103 to the UE 105.

The MTS 106 may store in memory the amount of data associated with the data transfer (and optionally all previous UE data transfers), in the process element 224. For example, the MTS 106 may be operable to issue unsolicited data transfer grants through an unsolicited grant service (UGS) or some other unsolicited grant. When the MTS 106 has spare capacity (i.e., the process element 225) the MTS 106 can transfer an unsolicited grant to the modem 102 without being requested to do so such that the modem 102 can transfer data (UE data and/or modem data) if it has any without delay associated with a request-grant process. By retaining the size value of the data associated with the previous UE data transfers (and optionally all previous UE data transfers), the MTS 106 can better estimate how much spare data transfer capacity can be issued through unsolicited grants and further decrease system latency.

In one illustration, UEs 105(1)-(4) (not shown) request data transfers to the small cell 103 at or about the same time. For example, UE 105(1) needs to transmit two bytes of data, UEs 105(2) and UEs 105(3) need to transmit four bytes of data each, and UE 105(4) needs to transmit six bytes of data, thus totaling 16 bytes of data. The small cell 103 may combine the data transfer information into a BSR for transmission to the MTS 106. The MTS 106 may use this information to generate subsequent unsolicited grant of 16 bytes of data such that all of the data from UEs 105(1)-(4) may be transferred at or about the same time.

The MTS 106 may determine any type of typical unsolicited grant sizes for the modem 102, as shown in process element 226. For example, the MTS 106 may average the data sizes of BSRs from the small cell 103 over time, may use data sizes of one or multiple UEs 105, may base the data sizes of the unsolicited grants on a time of day, or the like. In any case, when the MTS 106 has spare capacity and determines a size of the unsolicited grant, the MTS 106 may transfer the unsolicited to the modem 102, as in process element 227, such that the modem 102 can transfer data of the UE 105 that it receives from the small cell 103.

Figure 4:
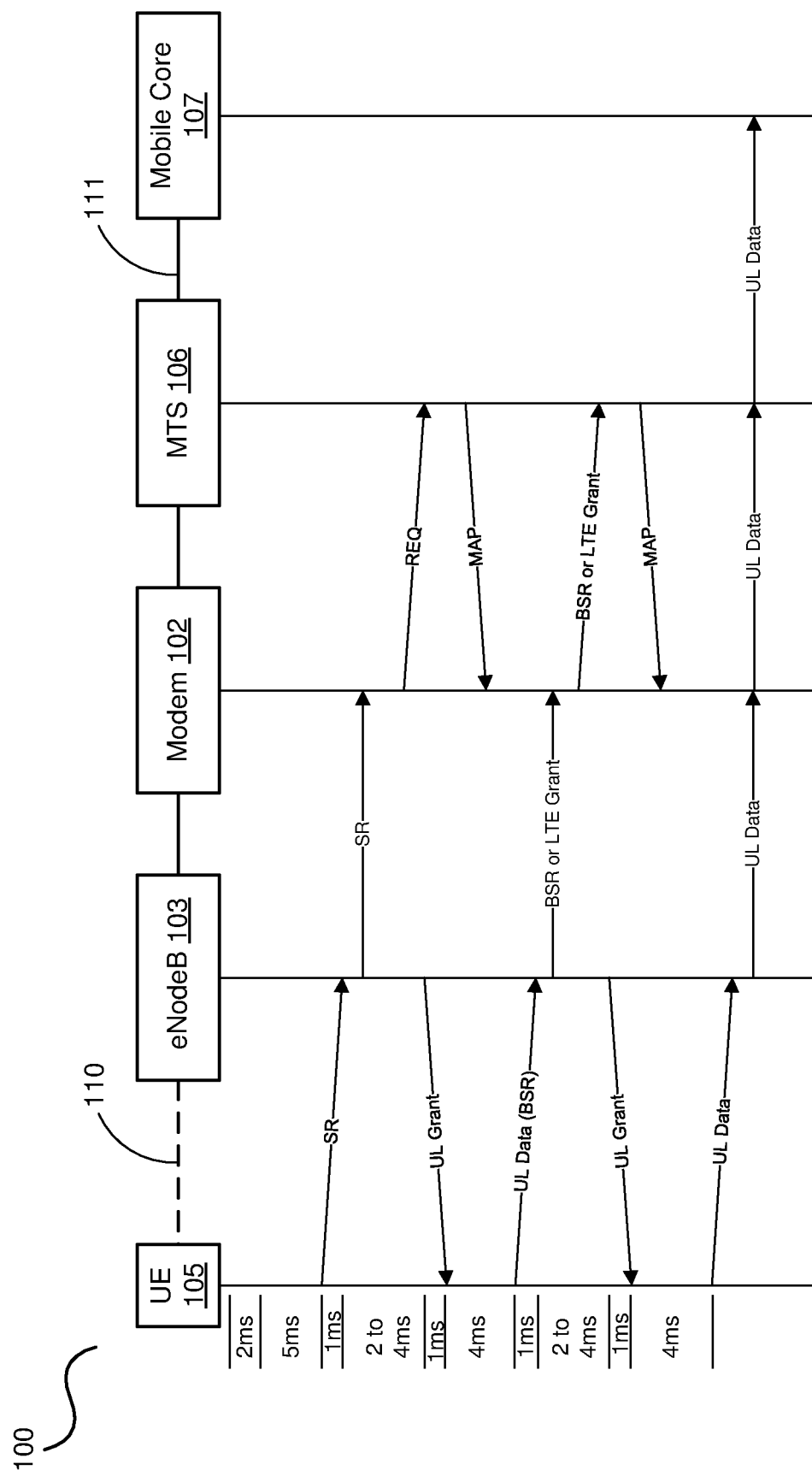
FIG. 4 is an exemplary communication diagram of the wireless service link through an MTS of FIG. 1.

FIG. 4 is an exemplary communication diagram of the wireless service link 100 of FIG. 1. In this embodiment, the small cell 103 is an eNodeB operable within an LTE network and employing LTE communication protocols. To the left of the UE 105 are timing diagrams exemplary of the LTE communication protocol. Timing as shown and discussed is not meant to be limiting in anyway, but merely for illustrative purposes and to convey understanding. For example, after a data arrives at the UE, the UE 105 processes the data to determine an SR is needed. The UE 105 waits for 5 ms for an SR opportunity then the UE 105 transfers the SR to the eNodeB 103, which typically takes 1 ms. The eNodeB 103 processes the SR and generates a grant which typically takes between 2 and 4 ms before it sends a first UL grant to the UE 105, which again takes typically 1 ms. Upon receipt of the first UL grant the UE 105 processes the grant, getting a BSR ready for transmission, which typically takes 4 ms, then transmits uplink (UL) data, e.g., a BSR, back to the eNodeB 103, again a 1 ms transmission. This UL data is generally just an indicator of the amount of UL data that is requested from the UE 105 when a second UL grant from the eNodeB 103 is received. That is, the UE 105 transfers the BSR, which also acts as an SR, to the eNodeB 103 indicating how much data is to be expected in the next transfer to the eNodeB 103.

The eNodeB 103 process the BSR and generates a second UL grant for the UE 105 in 2 to 4 ms. The UE 105 processes the received second grant and prepares the data for transmission, which can take between 2 and 4 ms, then sends the data to the eNodeB 103.

Upon receiving the initial SR, the eNodeB 103 may, for example, communicate information about the SR to the modem 102 through out of band signaling or transfer the SR to modem 102. If the SR is sent to the modem 102 the SR can be unpacked and modem 102 can determine that the UE 105 has data to be transmitted across the wireless service link 100 and optionally the type of data. In this regard, the modem 102 may request a data transfer from the MTS 106 such that the MTS 106 can begin scheduling for the data of the UE 105. The MTS 106 issues a MAP grant (or some other type of grant) to facilitate the further transfer of BSR and/or LTE grant from the modem 102.

When the eNodeB 103 receives the BSR, it may transfer the BSR in whole, information about the BSR, the actual LTE grant of the UE 105, or some combination thereof, to the modem 102. The LTE grant issued by the eNodeB 103 provided information regarding the size and the precise timing at which the UE 105 is scheduled to transmit its data. This, along with BSR, indicates to the modem 102 how much data, at what QoS is to be expected by the UE 105, and the precise time. The modem 102 then transfers this information (e.g., the BSR, the LTE grant, or similar as discussed above) to the MTS 106. As the MTS 106 has been preparing for the actual transfer of data from the UE 105, the MTS 106 can transfer a data transfer grant (e.g., a DOCSIS MAP in a cable network embodiment) to the modem 102. With the grant in hand, the modem 102 can simply wait for the UL data from the UE 105 and the eNodeB 103 such that it may be immediately forwarded to the MTS 106 through the communication link. Upon receipt of the data the MTS 106 then forwards it to the mobile core 107.

Although shown or described in a particular form of messaging, the invention is not intended to be limited to the exemplary embodiment. The MTS may have a gateway configured therewith that is operable to interpret LTE traffic. The modem 102 may simply wait until it receives a BSR and transfer it as part of the request for data transmission. The MTS 106 may then issue the data transfer grant based on the BSR or the LTE grant info, and the information contained therein.

Figure 5:
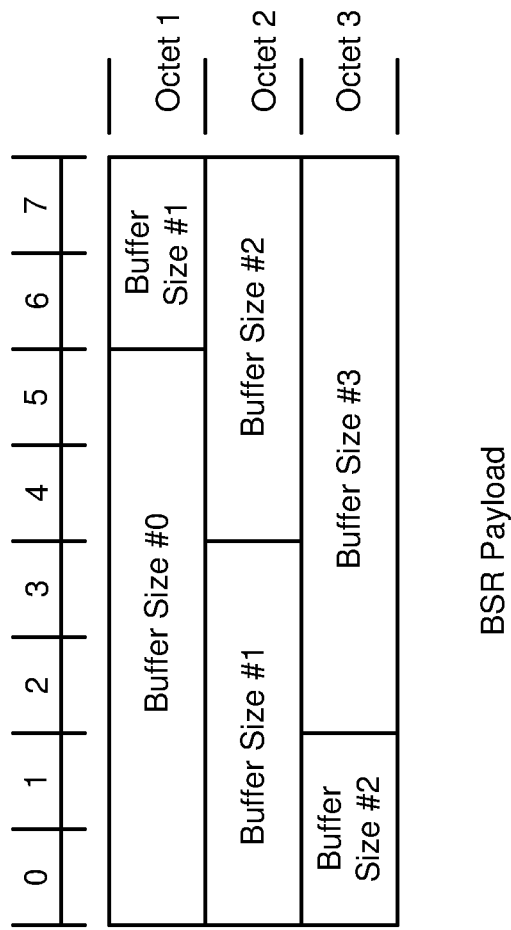
FIG. 5 is a block diagram of an exemplary buffer status report (BSR) operable with the wireless service link of FIG. 1.

FIG. 5 is a block diagram of an exemplary buffer status report (BSR) operable with the wireless service link of FIG. 1. In LTE, the SR is typically a 1-bit indicator sent by UE 105 to request UL bandwidth. But, the SR alone is not sufficient for the eNodeB 103, that is, the eNodeB 103 needs more information about a size of the data to be transmitted from UE 105 before it can provide a data grant to the UE 105. So, the eNodeB 103 simply sends a grant of sufficient size for the transmission of the BSR from the UE 105 to the eNodeB 103.

As illustrated in FIG. 5, the BSR is this configured as a 3-byte MAC control element that reports outstanding data for each of UE 105's four logical channel groups. The mapping of a radio bearer (i.e., a logical channel) to a logical channel group (LCG) is done at the session setup time by the eNodeB 103 based on the corresponding QoS attributes of the radio bearers (e.g., QoS Class Identifier (QCI), an Allocation and Retention Priority (ARP), a Guaranteed Bit Rate (GBR), a Maximum Bit Rate (MBR), an Access Point Name-Aggregate Maximum Bit Rate (APN-AMBR), a UE-AMBR, etc.). For example, radio resource control (RRC) messages map to LCG0. The embodiments herein allow the LCG to be directly mapped to the upstream service flow.

Figure 6:
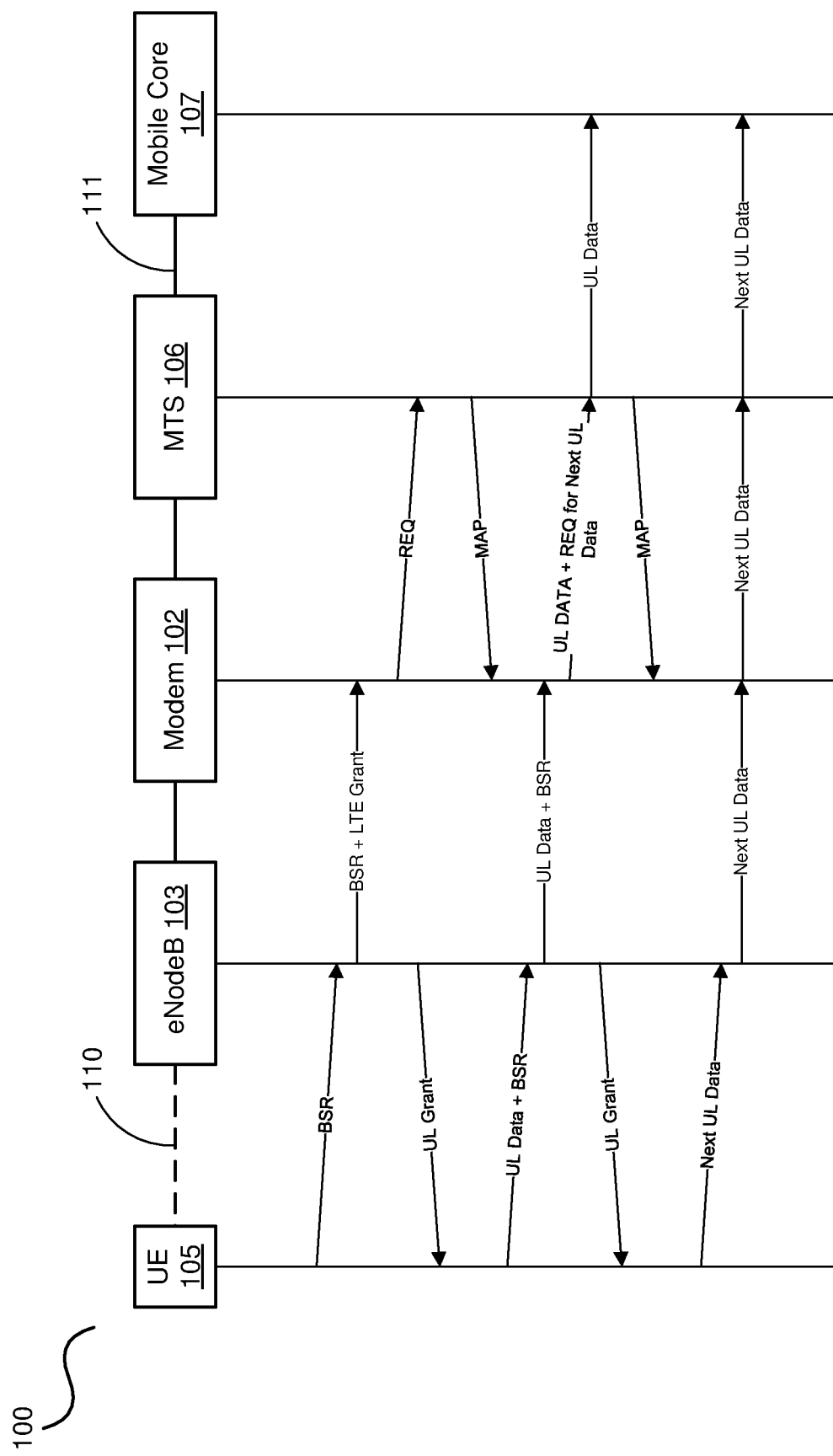
FIG. 6 is another exemplary communication diagram of the wireless service link through the MTS of FIG. 1.

FIG. 6 is another exemplary communication diagram of the wireless service link 100 of FIG. 1. In this embodiment, data transfer grants by the MTS 106 are based upon the BSRs from the UE 105. That is, the UE 105 already has a valid LTE grant, without having to first send the SR. This allows the data requesting/granting to be further compacted and thus further reduces latency within the wireless service link 100. For example, the UE 105 issues a BSR to the eNodeB 103. In doing so, the eNodeB 103 transfers the BSR to the modem 102 along with the LTE grant such that the modem 102 knows that the eNodeB 103 will be granting the data transfer to the UE 105. The eNodeB 103 then, or at substantially the same time as the BSR/LTE Grant is sent to the modem 102, transfers the UL grant to the UE 105, such that it can transfer its UL data and optionally another BSR (see below) to the eNodeB 103.

With the LTE grant and the BSR in hand, the modem 102 can request a data transfer of the MTS 106 and indicate within that request how much data will be transferred by the UE 105. The MTS 106 issues a grant to the modem 102 based on the amount of data, QoS requirement and precise timing of the expected data transfer. When the UL data is received by the eNodeB 103, it may be transferred by the modem 102 to the MTS 106.

However, when transmitting the UL data, the UE 105 may also include a BSR for its next transfer of data, as referenced above. The eNodeB, in transferring the UL data, also transfers the subsequent BSR and/or its LTE grant info for the subsequent data transfer from the UE 105 to the modem 102. Thus, the modem 102 is able to request a subsequent data transfer of the MTS 106 using the subsequent BSR and/or LTE grant info. The MTS 106 transfers the first UL data to the mobile core 107. Then, the MTS 106 issues a second grant to the modem 102 which then waits for the second UL data from the UE 105.

When the eNodeB 103 issues the second UL grant to the UE 105, the UE 105 responds in turn with the second UL data to the eNodeB 103. The eNodeB 103 forwards this second UL data to the modem 102. As the modem 102 already has its second grant for the second UL data, it immediately transfers the next UL data to the MTS 106, which in turn forwards the next UL data to the mobile core 107.

Figure 7:
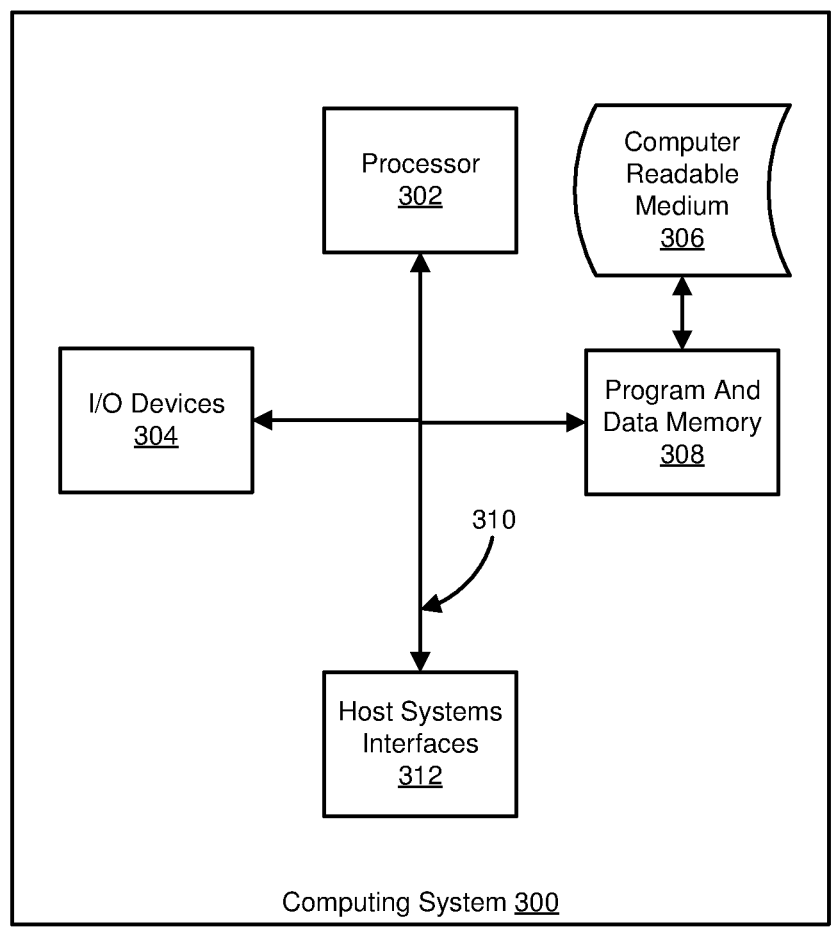
FIG. 7 is a block diagram of an exemplary computing system in which a computer readable medium provides instructions for performing methods herein.

The invention can take the form of an entirely hardware embodiment, an entirely software embodiment or an embodiment containing both hardware and software elements. Embodiments utilizing network functions virtualization (NFV) and virtualized hardware, such as a virtualized MTS, modem, etc., are also contemplated. In one embodiment, the invention is implemented in whole or in part in software, which includes but is not limited to firmware, resident software, microcode, etc. FIG. 7 illustrates a computing system 300 in which a computer readable medium 306 may provide instructions for performing any of the methods disclosed herein.

Furthermore, the invention can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computer system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 300, suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. Input/output or I/O devices 304 (including but not limited to keyboards, displays, pointing devices, etc.) can be coupled to the system either directly or through intervening I/O controllers. Network adapters may also be coupled to the system to enable the computing system 300 to become coupled to other data processing systems, such as through host systems interfaces 312, or remote printers or storage devices through intervening private or public networks. Modems and Ethernet cards are just a few of the currently available types of network adapters.

Figure 8:
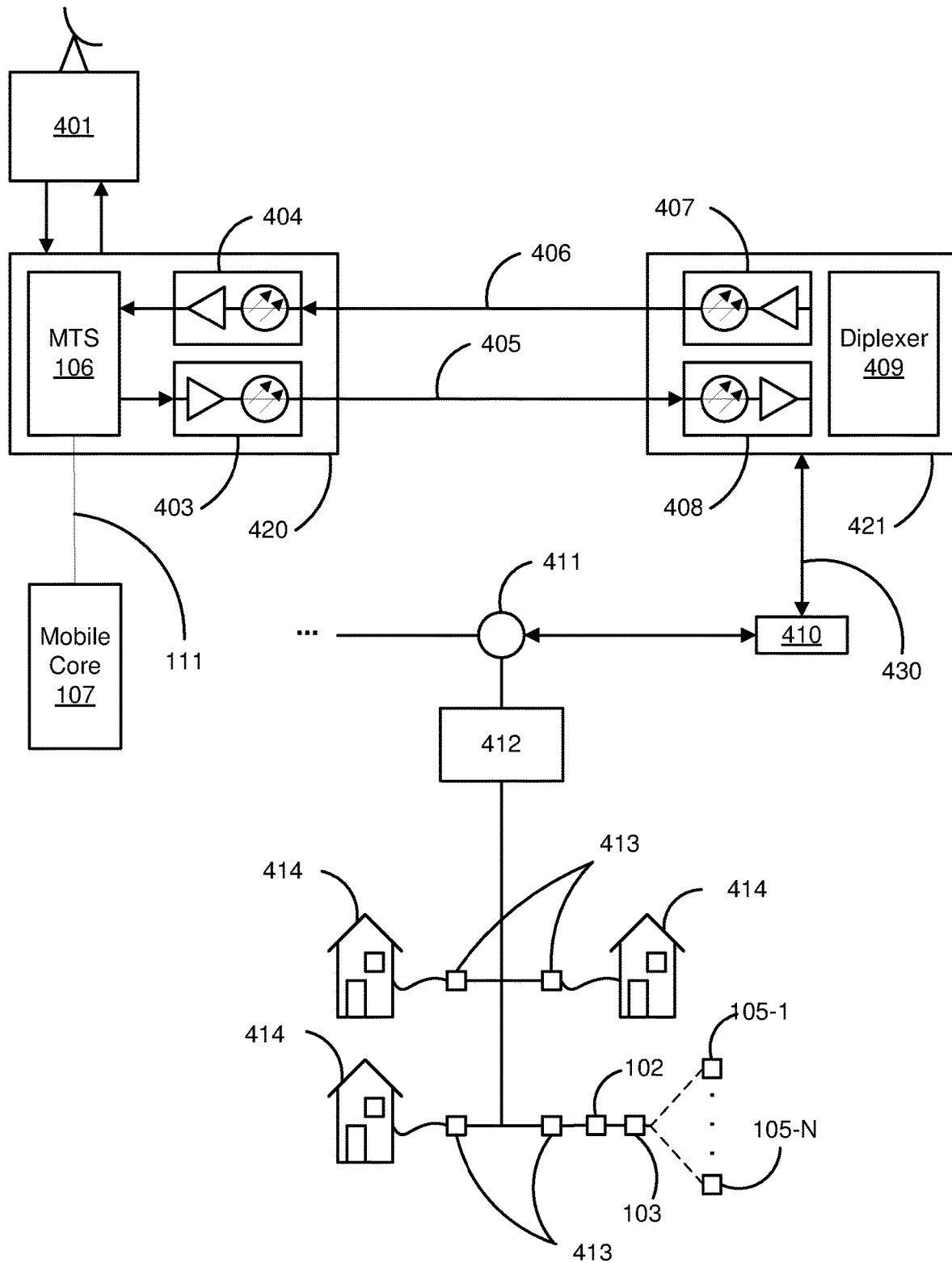
FIG. 8 is a block diagram of a cable network.

FIG. 8 is a block diagram of an exemplary system operable to provide wireless service for a plurality of UEs 105-1-105-N (where "N" is simply intended to represent an integer greater than "1" and not necessarily equal to any other "N" reference designated herein). For example, upstream and downstream links of an exemplary communication system offers high speed data services over connected devices, such as the modem 102. The modem 102 may be configured with or receive communications from the small cell 103 so as to allow the UEs 105 to communicate through the communication system in a manner that is transparent to the user.

The communication system includes a communication component 401 configured with an upstream hub 420. The hub 420 is coupled to a fiber node 421 via optical communication links 405 and 406. The hub 420 includes a Modem Termination System (MTS) 106 an electrical to optical converter 403, and an optical to electrical converter 404. The node 421 is similarly configured with an optical to electrical converter 408 and an electrical to optical converter 407.

The communication component 401 is the source for various communication signals. Antennas may receive communication signals that are converted as necessary and transmitted over fiber optic cables 405 to the hub 420. Several hubs may be connected to a single communication component 401 and the hub 420 may each be connected to several nodes 421 by fiber optic cable links 405 and 406. The MTS 106 may be configured in the communication component 401 or in the hub 420.

Downstream, such as in homes/businesses, are devices that operate as data terminals. These data terminals are modems. A modem can act as a host for an Internet Protocol (IP) device such as personal computer. However, the modem can be configured with a small cell so as to provide wireless services through the system for the UEs 105-1-105-N.

Transmissions from the MTS 106 to the modem are carried over the downstream portion of the communication system generally in the band between 54 MHz and 3 GHz, for example. Downstream digital transmissions are continuous and are typically monitored by many modems. Upstream transmissions from the modems to the MTS 106 are, for example, typically carried in the 5-600 MHz frequency band, the upstream bandwidth being shared by the Modems that are on-line. However, with greater demands for data, additional frequency bands and bandwidths are continuously being deployed in the downstream and upstream paths. It is also possible that Modems and the MTS engage in full duplex transmission modes, whereby concurrent transmissions on the upstream and the downstream over the same frequency is supported. Equivalent communications and protocols for fiber optic transmissions are also contemplated. For example using an optical network terminal (ONT) or optical line termination (OLT), and an optical network unit (ONU), and equivalent protocols such as EPON, RFOG, or GPON.

The MTS 106 connects the system to the Internet backbone. The MTS 106 connects to the downstream path through an electrical to optical converter 404 that is connected to the fiber optic cable 406, which in turn, is connected to an optical to electrical converter 408 at the node 421. The signal is transmitted to a diplexer 409 that combines the upstream and downstream signals onto a single cable. The diplexer 409 allows the different frequency bands to be combined onto the same cable. The downstream channel width in the United States is generally 6 megahertz to 192 MHz with the downstream signals being transmitted in the 54 MHz to 3 GHz band. Upstream signals are presently transmitted between 5 and 600 MHz, but again other bands are being considered to provide increased capacity.

After the downstream signal leaves the node 421, the signal is typically carried by a coaxial cable 430. At various stages, a power inserter 410 may be used to power the coaxial line equipment, such as amplifiers or other equipment. The signal may be split with a splitter 411 to branch the signal. Further, at various locations, bi-directional amplifiers 412 may boost and even split the signal. Taps 413 along branches provide connections to subscriber's homes 414 and businesses.

Upstream transmissions from subscribers to the hub 420/ headend 401 occur by passing through the same coaxial cable 430 as the downstream signals, in the opposite direction on a different frequency band. The upstream signals are sent typically utilizing Quadrature Amplitude Modulation (QAM) with forward error correction. The upstream signals can employ QPSK or any level of QAM, including 8 QAM, 32 QAM, 64 QAM, 128 QAM, 256 QAM, 512 QAM, 1024 QAM, and 4096 QAM. Modulation techniques such as Synchronous Code Division Multiple Access (S-CDMA) and Orthogonal Frequency Division Multiple Access (OFDMA) can also be used. Of course, any type of modulation technique can be used, as desired.

Upstream transmissions, in this embodiment, can be sent in a frequency/time division multiplexing access (FDMA/ TDMA) scheme. The diplexer 409 splits the lower frequency signals from the higher frequency signals so that the lower frequency, upstream signals can be applied to the electrical to optical converter 407 in the upstream path. The electrical to optical converter 407 converts the upstream electrical signals to light waves which are sent through fiber optic cable 405 and received by optical to electrical converter 403 in the node 420. The fiber optic links 405 and 406 are typically driven by laser diodes, such as Fabry Perot and distributed feedback laser diodes. Laser diodes begin to "lase" at a certain diode threshold current.

Figure 9:
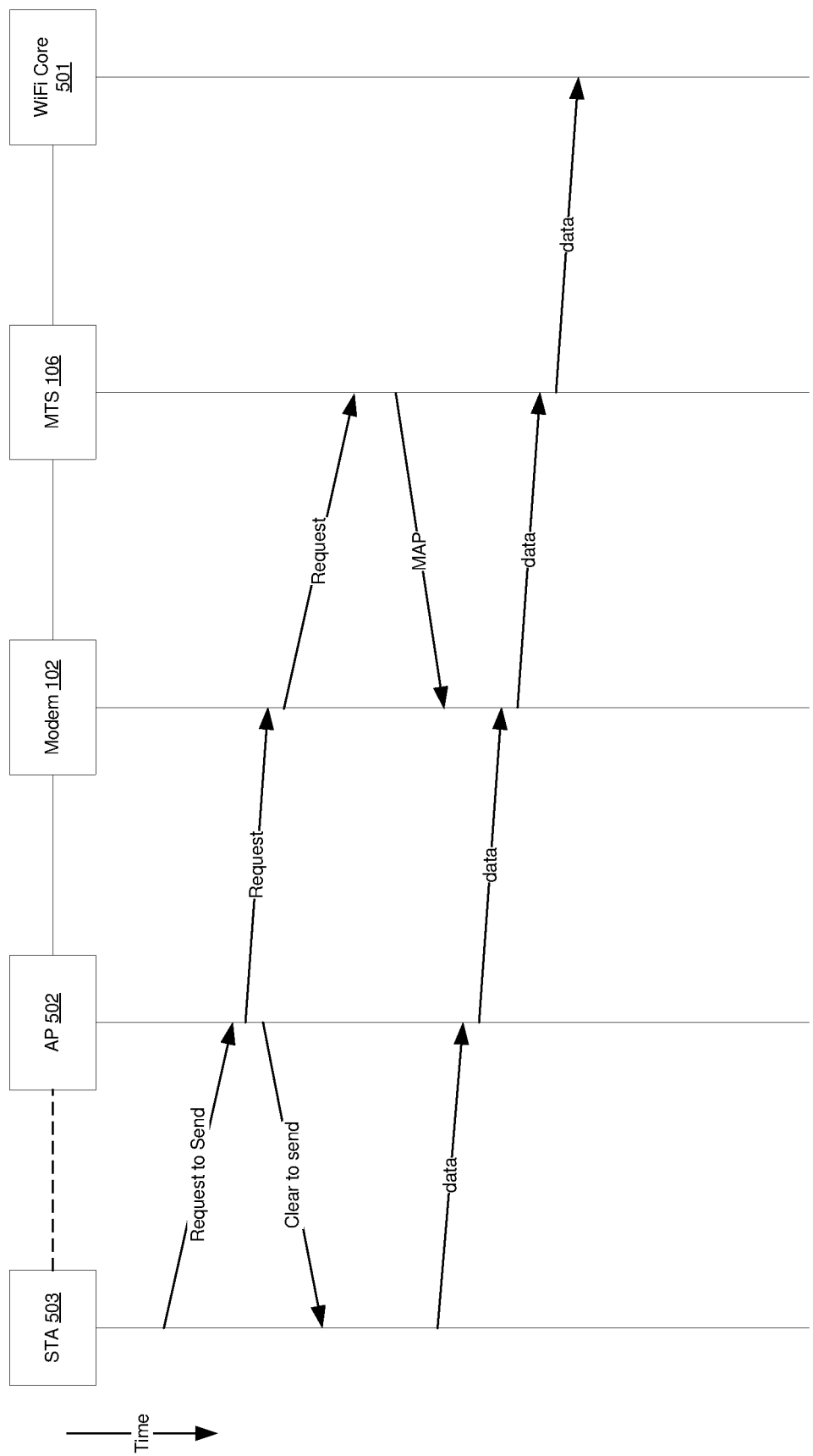
FIG. 9 is an exemplary communication diagram of the wireless service link employing WiFi.

FIG. 9 is an exemplary communication diagram of the wireless service link employing WiFi. In FIG. 9, the communication diagram is illustrated as part of a WiFi system that provides latency reduction in wireless service. In this regard, the communication link established between the modem 102 and the MTS 106 interfaces with a WiFi core 501 as well as an access point (AP) 502 (e.g., wireless access point or "WAP"). The AP 502 communicates with a WiFi station (STA) 503 such that the STA 503 can transmit data to the WiFi core 501.

The STA 503 issues a "request to send" to the AP 502 when the STA 503 needs to transmit data to the WiFi core 501. The AP 502 transfers a request to the modem 102 asking the modem 102 if the AP 502 can transfer the data of the STA 503. When the AP 502 determines that the STA 503 can transfer its data, the AP 502 transfers a "clear to send" to the STA 503. During this time, the modem 102 issues a request to transfer data to the MTS 106. And, the MTS 106 issues a MAP (or some other granting mechanism) to the modem 102 allowing the modem 102 to transfer the data of the STA 503.

From there, the modem 102 waits for the data from the AP 502. When the STA 503 transfers its data to the AP 502, the AP 502 transfers it directly to the modem 102 such that the modem 102 can transfer the data of the STA 503 through the communication link established between the modem 102 and the MTS 106. Once the MTS 106 receives the data of the STA 503, the MTS 106 transfers a data of the STA 503 to the WiFi core 501.

Figure 10:
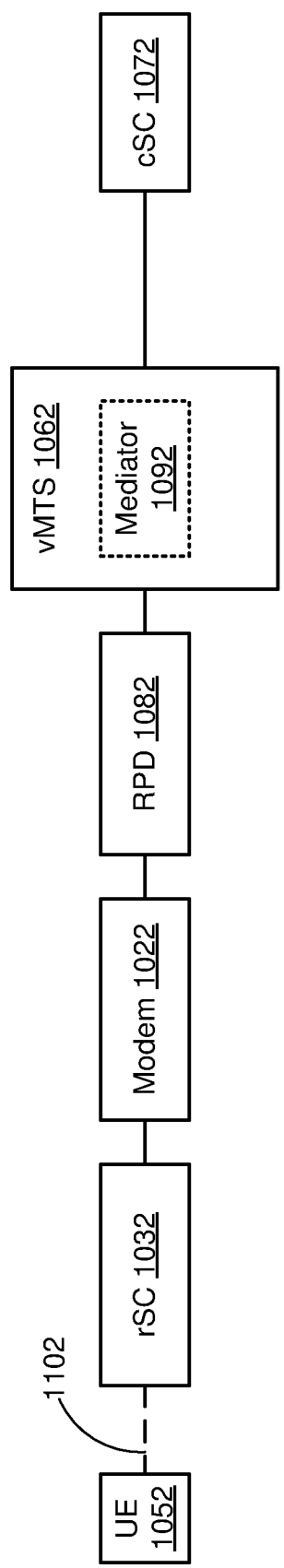
FIG. 10 is a block diagram of exemplary components implementing a virtualized wireless link with a communication link.

FIG. 10 is a block diagram of an exemplary communication link comprising a virtualized Modem Termination System (vMTS) 1062, a remote PHY device (RPD) 1082, and a modem 1022. The communication link is coupled with a virtualized wireless link (e.g., configured from a remote small cell (rSC) 1032 and a central small cell (cSC) 1072 described in greater detail below). It will be understood that a mediator 1092 may be integrated with or communicatively coupled with vMTS 1062. The vMTS 1026 may be, for example, a CMTS, a Fiber Node, a Fiber Hub, an optical line termination (OLT), or other termination device. Mediator 1092 may be implemented, for example, as a software agent in any of such devices. If mediator 1092 is integrated with a vMTS, integration may be via software or hardware. Mediator 1092 is operable to generate a backhaul grant (an example of which is shown as MAP/unsolicited grant in FIG. 14) for modem 1022 in response to a message to cSC 1072. The backhaul grant is transmitted close in time to the UL grant sent from cSC 1072 to UE 1052 such that modem 1022, which receives the backhaul grant, can prepare resources to backhaul the UE data at substantially the same time as the UE 1052 prepares and transmits the data to the modem 1022. This substantially parallel processing by the UE 1052 and the modem 1022 prepares the modem 1022 to backhaul the data when it arrives.

In alternative embodiments, mediator 1092 may be situated between vMTS 1062 and cSC 1072 or configured with or otherwise in communication with cSC 1072 such that mediator 1092 generates a backhaul grant in response to one or more of the BRS (or one or more wireless grants), an out of band message comprising UL grant information such as a UL grant summary (see FIG. 14), or the UL grant itself. As suggested above, mediator 1092 may be implemented as software or hardware, and may be formed within vMTS 1062 or cSC 1072, as a standalone device placed in the communication line between the vMTS 1062 and the cSC 1072, or as a component of the vMTS 1062 or the cSC 1072.

In an embodiment, one of vMTS 1062 and mediator 1092 generates one or more backhaul grants in response to one or more of the BSRs, one or more PHY Translated Messages (PTM) (see FIG. 14), or one or more wireless grants. In a related embodiment, the number of generated backhaul grants is fewer than the number of BSRs, PTMs, or wireless grants, and may be as few as one backhaul grant or as many as one less than the number of BSRs, PTMs, or wireless grants. In these and other embodiments, the vMTS or mediator 1092 aggregates the received BSRs, PTMs, or wireless grants to generate the one or more backhaul grant.

The UE 1052 may wirelessly communicate with other UEs (not shown) in a wireless service network for the purpose of transmitting and/or receiving data. A cSC 1072 (e.g., control portion of a virtualized wireless link) controls the operations of the UE 1052 within the wireless network. This includes, among other things, managing subscription information (e.g., data communication, data plans, roaming, international calling, etc.) and participating in processes that ensure that the UE 1052 can place calls and transmit data within the wireless network. Mediator 1092 cooperates with the vMTS to provide communications between the UE 1052 and the cSC 107 such that the cSC 1072 can control the operations of the UE 1052, for example, when the UE 1052 is within range of a "small cell," such as rSC 1032.

In the past, MNOs often maintained, operated, and controlled wireless base stations themselves for the purposes of providing communications with UEs. For example, an MNO employing LTE communications may operate a plurality of base stations in an area to provide wireless services to subscribing UEs in that area.

Now MSOs are capable of acting as backhaul operators. For example, MSOs may engage with MNOs for the purpose of providing alternative backhaul paths for communication between UEs, such as UE 1052, and the mobile core (not shown). MSOs and small/independent wireless operators currently employ wireless devices, such as the rSC 1032, for capturing a wireless data transmission and passing it through a backhaul system, as shown in FIG. 10. In the embodiment of FIG. 10, the backhaul system includes modem 1022, a RPD 1082, vMTS 1062, and meditator 1092. The rSC 1032 comprises many of the features of a larger base station such as the air-to-air interface 1102 and protocol handling. In some instances, the rSC 1032 may be a multi-radio hotspot providing for WiFi, as well as LTE Licensed Assisted Access (LTE-LAA) or LTE Unlicensed (LTE-U).

In an alternative embodiment wireless communication is WiFi communication and is between a STA (not shown) or a WiFi core (not shown). To modify the system of FIG. 10 to accommodate the WiFi embodiment the skilled artisan would replace UE 1052 with a WiFi station (STA), rSC 1032 with a Wi-Fi transceiver and relevant electronics, and the cSC 107 with a virtualized WiFi controller configured with or otherwise in communication with the Wi-Fi core.

Small cells and similar wireless technologies (collectively discussed and represented herein as small cells) represent new opportunities for MNOs. These new small cells allow operators to access additional spectrum, use existing spectrum more efficiently, and promote greater deployment flexibility, all at a lower cost. Small cells also reduce radio access network build-out and backhaul investment, while improving the end user experience by providing increased access to mobile networks. Additionally, because small cells are much smaller, they can reduce a base station's footprint and have less environmental impact (e.g., in terms of power consumption).

The MSOs and MNOs, evolving from different technologies, generally employ different communication protocols and offer little insight to each other. For example, the MSOs may employ the DOCSIS protocol to transport data to and from a modem 1022. The MNOs, on the other hand, may employ a variety of wireless protocols including EDGE (Enhanced Data rates for GSM Evolution), 2G, 3G, 4G, 5G, LTE, or the like. While the vMTS 1062 and the modem 1022 may be able to transport the wireless service traffic of the UE 1052, the vMTS 1062 and the modem 1022 need not process the data transmitted. Rather, the vMTS 1062 and the modem 1022 simply route the traffic between the appropriate parties. In the example of FIG. 10, traffic is routed between UE 1052 and cSC 1072 via rSC 1032, modem 1022, RPD 1082, and vMTS 1062.

This lack of insight by the backhaul system into the wireless system's data, and vice versa (e.g., LTE system into the DOCSIS system, and vice versa), previously caused the request to transmit data across the communication link to occur in a serial manner. For example, when the rSC 1032 provided a grant to the UE 1052 to transfer data to the rSC 1032, the modem 1022 and the vMTS 1062 were unaware that the rSC 1032 has provided a grant for a data transfer from the UE 1052. When the data arrived at the rSC 1032, it was then forwarded to the modem 1022. Only when the data arrives at the modem 102 from the rSC 1032 did the modem transmit a request to transmit the data to the vMTS 1062. The modem-to-MTS grant alerts the vMTS 1062 that the modem 1022 has data to transmit and requires resources to do so. The vMTS 1062 could then schedule resources for the modem 1022 and transmit a grant back to the modem 1022. The data would then be transferred from the modem 1022 to the vMTS 1062 and then forwarded on to the cSC 1072. This process of serial granting data transfers results in unnecessary latency.

In the case of high-priority data, such as voice data, the unnecessary latency may result in the data being irrelevant by the time it reaches the intended recipient. For example, the UE 1052 transfers blocks of data representing relatively small portions of a conversation. When some of the blocks of data are delayed, they may no longer be relevant to the conversation and are as such dropped. When this occurs regularly, the quality of the conversation and the user's quality of experience (QoS) are degraded significantly. Similar issues exist when non-voice data is transmitted across the network, such as signaling traffic, video data (live or stored), security data, access and control over remotely located resources, machine-to-machine applications, etc.

In one embodiment, the UE 1052 has issued a scheduling request to transfer data to the cSC 1072. For example, the rSC 1032 may be a wireless transceiver portion of an eNodeB operable to communicate in an LTE network, or a wireless transceiver portion of a Wi-Fi Access Point (AP) operable to communicate in a WiFi network. The UE 1052 (or Wi-Fi STA), when it needs to transfer data, issues a scheduling request (SR) to the cSC 1072. The cSC 1072 then determines when the UE 1052 can transfer data to the cSC 1072 and issues an uplink (UL) grant to the UE 1052. The UE 1052 then transfers its data to the cSC 1072 for subsequent processing, routing, and the like.

When the UE 1052 has data to transmit the preparation for the transmission process can be a multistep process by itself. For example, if the UE 1052 does not have a valid grant, the UE 1052 issues an SR then, after receiving the grant, transfers a bandwidth request message, in the present embodiment called a buffer status report (BSR), to the small cell indicating how much data it is requesting to be transferred. The small cell then issues the subsequent grant indicating the actual amount of data that can be transmitted. Upon receiving the grant, the UE 1052 transfers its data to the small cell.

To illustrate, the SR may be a 1 bit indicator that the PHY layer (e.g., in the rSC 1032) can decode. The rSC 1032 may then forward a PHY translated message based on the SR to the cSC 1072 via the communication link. The PHY translated message is then transmitted to the modem 1022, which generates a DOCSIS request message (REQ) to request resources to accommodate the forth coming BSR on the backhaul system. The vMTS 1062 may then generate a grant that is large enough to accommodate the BSR.

As mentioned, the communication link may be configured from at least the vMTS 1062 and the modem 1022 and the communication link is coupled with a virtualized wireless link. The components of the communication link, as well as the components of the virtualized wireless link, may be virtualized. For example, the components of FIGS. 11A and 11B illustrate block diagrams of protocol stack layers of a virtualized wireless links, shown in FIG. 11A as a vBS protocol stack 1302A in an LTE network embodiment and shown in FIG. 11B as a vBS protocol stack 1302B in an LTE network embodiment. FIGS. 12A and 12B illustrates block diagrams of MTS protocol stack layers 1312A and 1312B. The vBS protocol stack 1302A and 1302B comprise a plurality of protocol layers including a Packet Data Convergence Protocol (PDCP) 1202, Radio Link Control (RLC) 1212, an upper MAC layer 1222, a lower MAC layer 1232, and a physical interface (PHY) 1242. FIG. 11A differs from FIG. 11B in that PDCP 1202, RLC 1212, and upper MAC Layer 1222 are situated with cSC 1072A and lower MAC layer 1232 and PHY 1242 are situated in rSC 1032A in vBS protocol stack 1302A while PDCP 1202, RLC 1212, upper MAC Layer 1222, and lower MAC layer 1232 are situated with cSC 1072B and PHY 1242 is situated in rSC 1032B in vBS protocol stack 1302B. The MTS protocol stacks 1312A and 1312 B comprise a plurality of layers including the IP layer 1252, the MAC layer 1262, and the PHY 1272. FIG. 12A differs from FIG. 12B in that IP layer 1252 and the MAC layer 1262 are situated with vMTS 1062A and the PHY 1272A is situated with RPD 1082A in MTS protocol stack layers 1312A while IP layer 1252 is situated with vMTS 1062B and the MAC layer 1262 and the PHY 1272A are situated with RMPD 1082B in MTS protocol stack layers 1312B. It will be understood that all embodiments discussed herein are directed to embodiments utilizing vBS protocol stack 1302A and MTS protocol stack 1312A, but embodiments utilizing vBS protocol stack 1302B and MTS protocol stack 1312B are also contemplated and only require only minor modifications, which are well within the ability of the skilled artisan after reading the present disclosure.

In an embodiment, mediator 1092 is situated between a remote MAC/PHY device and a vMTS, such as between RMPD 1082B and vMTS 1062B, as shown in FIG. 12B.

Utilizing MTS protocol stack layers 1312B provides for an additional location mediator 1092 may be employed, namely between RMPD 1082B and vMTS 106B, which is not shown but is contemplated.

Functionality of the MTS 1312 may also be virtualized. For example, the PHY 1272 of the MTS 1312 may be implemented as a Remote PHY Device, such as RPD 1082 which has little to no intelligence, while the remaining core of the MTS 1312 (i.e., the IP 1252 and the MAC 1262) may be virtualized into a separate component, i.e., the vMTS 1062.

In a separate embodiment, RPD 1082 is replaced by a remote device (RD), not shown. RD is configured to implement the PHY layer and the MAC layer, similar to PHY 1272 and MAC 1262, respectively. In this embodiment IP 1252 remains within vMTS 1062.

In whatever configuration, the virtualized wireless link comprises the rSC 1032, and the cSC 1072.

In one embodiment, the SR is intercepted (or a copy is generated) during its transit from the rSC 1032 to the modem 1022. From there, the SR (or the copy) is unpacked and transmitted as an out of band message to the modem 1022. Once the modem 1022 learns of the SR, the modem 1022 can alert the vMTS 106 that it will need to transfer data when the modem 1022 receives it from the UE 105 (e.g., through the rSC 1032). Alternatively, the modem 1022 forwards the SR in a manner similar to that of any other received data. It is then up to the vMTS 1062 or mediator 1092 to process the SR.

Based on the foregoing, the UE 1052 is any device, system, software, or combination thereof operable to wirelessly communicate with a wireless service network using any one or more wireless protocols including, 2G, 3G, 4G, LTE, LTE-U, LTE-LAA, or the like, as well as with a WiFi network using any one or more wireless service protocols including 802.11ax. Examples of the UE 1052 include laptop computers, tablet computers, and cellular telephones, such as smart phones. The rSC 1032 is any device, system, software, or combination thereof operable to provide an air-to-air interface 1102 for communication with the UE 1052. Examples of the rSC 103 include WiFi access points and base stations, such as eNodeBs, operating as or part of a vBS in a wireless service network. The modem 1022 is any device, system, software, or combination thereof operable to provide data transfers with a MTS. Examples of the modem 1022 include but are not limited to a DOCSIS enabled set-top box, an Optical Network Unit or fiber optic modem, and a satellite modem.

The vMTS 1062 is any device, system, software, or combination thereof operable to communicate with the modem 1022 as well as to facilitate the transmission of wireless session data through the communication link. The cSC 1072 is any device, system, software, or combination thereof operable to provide higher layer wireless communication functionality and is in communication with a mobile core or mobile network (not shown). It will be understood that the control portion of the virtualized wireless link is located within or its functionality is configured within cSC 1072, but for simplicities sake the cSC 1072 is generally referred to herein as the control portion of the virtualized wireless link. However, the control portion of the virtualized wireless link may be implemented with fewer or more protocol layers shown in FIG. 11. Other exemplary embodiments are shown and described below.

Figure 13:
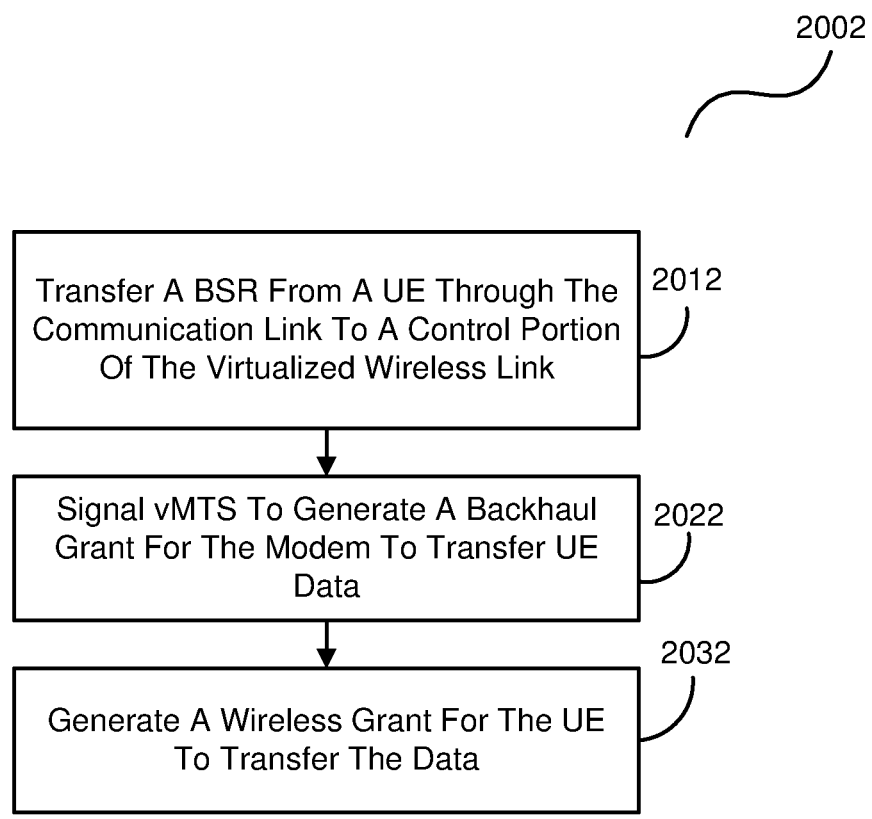
FIG. 13 is a flowchart illustrating an exemplary process operable with the communication link of FIG. 10.

FIG. 13 is a flowchart illustrating an exemplary process 2002 operable with the components of FIG. 10. In this embodiment, the UE 1052 has data to transmit to a mobile core (not shown) through the communication link. In this regard, the UE 1052 transfers a BSR through the communication link to a control portion of the virtualized wireless link (e.g., residing with the cSC 1072), in the process element 2012. In an LTE example of process element 2012, before the UE 1025 can transmit its data, the UE 1052 first issues a scheduling request (SR) to the rSC 1032. The rSC 1032 transfers the SR to the modem 1022 which forwards it through the communication link to the vMTS 1062 and ultimately to the cSC 1072, which grants permission for the UE 105 to transmit a BSR.

When UE 1052 receives the cSC 1072 issued grant, the UE 1052 transmits the BSR indicating how much data it has in its buffer and informs the cSC 1072 accordingly. Thus, when the cSC 1072 receives and processes the BSR, it determines what resources are needed by the UE 1052 for transmission. After processing of the BSR by the cSC 1072, the cSC 1072 ascertains the details of what the UE 1052 has to transmit. The cSC 1072 (or possibly the vMTS 1062), decides and then instructs the UE 1052 as to what will be transmitted. The cSC 1072 generates a wireless grant (e.g., an LTE grant) for the UE to transfer an amount of data on the virtualized wireless link and signals or otherwise provides processable data to the vMTS 1062A or 1062B of the MTS protocol stack 1312A, 1312B, which generates a backhaul grant for the modem 1022 to forward the amount of data from UE 1052 on the communication link, in the process element 2022. Alternatively or additionally, the vMTS 1062A or 1062B may comprise the functionality of the cSC 107 such that it may process the BSR to determine what the UE 1052 will transmit. Alternatively or additionally, the mediator 109 may reside between the vMTS 1062A or 1062B and the cSC 1072A or 1072 B (e.g., software, hardware, or a combination thereof) and may be enabled to unpack the LTE grant generated by the cSC 1072A or 1072B for processing and generating, for example, as an out of band message to the vMTS 1062A or 1062B. The out of band message provides information to the vMTS 1062A or 1062B so that it may generate a backhaul grant for transmission to the modem 1022.

In any case, the cSC 1072 generates the wireless grant based on the BSR, in the process element 2032. Since the cSC 1072 or the mediator 1092 is operable to inform the vMTS 1062 of the amount of data that is to be transmitted by the UE 1052 as well as the precise timing of the data transmission by the UE 1052, which has all been captured in the out of band message, the vMTS 1062 can issue a backhaul grant for the UE 105 to transfer its data at or about the same time the vMTS 1062 receives the LTE grant generated by the cSC 1072. This substantially simultaneous transmission of LTE and backhaul grants through the communication link greatly diminishes the latency involved with existing systems and methods.

Figure 14:
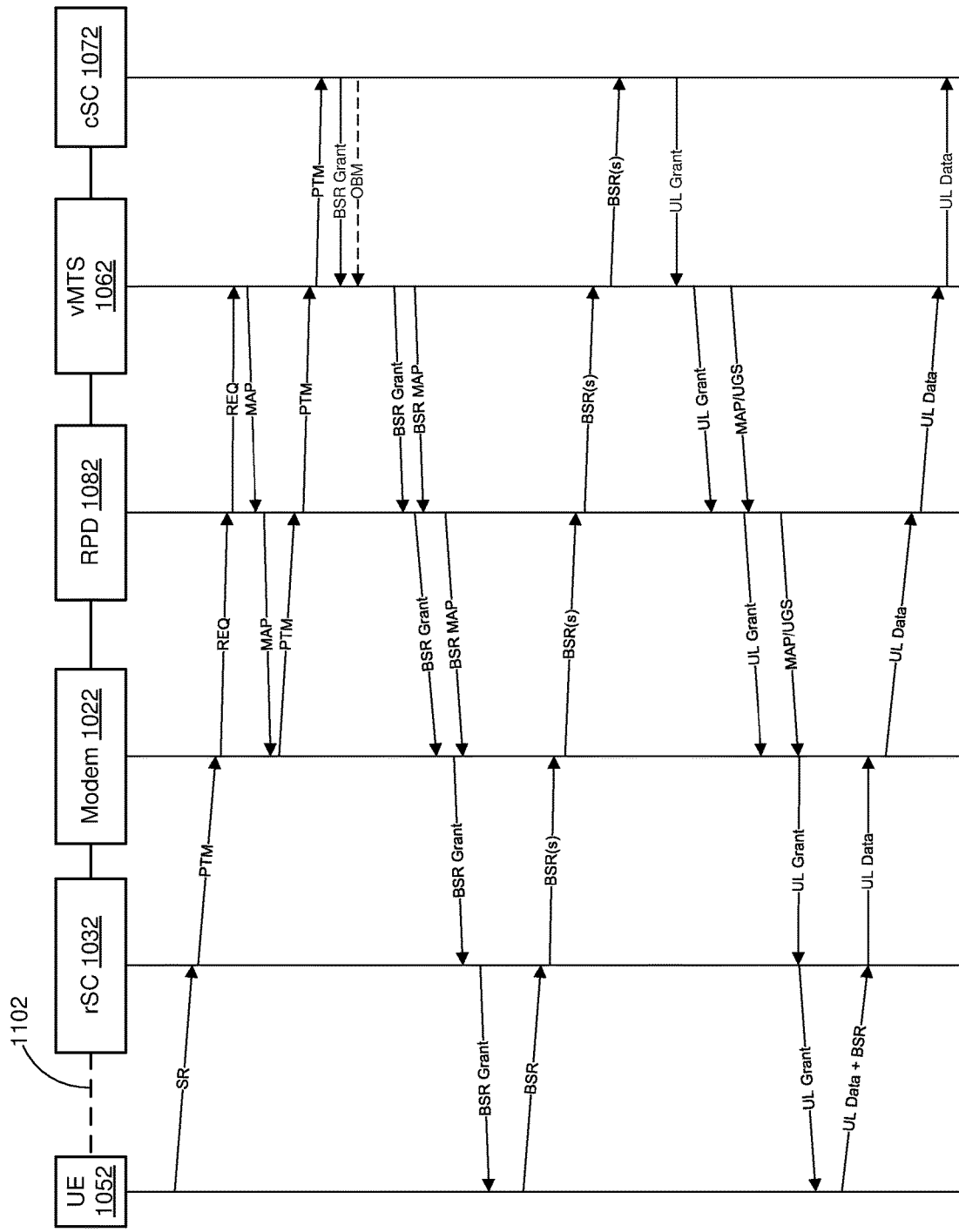
FIG. 14 is an exemplary communication diagram operable with components of FIG. 10.

FIG. 14 is an exemplary communication diagram of the components of FIG. 10. An SR-BSR process and a BSR-UL Data process are described. The SR-BSR process, which covers from the transmission of the SR from the UE 1052 to the receipt of the BSR Grant by the UE 1052, instructs the cSC 1072 that UE 1052 requires resources for the transmission of a BSR thereby satisfying the scheduling request (SR). The BSR-UL Data process, which covers from the transmission of the BSR by the UE 1052 to the receipt of the UL Data at the cSC 1072, satisfies the BSR, which is a request to transmit UL data. An exemplary SR-BSR process is described first, followed by an exemplary BSR-UL Data process.

The UE 1052 transmits a scheduling request (SR) to rSC 1032. The PHY 1242 (see FIG. 11) of the rSC 1032 processes the SR and generates a PHY translated message (PTM), which is sent to the modem 1022. In response to receiving the PTM, the modem 1022 generates and transmits a request for resources (REQ) to the vMTS 1062 via the RPD 1082A or RMPD 1082B (or a remote device (RD) as described above) such that modem 1022 may transmit the PTM to the vMTS 1062 and cSC 1072. Upon receipt of the REQ the vMTS 1062 generates and transmits a MAP to the modem 1022 via RPD 1082 such that modem 1022 may transmit the PTM to the vMTS 1062. Upon receipt of the MAP, the modem 102 transmits the PTM to the cSC 107 via RPD 108 and vMTS 1062. The cSC 1072 processes the PTM to issue a UL Grant back to the UE 105 and, optionally, an out of band message (OBM) to the vMTS 1062 which preemptively generates a MAP for the forthcoming BSR. The MAP for the BSR is then transmitted to the modem 1022, such that upon receipt of the BSR the modem 1022 is prepared to immediately forward the BSR to the cSC 1072. Alternatively an OBM is not utilized and the vMTS 1062, upon receipt of the BSR grant, generates a BSR MAP, which is sent to modem 1022 and utilized in the same manner as described above. Alternatively, the vMTS 1062A periodically polls the modem 1022 to see if the modem 1022 has SR or BSRs to transmit. Still alternatively, the vMTS 1062A provides to the modem 1022 periodic, small amount of grants sufficient to send one or multiple BSRs. In either case, the periodicity can be for example every 1 ms or longer. The grant size can be adapted according to the number of BSRs have been historically received in 1 ms time intervals. Based on the foregoing, BSRs can be forwarded immediately to the cSC 1072A by the modem 1022. Similar functionality exists within and between vMTS 1062B and cSC 1072B, with only minor modifications that would be apparent to the skilled artisan after reading the present disclosure.

In this embodiment, the UE 1052 has data to transmit, and as such, it issues a BSR to the rSC 1032. The rSC 1032 transfers the BSR to the modem 1022 which propagates it to the RPD 1082. The RPD 1082 prioritizes or is instructed to prioritize the transfer of BSR among other traffic it receives and then transfers the BSR to the vMTS 1062 and ultimately to the cSC 1072, which generates a grant of all or a portion of the UE 1052's UL data. In an embodiment, upon receiving the BSR, the cSC 1072 provides the vMTS 1062 (e.g., via an out of band signaling message) with data regarding the UL data grant, for example, with a UL Grant summary. The UL Grant summary may contain data pertaining to when and how much of the UL data from the UE 1052 was granted. This provides the vMTS 1062 with the data it requires to perform its scheduling and to generate a backhaul grant (e.g., a DOCSIS MAP or some other granting mechanism) for the UL data from the UE 1052. As described above, the backhaul grant is sent from the vMTS 1062 to modem 1022, shown in FIG. 14 as MAP/unsolicited grant.

Thus, when the vMTS 1062 receives the UL grant summary from the cSC 1072, the vMTS 1062 is operable to process it and generate the backhaul grant transmission to the modem 1022 at or about the same time as the vMTS 1062 transmits the UL grant (e.g., the wireless grant, also called a UL data grant herein) for the UL data of the UE 1052. The UL data grant and the backhaul grant propagate through the communication link until they reach their intended destinations. The RPD 1082 prioritizes or is instructed to prioritize the transfer of the UL data grant and the backhaul grant among other traffic it receives. For example, when the backhaul grant reaches the modem 1022, the modem 1022 is ready for the UL data from the UE 1052. And, when the UL grant reaches the UE 1052, the UE 1052 transfers its UL data to the rSC 1032 at its allocated time. Since the modem 1022 already has the backhaul grant, the modem 1022 can transmit the UL data from the UE 1052 at its allocated time, which may be as soon as it receives it from the rSC 1032.

Moreover, as the rSC 1032 may be communicating with a plurality of UEs 1052, the rSC 1032 may collect a plurality of BSRs from the UEs 105 and forward those to the modem 1022. The modem 1022 may transmit those to the vMTS 1062 which forwards them to the cSC 1072. In an out of band message, the cSC 1072 may summarize the amount of data of the UL grants that are to be issued to the plurality of UEs 1052. With this information, the vMTS 1062 can also provide unsolicited grants to the modem 1022 when capacity is available. But, the vMTS 1062 may do so with the knowledge that is not supplying too much granted capacity.

For example, the vMTS 1062 may be operable to issue unsolicited grant to the modem 1022 such that it may transfer data without requesting. The vMTS 1062 may retain size values of the BSRs, such that when the vMTS 1062 has spare capacity, the vMTS 1062 can better estimate how much spare data transfer capacity the modem 1022 might need in response to UL grants of the UEs 1052.

To illustrate, the vMTS 1062 may store in memory the amount of data associated with the data transfer (and optionally all previous UE data transfers). The vMTS 1062 may then be operable to issue unsolicited data transfer grants through an unsolicited grant or some other unsolicited grant based on that information. When the vMTS 1062 has spare capacity, the vMTS 1062 can transfer an unsolicited grant to the modem 1022 without being requested to do so such that the modem 1022 can transfer data (UE data and/or modem data) if it has any without delay associated with a request-grant process. By retaining the size value of the data associated with the previous UE data transfers (and optionally all previous UE data transfers), the vMTS 1062 can better estimate how much spare data transfer capacity can be issued through unsolicited grants and further decrease system latency.

In one illustration, UEs 1052(1)-(4) (not shown) request data transfers to the rSC 1032 at or about the same time. For example, UE 1052(1) needs to transmit two bytes of data, UEs 1052(2) and UEs 1052(3) need to transmit four bytes of data each, and UE 1052(4) needs to transmit six bytes of data, thus totaling 16 bytes of data. The rSC 1032 may combine the data transfer information into a BSR for transmission to the vMTS 1062. The vMTS 1062 may use this information to generate subsequent unsolicited grant of 16 bytes of data such that all of the data from UEs 1052(1)-(4) may be transferred at substantially reduced latency.

The vMTS 1062 may determine any type of typical unsolicited grant sizes for the modem 1022. For example, the vMTS 1062 may average the data sizes of BSRs from the rSC 1032 over time, may use data sizes of one or multiple UEs 105, may base the data sizes of the unsolicited grants on a time of day, or the like. In any case, when the vMTS 1062 has spare capacity and determines a size of the unsolicited grant, the vMTS 1062 may transfer the unsolicited to the modem 1022, such that the modem 1022 can transfer data of the UE 1052 that it receives from the rSC 1032.

Although shown or described in a particular form of messaging, the invention is not intended to be limited to the exemplary embodiment.

Figure 15:
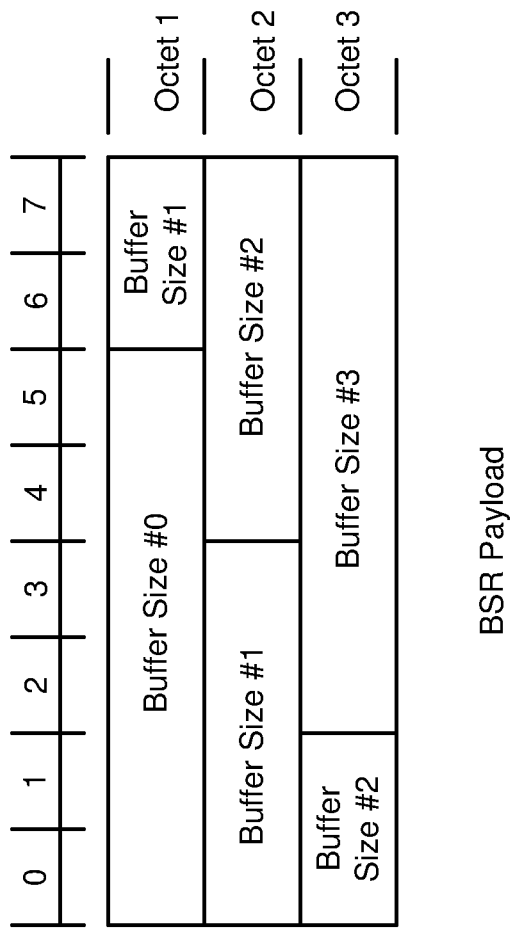
FIG. 15 is a block diagram of an exemplary BSR.

FIG. 15 is a block diagram of an exemplary buffer status report (BSR) operable with the components of FIG. 10. As mentioned, in LTE, the SR is typically a 1-bit indicator sent by UE 1052 to request UL bandwidth. But, the SR alone is not sufficient for a vBS. Rather, the vBS needs more information about a size of the data before it can grant a data transfer to the UE 105. So, the UE 1052 transmits a BSR. A media access control (MAC) scheduler generally assigns UL resources based on the BSR. So, the cSC 1072 sends a grant of sufficient size for the BSR.

As illustrated in FIG. 14, the BSR is configured as a 4-byte MAC control element that reports outstanding data for each of UE 1052's four logical channel groups. The mapping of a radio bearer (i.e., a logical channel) to a logical channel group (LCG) is done at the session setup time by rSC 1032 based on the corresponding Quality of Service (QoS) attributes of the radio bearers (e.g., QoS Class Identifier (QCI), an Allocation and Retention Priority (ARP), a Guaranteed Bit Rate (GBR), a Maximum Bit Rate (MBR), an Access Point Name-Aggregate Maximum Bit Rate (APN-AMBR), a UE-AMBR, etc.). For example, radio resource control (RRC) messages map to LCG0. The embodiments herein allow the LCG to be directly mapped to a DOCSIS upstream service flow.

The BSR message is also operable to indicate the amount and the QoS requirement of the data that the UE 1052 wishes to transfer to the rSC 1032. The LTE grant is generated by the rSC 1032 for the UE 1052 and indicates the amount of data the UE 1052 is to transmit, the time of transmission, and the QoS assignment of the data. Knowing the precise amount, the timing, and the QoS assignment of the expected data arrival at the rSC 1032 helps the vMTS 1062 to determine the size, timing, and the QoS assignment of the grant over the communication link. This will also give the vMTS 1062 ample time to schedule a grant for the modem 1022 to transfer data from the UE 1052 to the vMTS 1062 over the communication link.

Figure 16:
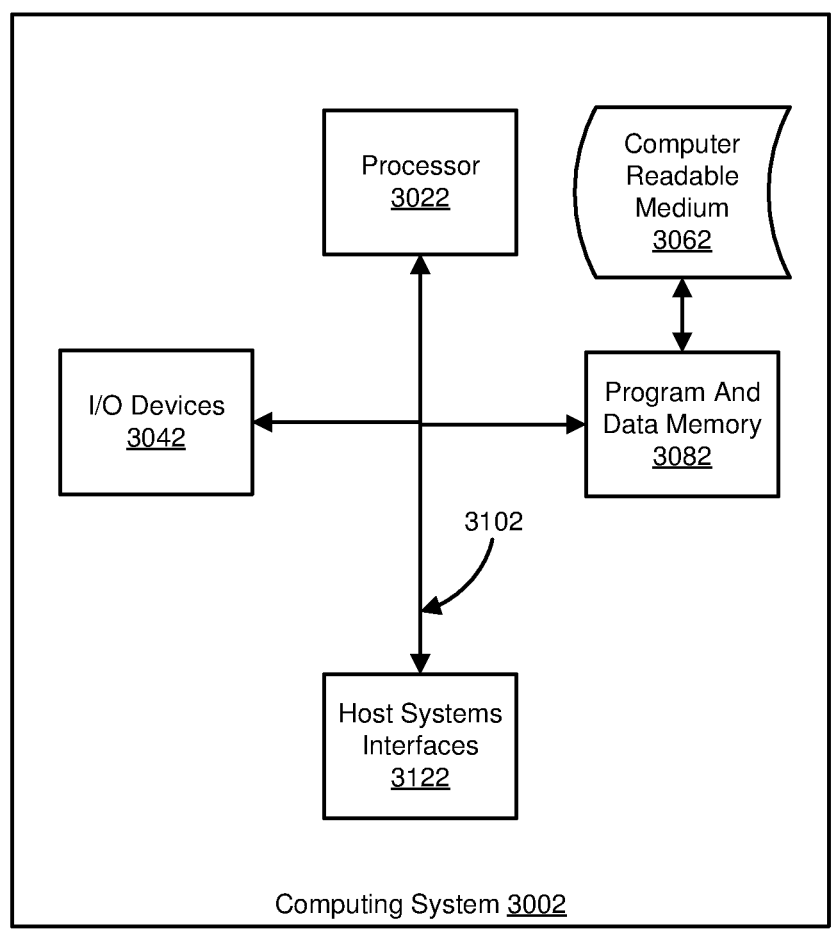
FIG. 16 is a block diagram of an exemplary computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 16 illustrates a computing system 3002 in which a computer readable medium 3062 may provide instructions for performing any of the methods disclosed herein.

Furthermore, the invention can take the form of a computer program product accessible from the computer readable medium 3062 providing program code for use by or in connection with a computer or any instruction execution system. For the purposes of this description, the computer readable medium 3062 can be any apparatus that can tangibly store the program for use by or in connection with the instruction execution system, apparatus, or device, including the computer system 3002.

The medium 3062 can be any tangible electronic, magnetic, optical, electromagnetic, infrared, or semiconductor system (or apparatus or device). Examples of a computer readable medium 3062 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 3002, suitable for storing and/or executing program code, can include one or more processors 3022 coupled directly or indirectly to memory 3082 through a system bus 3102. The memory 3082 can include local memory employed during actual execution of the program code, bulk storage, and cache memories which provide temporary storage of at least some program code in order to reduce the number of times code is retrieved from bulk storage during execution. Input/output or I/O devices 3042 (including but not limited to keyboards, displays, pointing devices, etc.) can be coupled to the system either directly or through intervening I/O controllers. Network adapters may also be coupled to the system to enable the computing system 3002 to become coupled to other data processing systems, such as through host systems interfaces 3122, or remote printers or storage devices through intervening private or public networks. Modems and Ethernet cards are just a few of the currently available types of network adapters.

Figure 17:
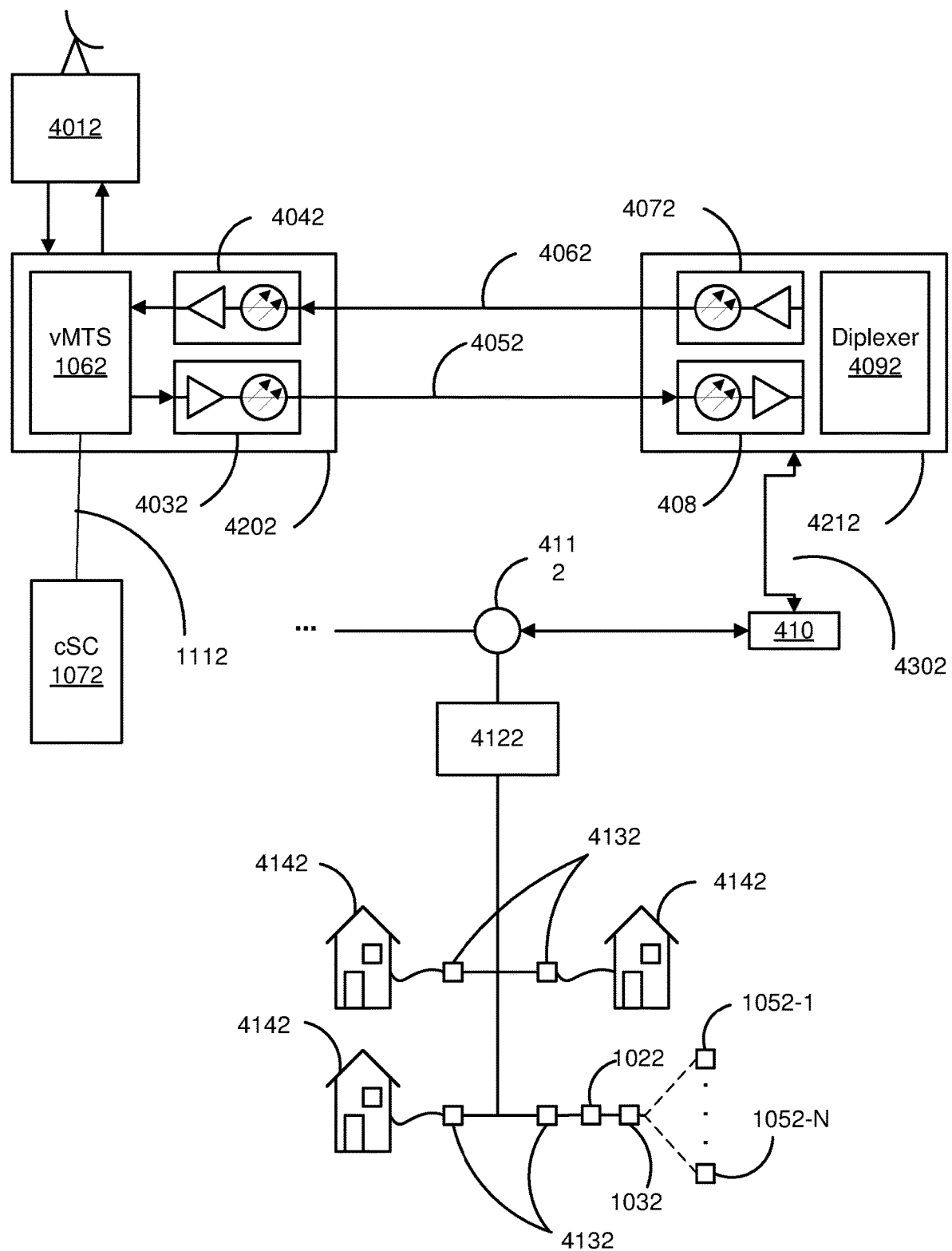
FIG. 17 is a block diagram of a communication system operable to implement the embodiments herein.

FIG. 17 is a block diagram of an exemplary system operable to provide wireless service for a plurality of UEs 1052-1-1052-N (where "N" is simply intended to represent an integer greater than "1" and not necessarily equal to any other "N" reference designated herein). For example, upstream and downstream links of an exemplary communication system offers high speed data services over connected devices, such as the modem 1022. The modem 1022 may be configured with or receive communications from the rSC 1032 so as to allow the UEs 1052 to communicate through the communication system in a manner that is transparent to the user.

The communication system includes a communication component 4012 configured with an upstream hub 4202. The hub 4202 is coupled to a fiber node 4212 via optical communication links 4052 and 4062. The hub 4202 includes a Modem Termination System (MTS) 1062 an electrical to optical converter 403, and an optical to electrical converter 4042. The node 4212 is similarly configured with an optical to electrical converter 4082 and an electrical to optical converter 4072.

The communication component 4012 is the source for various communication signals. Antennas may receive communication signals that are converted as necessary and transmitted over fiber optic cables 4052 to the hub 4202. Several hubs may be connected to a single communication component 401 and the hub 4202 may each be connected to several nodes 4212 by fiber optic cable links 4052 and 4062. The vMTS 1062 may be configured in the communication component 4012 or in the hub 4202.

Downstream, such as in homes/businesses, are devices that operate as data terminals, such as modem 1022. For example, a modem can act as a host for an Internet Protocol (IP) device such as personal computer. However, the modem can be configured with a small cell so as to provide wireless services through the system for the UEs 105-1-105-N.

In this embodiment, transmissions from the vMTS 1062 to the modem are carried over the downstream portion of the communication system generally in the band between 54 MHz and 3 GHz. Downstream digital transmissions are continuous and are typically monitored by many modems. Upstream transmissions from the modems to the vMTS 1062 are, for example, typically carried in the 5-600 MHz frequency band, the upstream bandwidth being shared by the Modems that are on-line. However, with greater demands for data, additional frequency bands and bandwidths are continuously being deployed in the downstream and upstream paths. It is also possible that modems and the MTS engage in full duplex transmission modes, whereby concurrent transmissions on the upstream and the downstream over the same frequency are supported. Equivalent communications and protocols for fiber optic transmissions are also contemplated, for example, using an optical network terminal (ONT) or optical line termination (OLT), and an optical network unit (ONU), and equivalent protocols such as EPON, RFOG, or GPON.

The vMTS 1062 connects the system to the Internet backbone. The vMTS 106 connects to the downstream path through an electrical to optical converter 4042 that is connected to the fiber optic cable 4062, which in turn, is connected to an optical to electrical converter 4082 at the node 4212. The signal is transmitted to a diplexer 4092 that combines the upstream and downstream signals onto a single cable. The diplexer 409 allows the different frequency bands to be combined onto the same cable.

After the downstream signal leaves the node 4212, the signal is may be carried by a coaxial cable 4302. At various stages, a power inserter 4102 may be used to power the coaxial line equipment, such as amplifiers or other equipment. The signal may be split with a splitter 4112 to branch the signal. Further, at various locations, bi-directional amplifiers 4122 may boost and even split the signal. Taps 4132 along branches provide connections to subscriber's homes 4142 and businesses.

Upstream transmissions from subscribers to the hub 4202/headend 4012 occur by passing through the same coaxial cable 4302 as the downstream signals, in the opposite direction on a different frequency band. The upstream signals may be sent typically utilizing Quadrature Amplitude Modulation (QAM) with forward error correction. The upstream signals can employ QPSK or any level of QAM, including 8 QAM, 32 QAM, 64 QAM, 128 QAM, 256 QAM, 512 QAM, 1024 QAM, and 4096 QAM. Modulation techniques such as Synchronous Code Division Multiple Access (S-CDMA) and Orthogonal Frequency Division Multiple Access (OFDMA) can also be used. Of course, any type of modulation technique can be used, as desired.

Upstream transmissions, in this embodiment, can be sent in a frequency/time division multiplexing access (FDMA/TDMA) scheme. The diplexer 4092 splits the lower frequency signals from the higher frequency signals so that the lower frequency, upstream signals can be applied to the electrical to optical converter 4072 in the upstream path. The electrical to optical converter 4072 converts the upstream electrical signals to light waves which are sent through fiber optic cable 4052 and received by optical to electrical converter 4032 in the node 4202. The fiber optic links 4052 and 4062 are typically driven by laser diodes, such as Fabry Perot and distributed feedback laser diodes.

Figure 18:
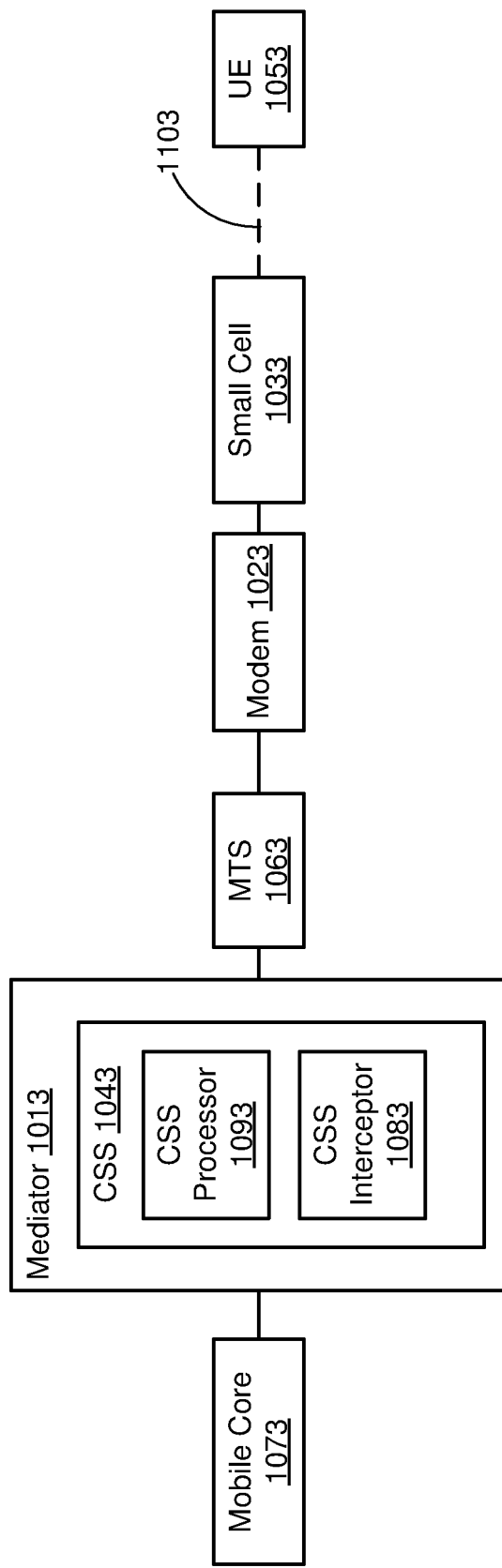
FIG. 18 is a block diagram of an exemplary wireless service link through an MTS.

FIG. 18 is a block diagram of an exemplary wireless service link. The wireless service link may include a mediator 1013 in communication with an MTS 1063. It will be understood that mediator 1013 may be integrated with or communicatively coupled with MTS 1063. The MTS 1063 may be, for example, a CMTS, a Fiber Node, a Fiber Hub, an optical network unit (ONU), or other termination device. Mediator 1013 may be implemented, for example, as a software agent in any of such devices. If mediator 1013 is integrated with an MTS, integration may be via software or hardware.

A UE 1053 may wirelessly communicate with other UEs (not shown) in a wireless service network for the purpose of transmitting and/or receiving data. A mobile core 1073 (e.g., operated by an MNO) controls the operations of the UE 105 within the wireless network. This includes, among other things, managing subscription information (e.g., data communication, data plans, roaming, international calling, etc.) and ensuring that the UE 1053 can initiate or receive data sessions and transmit data within the wireless network.

Mediator 1013 is implemented with a Communication Session System (CSS) 1043 having a CSS interceptor 1083 and a CSS processor. Mediator 1013, via CSS 1043, is operable to intercept and process messages, such as but not limited to LTE messages, between UE 1053 and mobile core 1073. CSS interceptor 1083 is operable to intercept a request for a wireless session between UE 105 and the mobile core 1073 servicing UE 1053. In an embodiment, CSS processor 1093 processes CSS interceptor 1083 intercepted setup information from the mobile core 1073, which is generated in response to the request. Based on the intercepted setup information CSS processor 1093 initiates a backhaul communication session (also called a "communication session" herein) between the modem 1023 and the MTS 1063 to deliver the wireless session through the communication session. CSS processor 1093 initiates the communication session prior to, during, or close in time to when the wireless session is set-up such that the set-up process time, that of both the communication session and the wireless session, is reduced. In one embodiment, the set-up of the backhaul communication session and the wireless session occur at least partially in parallel, thereby reducing the set-up process time.

The CSS 1043 may process the intercepted message and generate or otherwise provide data to MTS 1063 such that MTS 1063 may establish a communication session and a Quality of Service for the communication session between itself and the modem 1023. This may be done prior to, in parallel to, or close in time to the establishment of a wireless session by the mobile core 1073 with UE 1053, see below for more details. One or more of the components of the mediator 1013 and CSS 1043 may be integrated or in communication with the MTS 1063 via hardware, software, or combinations thereof.

In the past, MNOs often maintained, operated, and controlled wireless base stations themselves for the purposes of providing communications with UEs. For example, an MNO employing LTE communications may operate a plurality of eNodeBs in an area to provide wireless services to subscribing UEs in that area.

Now operators are capable of acting as backhaul operators. For example, MSOs are seeking to increase their value to the MNOs by providing alternative backhaul paths for communication between UEs, such as UE 1053, and the mobile core, such as mobile core 1073. MSOs and wireless operators currently employ wireless devices, a non-limiting example of which is small cell 1033, for capturing a wireless data transmission and passing it through a backhaul system, such as that shown in FIG. 18. In the embodiment of FIG. 18, the backhaul system includes modem 1023, MTS 1063, and optionally meditator 1013. The small cell 1033 comprises many of the features of a larger base station such as the air-to-air interface and protocol handling. In some instances, the small cell 1033 may be a multi-radio hotspot providing for Wi-Fi, as well as LTE Licensed Assisted Access (LTE-LAA) or LTE Unlicensed (LTE-U).

In an alternative embodiment communication is Wi-Fi communication and is between a STA (not shown) a Wi-Fi core (not shown). To modify the system of FIG. 18 to accommodate the Wi-Fi embodiment the skilled artisan would replace small cell 1033 with a Wi-Fi station (STA) and the mobile core 1073 with a Wi-Fi core.

Small cells and similar wireless technologies (collectively discussed and represented herein as small cells) represent new opportunities for MNOs. These new small cells allow operators to use existing spectrum more efficiently, and promote greater deployment flexibility, all at a lower cost. Small cells also reduce radio access network build-out while improving the end user experience by providing increased access to mobile networks. Additionally, because small cells are much smaller, they can reduce a base station's footprint and have less environmental impact (e.g., in terms of power consumption).

The MSOs and MNOs, evolving from different technologies, generally employ different communication protocols and offer little insight to each other. For example, the MSOs may employ the DOCSIS protocol to transport data to and from the modem 1023. The MNOs, on the other hand, may employ a variety of wireless protocols including EDGE (Enhanced Data rates for GSM Evolution), 2G, 3G, 4G, 5G, LTE, or the like. While the MTS 1063 and the modem 1023 may be able to transport the wireless service traffic of the UE 1053 and the mobile core 1073, the MTS 1063 and the modem 1023 need not process the data transmitted. Rather, the MTS 1063 and the modem 1023 may simply route the traffic between the appropriate parties. In the example of FIG. 18, traffic is routed between UE 1053 and mobile core 1073 via small cell 1033, modem 1023, and MTS 1063.

When a UE or a mobile core wants to establish a communication session with the other, the UE, small cell and mobile core exchange data sessions establishment with control signaling that includes QoS parameters. The QoS parameters describe a service quality for the data transmitted over the impending wireless session. To transport the wireless traffic of the UE 105 and the mobile core 1073, the MTS 1063 and the modem 1023 need to establish a communication session that allows a wireless session between the UE 1053 and the mobile core 1073 to occur. To ensure Quality of Experience (QoE) for the end user that consume the wireless session, the backhaul link between the MTS 1063 and the modem 1023 should have matching or similar QoS provisions as the QoS requirements exchanged between the UE 1053 and mobile core 1073.

However, the QoS information contained in the LTE signaling is unknown by the backhaul system. Since the MTS 1063 and the modem 1023 are unaware of the underlying wireless traffic, the MTS 1063 and the modem 1023 do not know when a wireless session is being established. So, the MTS 106 and the modem 1023 cannot understand what types of Quality of Service (QoS) need to be employed. For example, in LTE, the mobile core 1073 may need to establish QoS parameters for the UE 1053 based on the subscription information of the UE 1053 and the type of media being requested by the application in use by the UE 1053. LTE identifies QoS with a QoS Class Identifier (QCI), and can employ traffic prioritization such as Allocation and Retention Priority (ARP), a Guaranteed Bit Rate (GBR), a Maximum Bit Rate (MBR), an Access Point Name-Aggregate Maximum Bit Rate (APN-AMBR), a UE-AMBR, or some combination thereof.

This lack of insight by the backhaul system into the wireless session setup process and the associated QoS requirement for the session, affects the ability of the backhaul system to provide adequate QoS on the communication link between the modem 1023 and the MTS 1063. In case of high priority high bandwidth applications such as live video streaming, the MTS 1063 is not aware of the QoS requirements needed to transport the data between itself and the modem 1023. Thus, some blocks of data may be delayed such that they may no longer be relevant to the video and are therefore dropped. When this occurs regularly, the quality of a live streaming video and the user's quality of experience (QoE) are degraded significantly.

Now, even if the MTS 1063 becomes aware of the QoS requirement for the session requested by either the UE 105, or the mobile core 1073, the time it takes to set up adequate QoS provisions between the MTS 1063 and the modem 1023 adds latency to the existing wireless session setup process. Consequently, the end user's wireless session start time is delayed due to the serial setup processes (e.g., due to serial setup procedure of LTE and DOCSIS sessions), and the user's QoE is still affected.

The present embodiments provide for the backhaul QoS signaling (e.g., via a DOCSIS protocol) to be completed in parallel with the wireless session establishment (e.g., LTE wireless session establishment). The present embodiments therefore enable the backhaul system to become aware of the QoS requirement for the wireless traffic such that they provide for the provisioning of the wireless session(s) accordingly, as well as enables the provisioning process to occur without added latency.

In this embodiment, the MTS 1063 is configured to identify the various aspects of the wireless session. For example, the MTS 1063 may include a mediator 1013 comprising functionality of a gateway. In this regard, the MTS 1063 can intercept a request from the UE 1053 (e.g., via the CSS 1043) that indicates whether the UE 1053 needs to establish a session to transfer data to the mobile core 1073. This may direct the MTS 1063 to initiate the establishment of a communication session between the MTS 1063 and the modem 1023.

Alternatively or additionally, the MTS 1063 may be configured with functionality of the mobile core 1073 to decode and interpret LTE messages. For example, in a DOCSIS protocol embodiment, the MTS 1063 is a CMTS, and may include functionality of an LTE gateway that is operable to intercept a session establishment request from the UE 1053 indicating that it needs to start a wireless session to the mobile core 1073. This may direct the MTS 1063 to initiate the establishment of a communication session between the MTS 1063 and the modem 1023.

The MTS 1063, mediator 1013, and/or CSS 10 3 may also intercept a response to the request from the mobile core 1073 (e.g., via mediator 1013 or CSS 1043). For example, when the mobile core 1073 receives a request from the UE 1053, the mobile core 1073 establishes the requested wireless session between the mobile core 1073 and the UE 1053. This may include establishing the parameters of the QoS for the wireless session. The MTS 1063 may intercept this information and initiate the setup of the communication session between the MTS 1063 and the modem 1023 using those QoS parameters for the wireless session to ensure that the user of the UE 1053 has an acceptable QoE. The MTS 106 and the modem 1023 work together to ensure that the QoS of the transport properly matches or supports the QoS of the wireless session. The MTS 106 and the modem 1023 do so without unnecessarily consuming or reserving too many network resources. The operator determines how the QoS mechanism is applied to support the QoS Class Identifiers (QCIs), and configures these policy rules into the gateway, allowing the operator to optimize resources for QoS on their network.

Alternatively or additionally, the mobile core 1073 may communicate out of band signaling (00B) indicating that a wireless session between the mobile core 1073 and the UE 1053 is to be established. The MTS 1063, mediator 1013, and/or CSS 1043 are operable to detect that signaling and initiate or participate in the establishment of a communication session between the MTS 1063 and modem 1023 to accommodate the wireless session.

Because the MTS 1063, mediator 1013, and/or CSS 1043 intercepts the wireless session set-up data during the initiation of the wireless session, the communication session with the needed QoS can be established in parallel or at least partially in parallel to the wireless session rather than in series. For example, some operators may use DOCSIS network for backhauling traffic of the mobile core 1073. DOCSIS and radio networks, such as LTE, have separate scheduling algorithms that result in longer communication latencies. That is, a radio network schedules traffic from the UE 1053 differently than an MTS, such as an CMTS, schedules traffic from the modem 1023. This often results in the mobile core 107 needing to wait until the DOCSIS network completes a session establishment before the proper QoS session establishment can be completed. These embodiments overcome that by allowing the MTS 106 to establish the communication session with the modem 1023 substantially in parallel with the mobile core 1073 establishing the wireless session with the UE 1053.

Based on the foregoing, the UE 1053 is any device, system, software, or combination thereof operable to communicate wirelessly with a wireless network using any one or more wireless protocols including, 2G, 3G, 4G, 5G, LTE, LTE-U, LTE-LAA, or the like, as well as with a Wi-Fi network using any one or more wireless service protocols including 802.11ax. Examples of the UE 1053 include, but are not limited to, laptop computers, tablet computers, and wireless telephones such as smart phones. The small cell 1033 is any device, system, software, or combination thereof operable to provide an air-to-air interface 1103 for the mobile core 1073, one example of which is a Wi-Fi core. Examples of the small cell 103 include Wi-Fi access points and base stations operating as eNodeBs in a wireless network. The modem 1023 is any device, system, software, or combination thereof operable to provide data transfers with an MTS. Examples of the modem 102 include DOCSIS enabled set-top boxes, a Optical Network Unit or fiber optic modem, and a satellite modem. The MTS 1063 is any device, system, software, or combination thereof operable to communicate with the modem 1023 as well as provide a wireless service session through the communication link provided by the modem 102 3 and the MTS 1063.

Again, the CSS 1043 and its components may implement the functionality for establishing the communication session setup stated herein. The CSS 1043 may be any device, system, software, or combination thereof operable with or in the mediator 1013 and/or the MTS 1063 to implement said functionality. Other exemplary embodiments are shown and described below.

Figure 19:
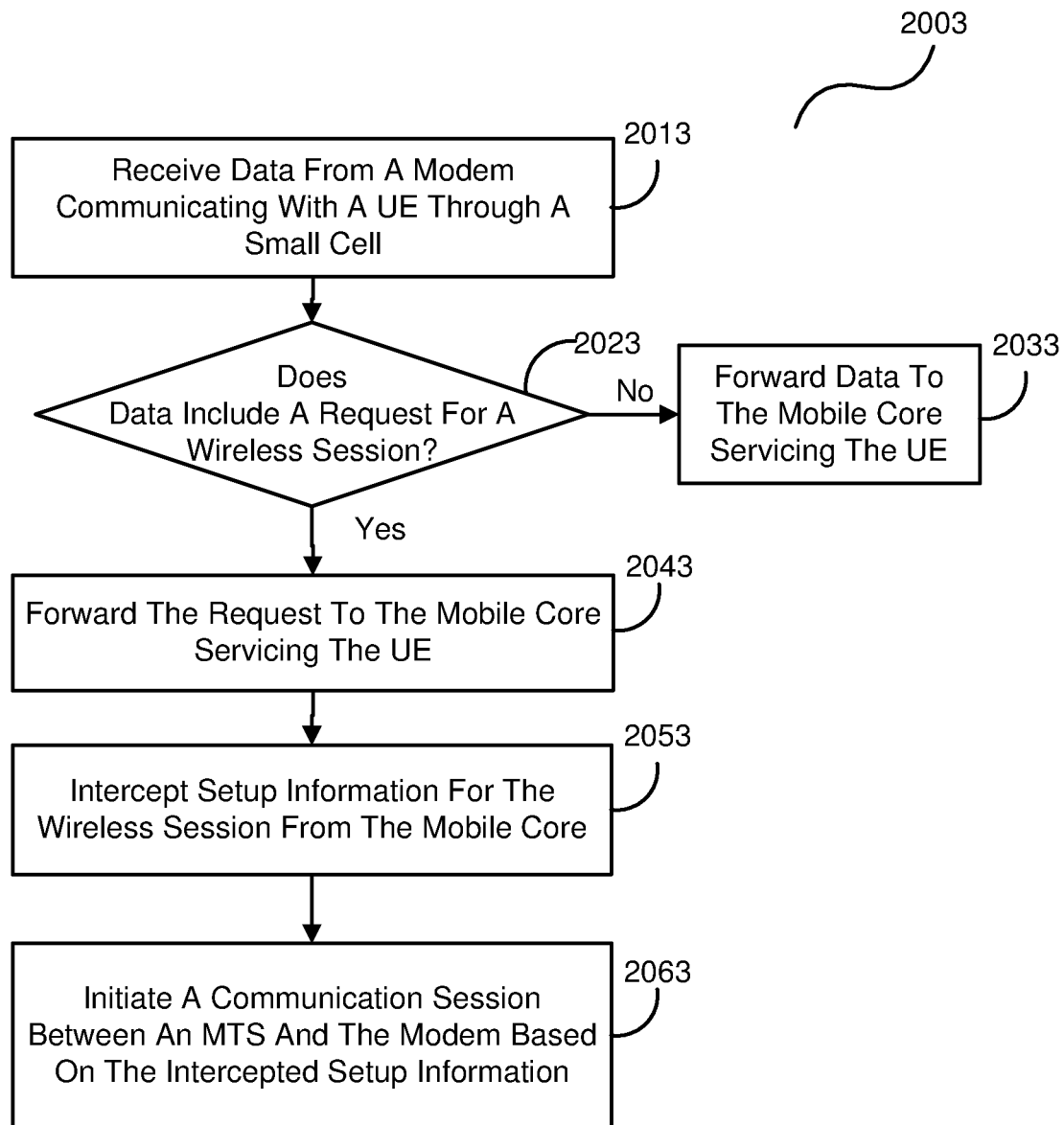
FIG. 19 is a flowchart illustrating an exemplary process operable with the MTS of FIG. 18.

FIG. 19 is a flowchart illustrating an exemplary process 2003 operable with the MTS 1063 of FIG. 18. In this embodiment, the small cell 103 communicates with the UE 1053 over the air-to-air interface 1103 and forwards any UE data to the modem 1023. The modem 1023 may forward the data to the MTS 1063. The CSS 104 receives the data, in the process element 2013, and determines whether the data includes a request for a wireless session, in the process element 2023. For example, the CSS 1043 may evaluate all or a portion of the data from the UE 10533 and determine whether the UE 1053 is transmitting a request to the mobile core 1073 such that the mobile core 1073 can establish a wireless session with UE 1053. Optionally mediator 1013, which in is communication with MTS 1063, determines whether the data includes a request for a wireless session.

If it is determined in process element 2023, the data from the UE 1053 does not contain such a request, the CSS 1043 simply forwards the data to the mobile core 1073 servicing the UE 1053, in the process element 2033, and process 2003 ends. If it is determined in process element 2023, the data from the UE 1053 does include a request to establish a wireless session, then the CSS 1043 forwards, or is optionally instructed by the mediator 1013 to forward, the request to the mobile core 1073, in the process element 2043. In an embodiment the CSS 104 may inspect traffic from the mobile core 1073 intended for the UE 1053. In this regard, the CSS 1043 may intercept setup information for wireless session from the mobile core 1073, in the process element 2053.

The CSS 1043 propagates the setup information to the modem 1023 such that it may forward the setup information to the small cell 1033 and to the UE 1053 over the air-to-air-interface 1103. This allows the mobile core 1073 to setup a wireless session with the UE 105. As the CSS 1043 has determined that the mobile core 1073 is setting up the wireless session with UE 1053, the CSS 1043 initiates a communication session between the MTS 106 and the modem 1023 based on the intercepted setup information, in the process element 2063. Thus, the MTS 1063 sets up its communication session with the modem 102 while the mobile core 107 is setting up its wireless session with the UE 1053, thereby reducing latencies associated with the differences between the wireless and wireline protocols.

Figure 20:
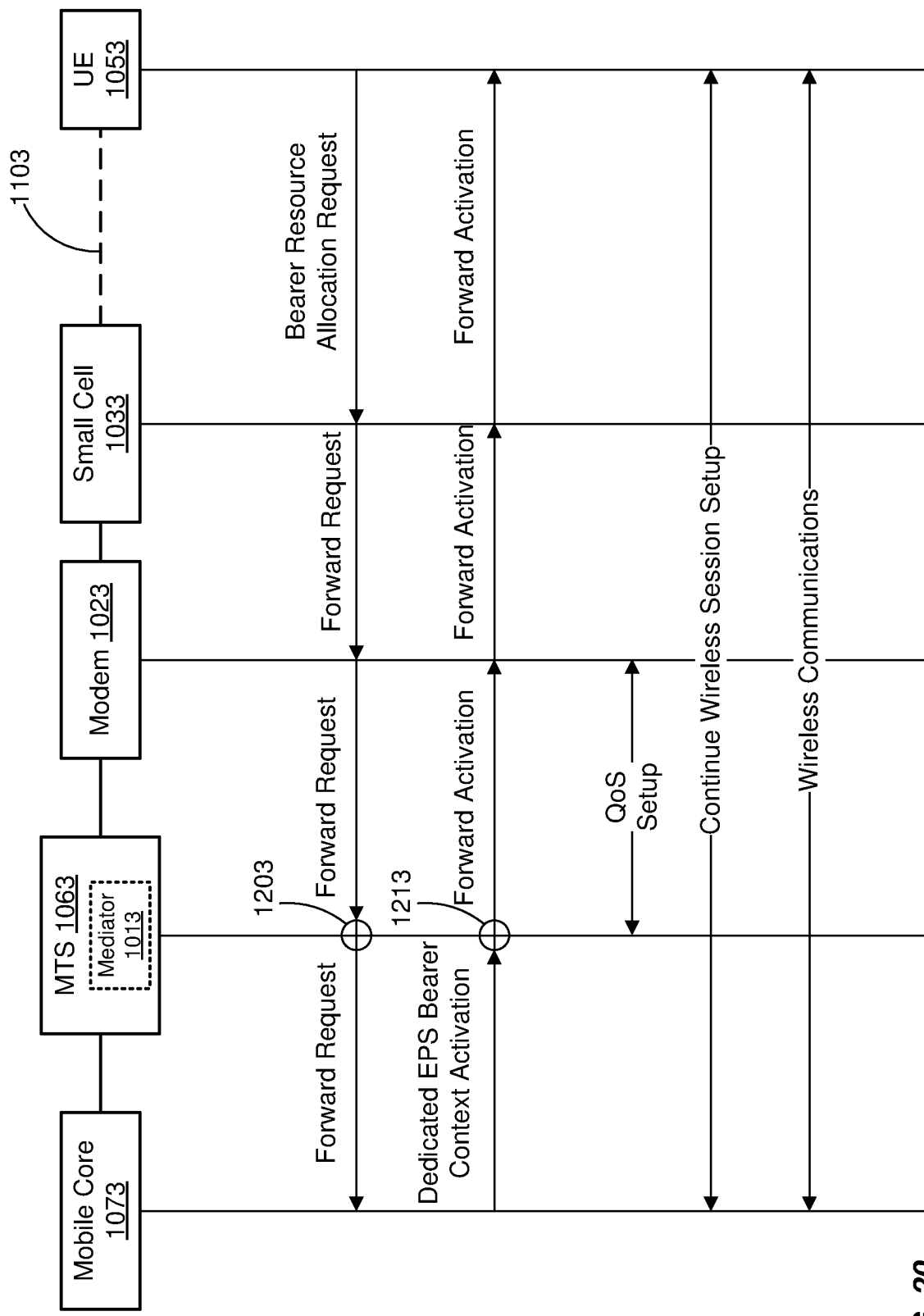
FIG. 20 is an exemplary communication diagram of the wireless service link of FIG. 18.

FIG. 20 is an exemplary communication diagram of the wireless service link of FIG. 18. In this embodiment, the small cell 1033 communicates with the UE 1053 over the air-to-air interface 1103 via a wireless protocol. Thus, when the UE 1053 communicates with the mobile core 1073, the UE 1053 communicates via the wireless protocol.

When the UE 1053 launches an application, the application may request a new wireless session through the mobile core 1073. Accordingly, the UE 1053 transfers a bearer resource allocation request to the mobile core 1073 via the small cell 1033. The small cell 1033 forwards the request to the modem 1023. The modem 1023 forwards the request onto the MTS 1063 over the communication link. The MTS 1063 or an associated mediator 1013 (e.g., via the functionality of the CSS 1043) may intercept the request (element 1203) and recognize it as a bearer resource allocation request from the UE 1053. This would allow the MTS 1063 or the associated mediator 1013, independently or cooperatively, to prepare for a response from the mobile core 1073 indicating that is about to establish a wireless session with the UE 1053.

The MTS 1063 or the associated mediator 1013 (e.g., via the functionality of the CSS 1043), independently or cooperatively, forwards the request to the mobile core 1073 and waits for the associated response. When the mobile core 1073 transfers a dedicated bearer context activation (e.g., an Evolved Packet System (EPS) bearer context activation), the MTS 1063 intercepts that activation message (element 1213) and processes all or a portion of the message to access to determine that the mobile core 1073 is establishing a wireless session with the UE 1053. Accordingly, the MTS 1063 extracts activation message data, such as but not limited to the QoS parameters, from the activation message. The MTS 1063 does this to establish, for example, the same or compatible QoS parameters with the communication session between the MTS 1063 and the modem 1023. Then, the MTS 1063 establishes a communication session between the MTS 1063 and the modem 1023 (e.g., via a DOCSIS Dynamic Service Flow (DSx) message), as well as forwards the activation message to the small cell 1033, which in turn forwards it to the UE 1053. Thus, the MTS 1063 establishes the setup of communication session after or substantially at the same time the wireless session is finalized. Once the wireless session is established, wireless communications can commence between the UE 1053 and the mobile core 1073 because the communication session between the MTS 1063 and the modem 1023 has already been established.

Figure 21:
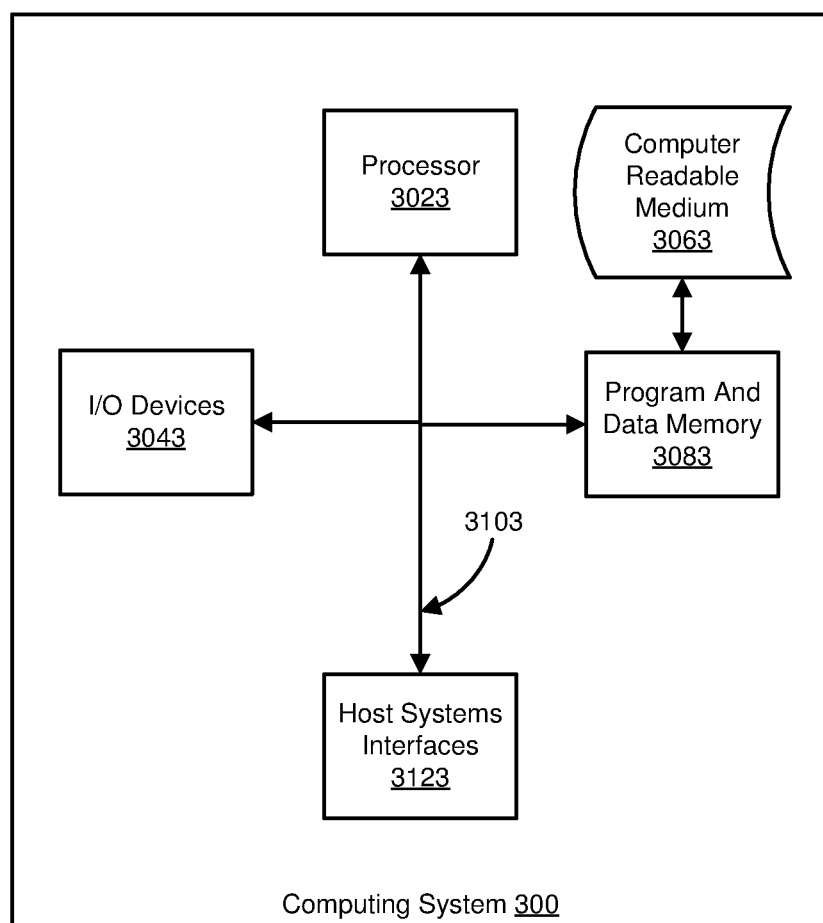
FIG. 21 is a block diagram of an exemplary computing system in which a computer readable medium provides instructions for performing methods herein.

The invention can take the form of an entirely hardware embodiment, an entirely software embodiment or an embodiment containing both hardware and software elements. Embodiments utilizing network functions virtualization (NFV) and virtualized hardware, such as a virtualized MTS, modem, etc., are also contemplated. In one embodiment, the invention is implemented in whole or in part in software, which includes but is not limited to firmware, resident software, microcode, etc. FIG. 21 illustrates a computing system 3003 in which a computer readable medium 3063 may provide instructions for performing any of the methods disclosed herein.

Furthermore, the invention can take the form of a computer program product accessible from the computer readable medium 3063 providing program code for use by or in connection with a computer or any instruction execution system. For the purposes of this description, the computer readable medium 306 can be any apparatus that can tangibly store the program for use by or in connection with the instruction execution system, apparatus, or device, including the computer system 3003.

The medium 3036 can be any tangible electronic, magnetic, optical, electromagnetic, infrared, or semiconductor system (or apparatus or device). Examples of a computer readable medium 3063 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 3003, suitable for storing and/or executing program code, can include one or more processors 3023 coupled directly or indirectly to memory 3083 through a system bus 3103. The memory 3083 can include local memory employed during actual execution of the program code, bulk storage, and cache memories which provide temporary storage of at least some program code in order to reduce the number of times code is retrieved from bulk storage during execution. Input/output or I/O devices 3043 (including but not limited to keyboards, displays, pointing devices, etc.) can be coupled to the system either directly or through intervening I/O controllers. Network adapters may also be coupled to the system to enable the computing system 3003 to become coupled to other data processing systems, such as through host systems interfaces 3123, or remote printers or storage devices through intervening private or public networks. Modems and Ethernet cards are just a few of the currently available types of network adapters.

Figure 22:
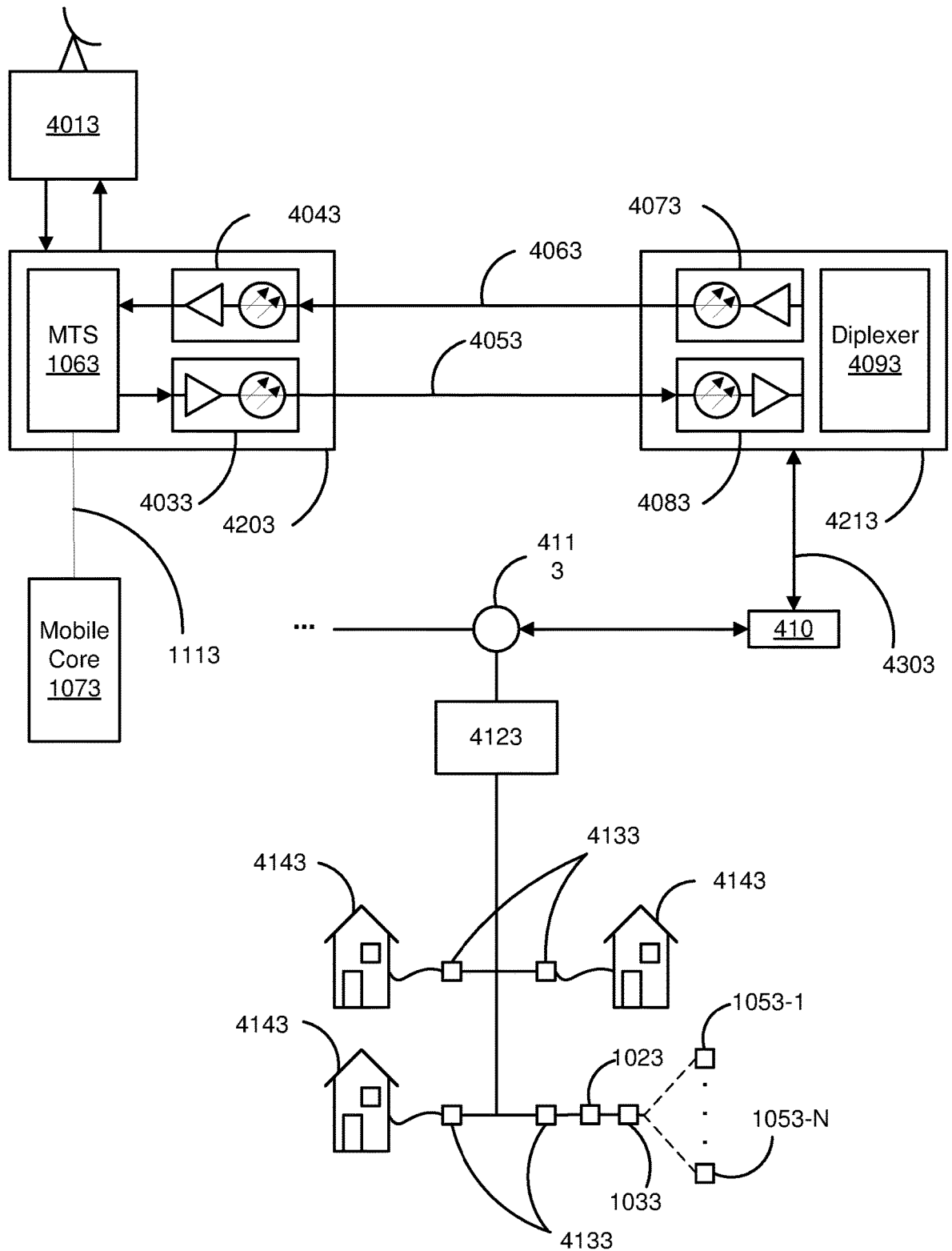
FIG. 22 is a block diagram of a communication system operable to implement the embodiments herein.

FIG. 22 is a block diagram of an exemplary system operable to provide wireless service for a plurality of UEs 1053-1-1053-N (where "N" is simply intended to represent an integer greater than "1" and not necessarily equal to any other "N" reference designated herein). For example, upstream and downstream links of the exemplary communication system offers high speed data services over connected devices, such as the modem 1023. The modem 1023 may be configured with or receive communications from the small cell 1033 so as to allow the UEs 1053 to communicate through the communication system in a manner that is transparent to the user.

The communication system includes a communication component 4013 configured with an upstream hub 4203. The hub 4203 is coupled to a fiber node 4213 via optical communication links 4053 and 4063. The hub 4203 includes an MTS 1063, an electrical to optical converter 4033, and an optical to electrical converter 4043. The node 4213 is similarly configured with an optical to electrical converter 4083 and an electrical to optical converter 4073.

The communication component 4013 is the source for various communication signals. Antennas may receive communication signals that are converted as necessary and transmitted over fiber optic cables 4053 to the hub 4203. Several hubs may be connected to a single communication component 401 and the hub 4203 may each be connected to several nodes 4213 by fiber optic cable links 4053 and 4063. The MTS 1063 may be configured in the communication component 4013 or in the hub 4203.

Downstream, such as in homes/businesses, are devices that operate as data terminals. These data terminals are modems. A modem can acts as a host for an Internet Protocol (IP) device such as personal computer. However, the modem can be configured with a small cell so as to provide wireless services through the system for the UEs 1053-1-1053-N.

In this embodiment, transmissions from the MTS 1063 to the modem 102 are carried over the downstream portion of the communication system generally in the band between 54 MHz and 3 GHz, for example. Downstream digital transmissions are continuous and are typically monitored by many modems. Upstream transmissions from the modems to the MTS 1063 are, for example, typically carried in the 5-600 MHz frequency band, the upstream bandwidth being shared by the Modems that are on-line. However, with greater demands for data, additional frequency bands and bandwidths are continuously being deployed in the downstream and upstream paths. It is also possible that modems 1023 and the MTS 1063 engage in full duplex transmission modes, whereby concurrent transmissions on the upstream and the downstream over the same frequency is supported. Equivalent communications and protocols for fiber optic transmissions are also contemplated, for example, using an optical network terminal (ONT) or optical line termination (OLT), and an optical network unit (ONU), and equivalent protocols such as EPON, RFOG, or GPON.

The MTS 1063 connects the system to the Internet backbone. The MTS 106 connects to the downstream path through an electrical to optical converter 4043 that is connected to the fiber optic cable 4306, which in turn, is connected to an optical to electrical converter 4083 at the node 4213. The signal is transmitted to a diplexer 4093 that combines the upstream and downstream signals onto a single cable. The diplexer 4093 allows the different frequency bands to be combined onto the same cable.

After the downstream signal leaves the node 4213, the signal is typically carried by a coaxial cable 4303. At various stages, a power inserter 4103 may be used to power the coaxial line equipment, such as amplifiers or other equipment. The signal may be split with a splitter 4113 to branch the signal. Further, at various locations, bi-directional amplifiers 4123 may boost and even split the signal. Taps 4133 along branches provide connections to subscriber's homes 4143 and businesses.

Upstream transmissions from subscribers to the hub 4203/headend 4013 occur by passing through the same coaxial cable 4303 as the downstream signals, in the opposite direction on a different frequency band. The upstream signals are sent typically utilizing Quadrature Amplitude Modulation (QAM) with forward error correction. The upstream signals can employ QPSK or any level of QAM, including 8 QAM, 32 QAM, 64 QAM, 128 QAM, 256 QAM, 512 QAM, 1024 QAM, and 4096 QAM. Modulation techniques such as Synchronous Code Division Multiple Access (S-CDMA) and Orthogonal Frequency Division Multiple Access (OFDMA) can also be used. Of course, any type of modulation technique can be used, as desired.

Upstream transmissions, in this embodiment, can be sent in a frequency/time division multiplexing access (FDMA/TDMA) scheme, or Orthogonal Frequency Division Multiple Access (OFDMA). The diplexer 4093 splits the lower frequency signals from the higher frequency signals so that the lower frequency, upstream signals can be applied to the electrical to optical converter 4073 in the upstream path. The electrical to optical converter 4073 converts the upstream electrical signals to light waves which are sent through fiber optic cable 4053 and received by optical to electrical converter 4033 in the node 4203. The fiber optic links 4053 and 4063 are typically driven by laser diodes, such as Fabry Perot and distributed feedback laser diodes.

Figure 23:
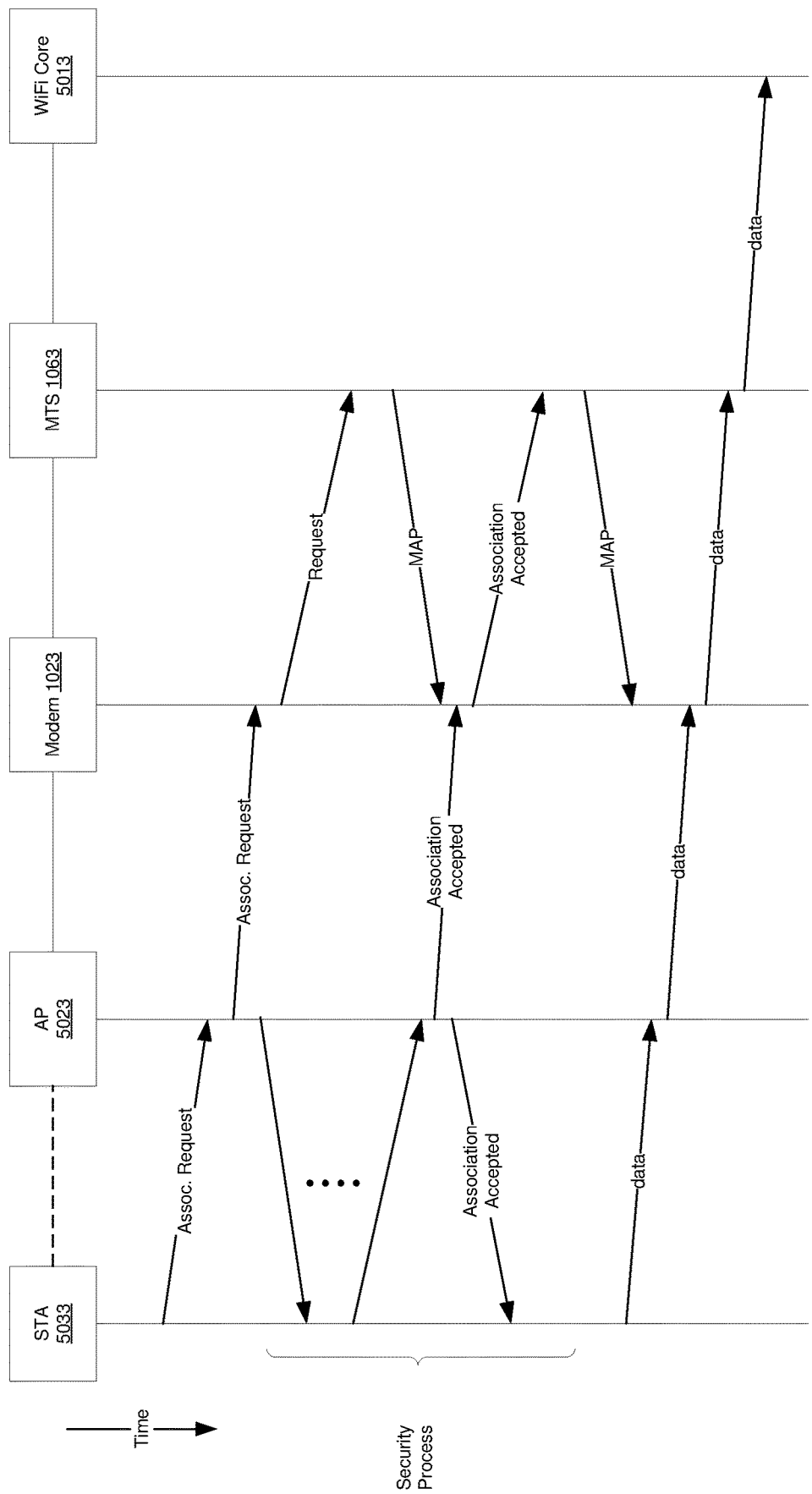
FIG. 23 is an exemplary communication diagram of the wireless service link employing Wi-Fi.

FIG. 23 is an exemplary communication diagram of the wireless service link employing Wi-Fi. In FIG. 23, the communication diagram is illustrated as part of a Wi-Fi association setup. In this regard, the communication link established between the modem 1023 and the MTS 1063 interfaces with a Wi-Fi core 5013 as well as an access point (AP) 5023 (e.g., wireless access point or "WAP"). The AP 5023 communicates with a Wi-Fi station (STA) 5033 such that the STA 5033 can transmit data to the Wi-Fi core 5013.

When the STA 5033 needs to transmit data to the Wi-Fi core 5013, the STA 5033 issues an "association request" to the AP 502.3. The AP 5023 transfers the association request to the modem 1023 which, in turn, issues a request to the MTS 1063 to transfer data. The MTS 1063 transfers a MAP (or some other granting mechanism) to the modem 1023 granting the modem 1023 a data transfer. At or about the same time, the AP 5023 communicates with the STA 5033 as part of a security process until the AP 5023 accepts the association with the STA 5033.

When the AP 5023 accepts the association with the STA 5033, the AP 502 forwards the accepted association to the modem 1023 such that it may transfer the accepted association to the MTS 1063. The MTS 1063 transfers a MAP (or some other granting mechanism) to the modem 1023 such that it can prepare for the data from the STA 5033. And, when the STA 5033 receives the accepted association from the AP 5023, the STA 5033 begins to transfer its data. As the communication link between the modem 1023 and the MTS 1063 has already been established, the AP 5023 can simply transfer the data to the Wi-Fi core 5013 through the granted communication link between the modem 1023 and the MTS 1063.

Figure 24:
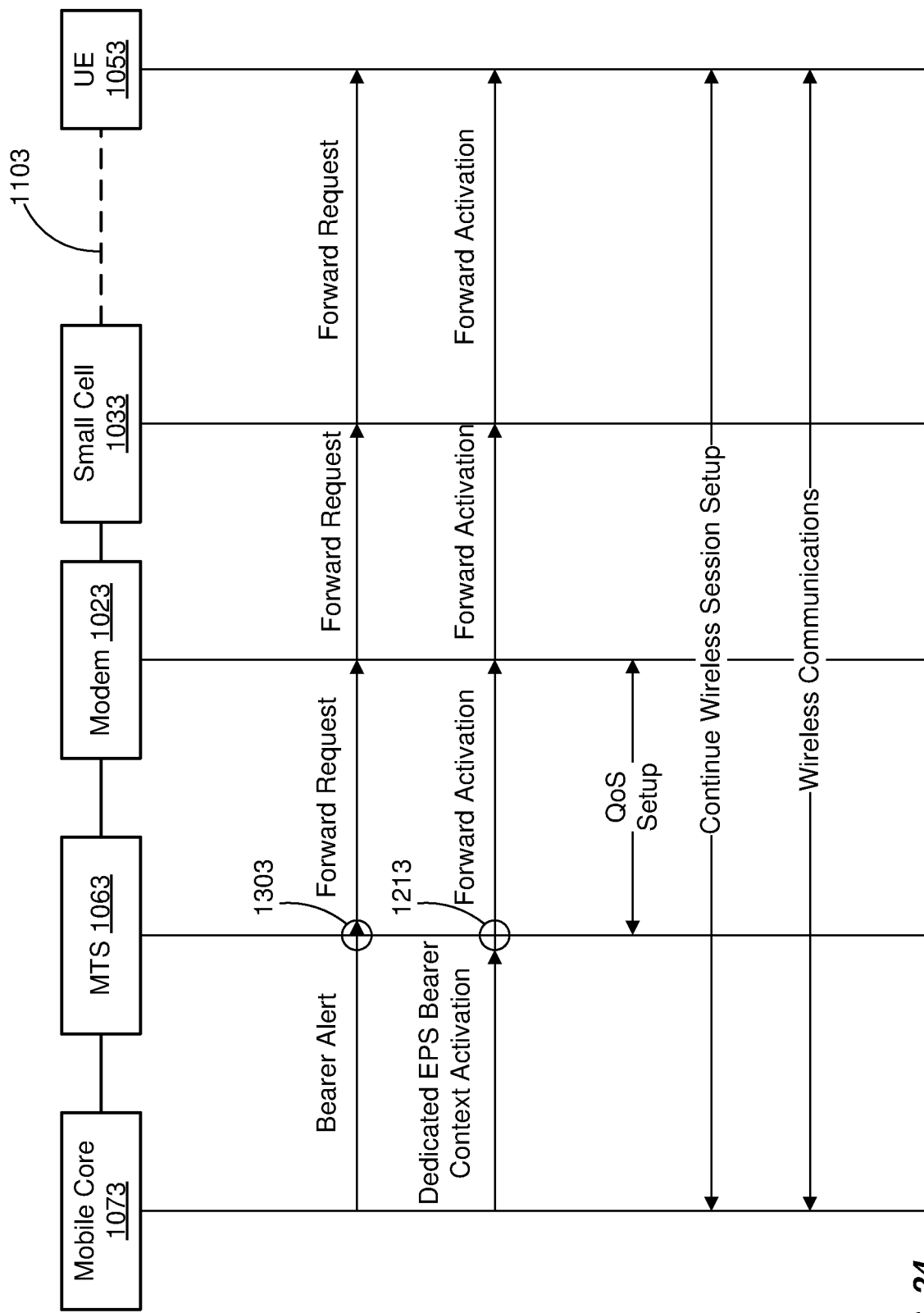
FIG. 24 is an exemplary communication diagram of the wireless service link of FIG. 18 illustrating a network initiated session.

FIG. 24 is an exemplary communication diagram of the wireless service link of FIG. 18 illustrating a network initiated session. In this embodiment, the mobile core 1073 transfers a bearer alert to the MTS 1063. The MTS 1063 may intercept the alert (element 1303) and recognize it as a network initiated bearer alert for the UE 1053. This would allow the MTS 1063 to prepare to respond to the impending wireless session establishment by preparing to set up a communication session on between the MTS 1063 and the modem 1023. The MTS 1063 then transfers the alert to the UE 1053 through the modem 1023 and the small cell 1033. Again, the small cell 1033 communicates with the UE 1053 over the air-to-air interface 1103 via a wireless protocol. Thus, when the UE 1053 communicates with the mobile core 1073, the UE 1053 communicates via the wireless protocol. From there, the mobile core 1073 transfers a dedicated bearer context activation (e.g., a Evolved Packet System (EPS) bearer context activation), the MTS 1063 intercepts that activation message (element 1213) and understands that the mobile core 1073 is establishing a wireless session with the UE 1053, and in turn, initiates a session setup on the communication link (e.g., via DSx for DOCSIS). The communications continue as with that shown and described in FIG. 20.

Figure 25:
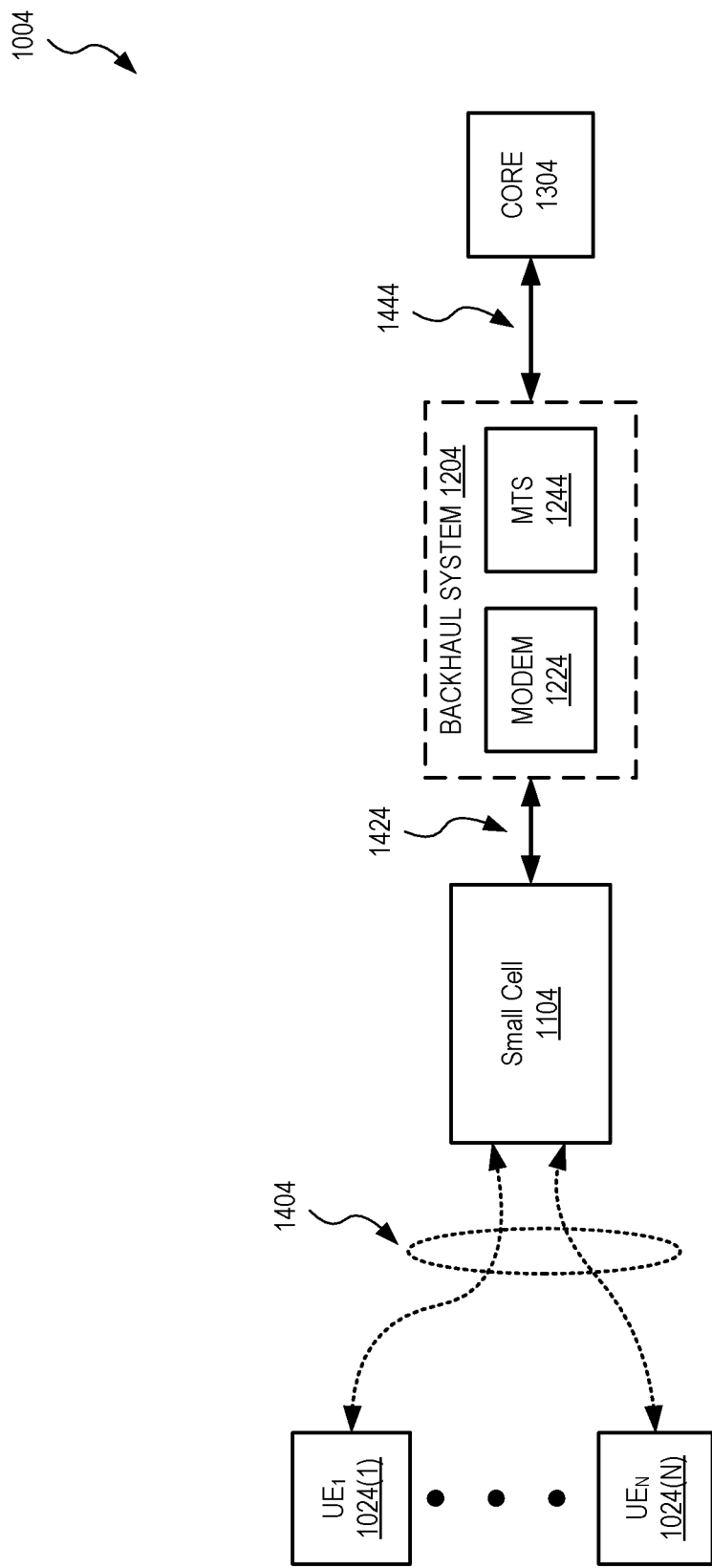
FIG. 25 shows one exemplary system configured to implement the present prioritized grant assignment process, in an embodiment.

FIG. 25 shows one exemplary communication system 100 in which the present prioritized grant assignment system and method may be utilized.

As shown, communication system 1004 includes User Equipment (UEs) 1024(1)-1024(n), a small cell 1104, a backhaul system 1204 configured with a modem 1224 and a modem terminal system (MTS) 1244, and a wireless core 1304 (hereinafter core 1304). It will be understood that UEs 1024(1)-1024(n) may be any user equipment or radio terminal, such as cell phones, laptop computers, tablet computers, wearables, Internet of Things (IoT) devices, a wireless equipped motor vehicle, etc. In addition, small cell 1104 may be any wireless access base station, for example, an eNodeB, a Wi-Fi access point, etc. Furthermore, UE's 1024's and small cell 1104 may be configured with one or more wireless communication protocols, example of which include but are not limited to Wi-Fi, 3G, 4G, 5G, and Long Term Evolution (LTE) communication protocols. Core 1304 may be any core that services radio terminals similar to UEs 1024, such as a mobile core, a Wi-Fi core, or the like. As discussed above, backhaul system 1204 may be any system capable of wireless backhauling data.

In an embodiment, small cell 1104 and modem 1224 are co-located. In such a version, small cell 1104 and modem 1224 may be configured within the same enclosure.

It will be understood that MTS 1244 may be formed as a single device or may be formed as more than one device. Alternatively, MTS 1244 may be formed as a combination of real and virtual devices, virtual components, and/or virtualized functions. If virtualization is utilized, such virtual devices, components, and/or functions maybe executed within the backhaul system or may be implemented outside of the backhaul system.

UEs 1024 are in wireless communication via communication link 1404 with small cell 1104. Small cell 1104 is in wired or wireless communication with backhaul system 1204 via communication link 1424. Backhaul system 1204 is in wired communication with core 1304 via communication link 1444.

As suggested above, the invention, in total or in part, may take the form of an entirely hardware implementation, an entirely software implementation or an embodiment containing both hardware and software elements. Embodiments utilizing network functions virtualization (NFV) and virtualized hardware, such as a virtualized MTS, virtualized modem, virtualized aspects of the MTS and/or modem, etc., are also contemplated. In one embodiment, the invention is implemented in whole or in part in software, which includes but is not limited to firmware, resident software, microcode, etc.

Figure 26A:
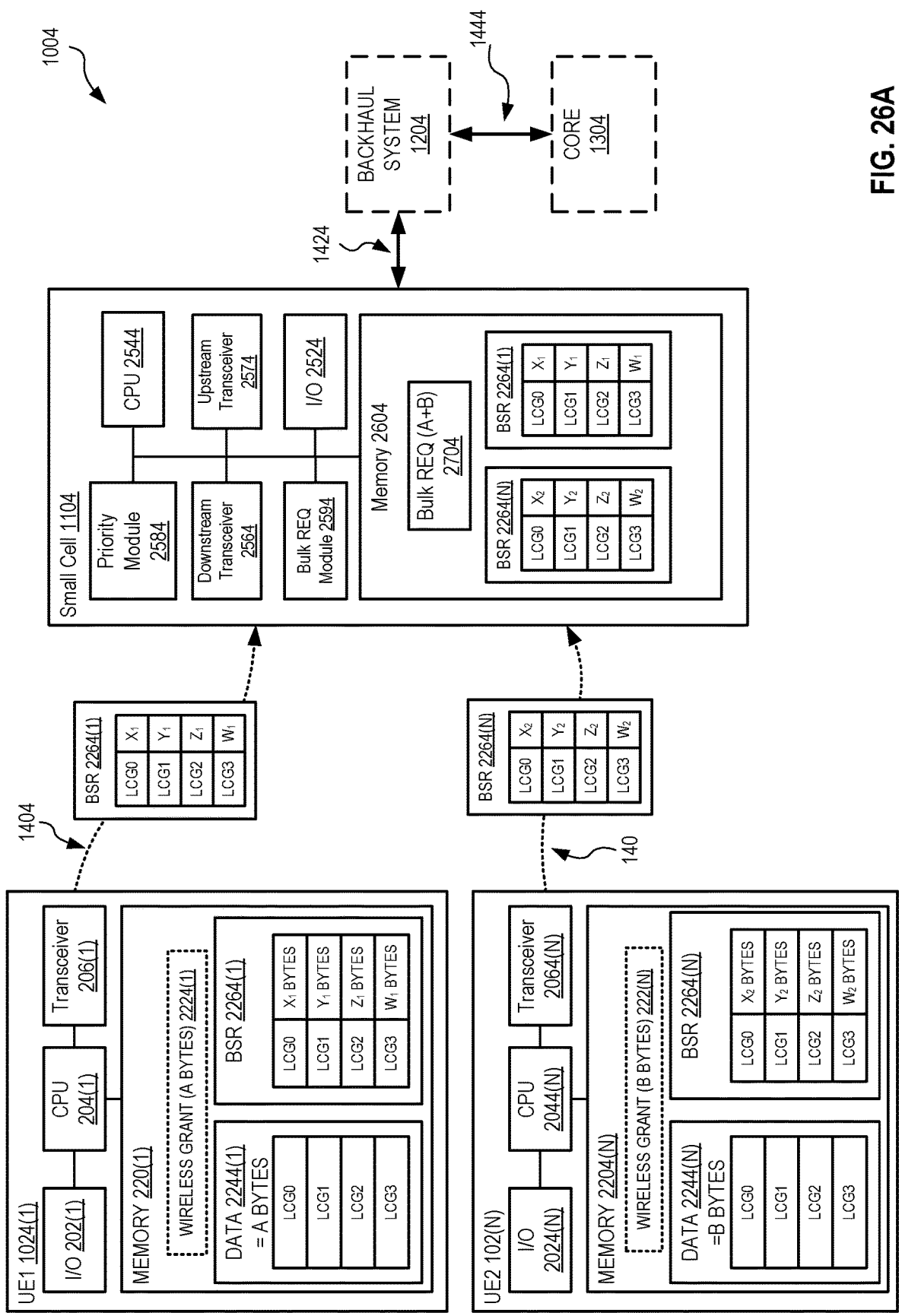
FIG. 26A is a more detailed view of the grant assignment system of FIG. 25 processing multiple buffer status reports (BSRs) to generate a bulk request (REQ) for resources from a connected backhaul system, in an embodiment.

FIG. 26A is a detailed view of some aspects of the prioritized grant assignment system of FIG. 25. System 1004 of FIG. 26 is described here processing multiple buffer status reports (BSRs) 2264 to generate a bulk request (REQ) 2704 for resources from a connected backhaul system 1204, in an embodiment.

Each UE 1024(1)-(n) is configured with an input/output (IO) system 2024, a CPU 2044, a wireless transceiver 2064, and a memory 2204, all of which are communicatively coupled. More or fewer components may be incorporated within a UE 1024 without departing from the scope herein. I/O 2024 may be any device level input/output system, including but not limited to a keyboard, mouse, touch screen, display, tactic feedback system, monitors (e.g., heart rate, Global Positioning (GSP), activity sensor, accelerometer, any health monitoring system, position sensors as used in room scale virtual reality (VR), etc.), graphics cards, sound card, I/O chips and/or chip sets, etc. I/O 2024 may also be removably and/or temporarily coupled with UE 1024. Processor 2044 may be a processing unit including but not limited to one or more of a central processing unit, a microprocessing unit, a graphics processing unit (GPU), a multi-core processor, a virtual CPU, a control unit, an arithmetic logic unit, a parallel processing unit or system, etc. Transceiver 2064 may be any or a plurality of wireless transceivers capable of wirelessly communication with the small cell 1104 on one or more compatible wireless communication protocols. Memory 2204 may be any non-transitory memory. Memory 2204 may also be a plurality of cooperative memory components. Memory 2204 may be implemented as or include one or more buffers. However, memory 2204 is organized BSR 2264 describes at least a portion of it for purposes of requesting resources from one or more networks to transmit data stored therein.

Memory 2204 stores at least a buffer status report (BSR) 2264, a data 2244 for transmission across backhaul system 1204 to core 1304, and one or more wireless grants 2224. It will be understood that BSR 2264(1), data 2244(1), and wireless grant 2224(1) are specific to UE 1024(1) and BSR 2264(n), data 2244(n), and wireless grant 2224(n) are specific to UE 1024(n) and may be erased, written over, or moved to a secondary storage device (not shown) at a time determined by UE 1024 or any decision making units within system 1004, such as modem 1224, MTS 1244, and core 1204. Wireless grants 2224(1) and 2224(n) are shown in dashed line to represent that they are only present after BSRs 2264(1) and 2264(n) are sent to and processed by small cell 1104, which generates wireless grants 2224(1) and 2224(n) and transmits them back to UEs 1024(1) and 1024(n), respectively. This process may be seen at least in FIGS. 28A-B.

Data 2244(1) and data 2244(n) are of a certain size, shown here as having size of A bytes for data 2244(a) and B bytes for data 2244(n). Data in data 2244 is organized by priority, for example into logical channel groups (LCG) 0-3. Logical channel grouping is the prioritization scheme utilized in the present embodiments shown here, but it would apparent to the skilled artisan that another prioritization scheme may be used without departing from the scope herein. Throughout the present description LCG0 is assigned the highest priority data, LCG 1 is assigned the next lowest priority, etc. Examples of data that would be placed into LCG0 are control messages specific to the wireless network, mission critical traffic, gaming traffic, or anything that requires the lowest latency. Examples of data that would be placed into LCG1 are voice or video traffic. Examples of data that would be placed into LCG2 are data traffic from such applications as web browsing. Examples of data that would be placed into LCG3 are low priority background traffic, examples of which include but are not limited to file uploads, file downloads, and software updates. BSRs 2264(1)-(n) contain at least metadata describing the size of the data contained within each of their respective data 2244(1)-(n) such that any intermediate and/or receiving systems may utilize this metadata to provide a grant for all or a portion of the data in data 2244(1)-(n). As will be discussed below, if the provided grant cannot accommodate all the data is a data 2244 or the combination of data contained with a plurality of data 2244s, then the system groups and data in prioritized the data based on LCG, see below for more details.

Small cell 1104 is shown to include an I/O 2524, a CPU 2544, a downstream transceiver 2564, an upstream transceiver 2574, a priority processor 2584, a bulk request (REQ) module 259.4 and memory 2604. I/O 2524 may be any I/O system similar to that described for I/O 202. CPU 2544 may be any processing unit similar to that described for CPU 1044. Memory 2604 may be any memory similar to that described for memory 2204.

Downstream transceiver 2564 may be any of, or a plurality of, wireless transceivers capable of wirelessly communication with the UEs 1024(1)-(n) and other devices utilizing one or more compatible wireless communication protocols.

Upstream transceiver 2574 is shown as a wireline communication unit. Alternatively upstream transceiver 2574 may be a wireless transceiver for communicatively coupling with backhaul system 1204, for example to modem 1224. Upstream transceiver 2574 utilizes a backhaul 1204 compatible communication protocol. As such, small cell 1104 may translate, repackage, and/or reorganize data received from one or more of UEs 1024(1)-(n) into one or more backhaul compatible data units or streams. Furthermore, the present system and method may translate, repackage, and/or reorganize the data in concert with the present prioritized grant assignment system and method.

Priority processor 2584 repackages data received from UEs 1024, such as data 2244(1)-(n), into prioritized based on logical channel groups. The functionality of priority processor 2584 will be detailed further in the FIG. 26B and its associated description.

Figure 27:
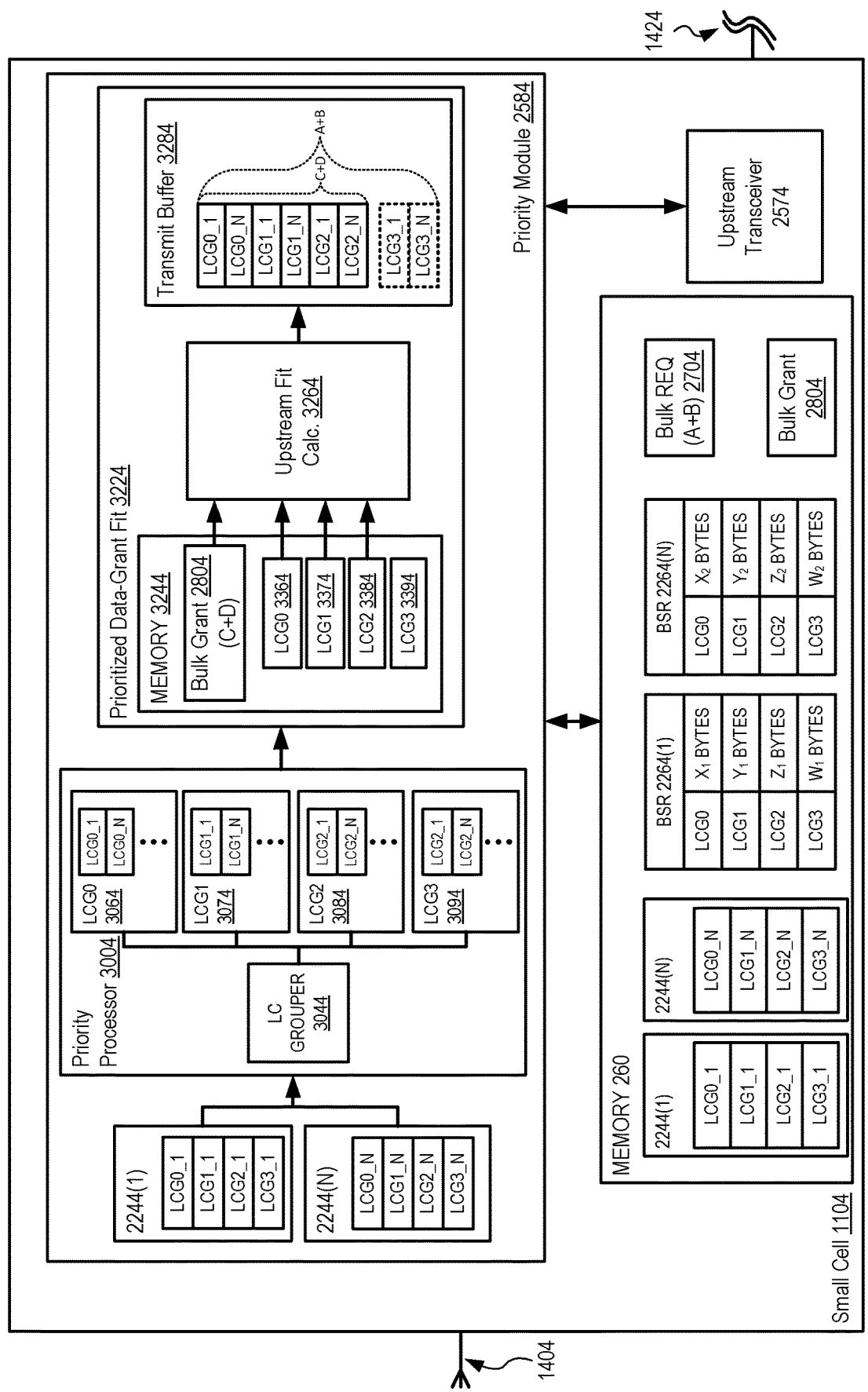
FIG. 27 shows one exemplary priority processing system configured within a small cell, which processes upstream data for transmission after the receipt of a partial grant, in and embodiment.
Figure 28A:
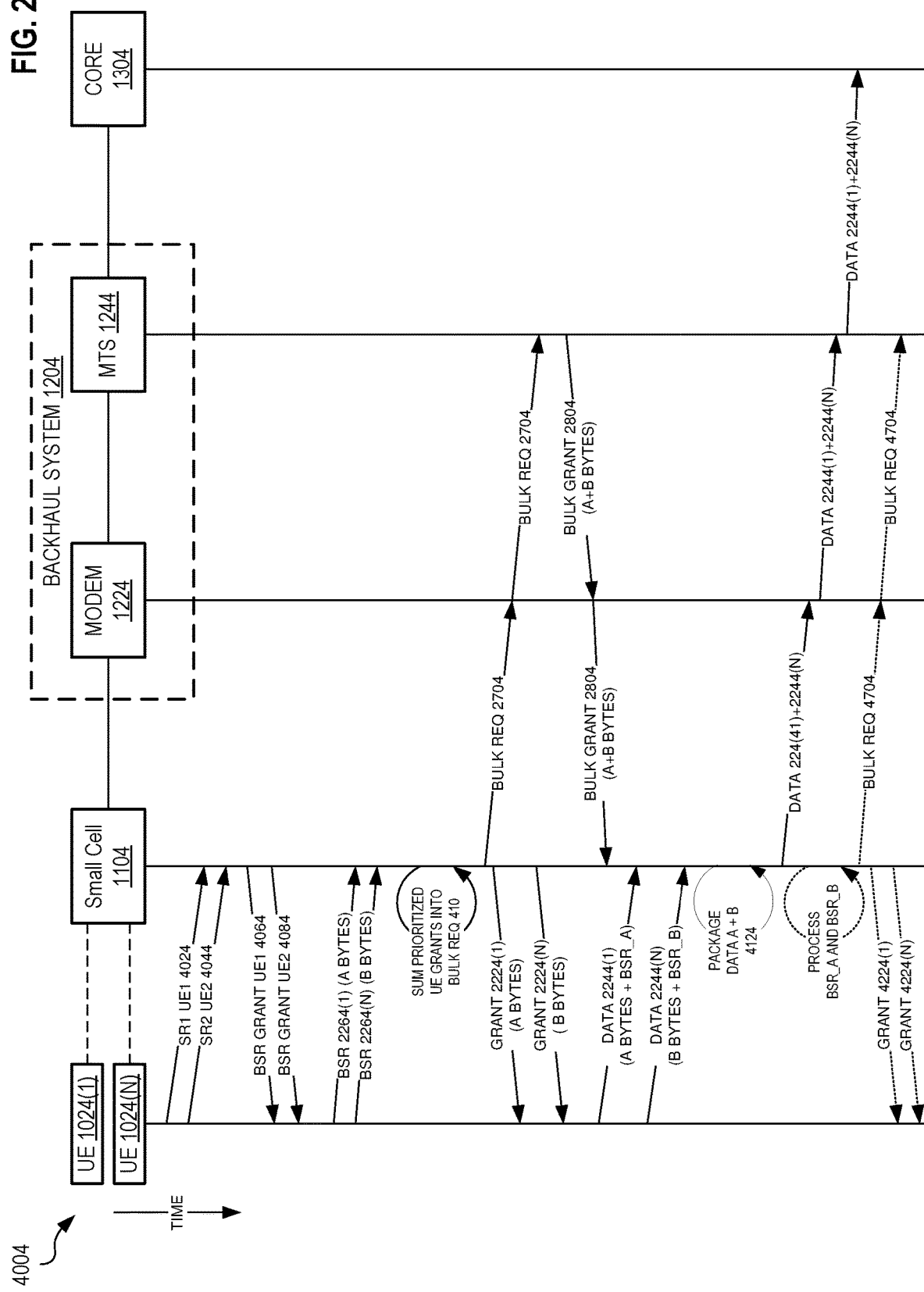
FIG. 28A is a communication diagram for the present grant assignment process wherein the entire request (REQ) is granted, in an embodiment.
Figure 28B:
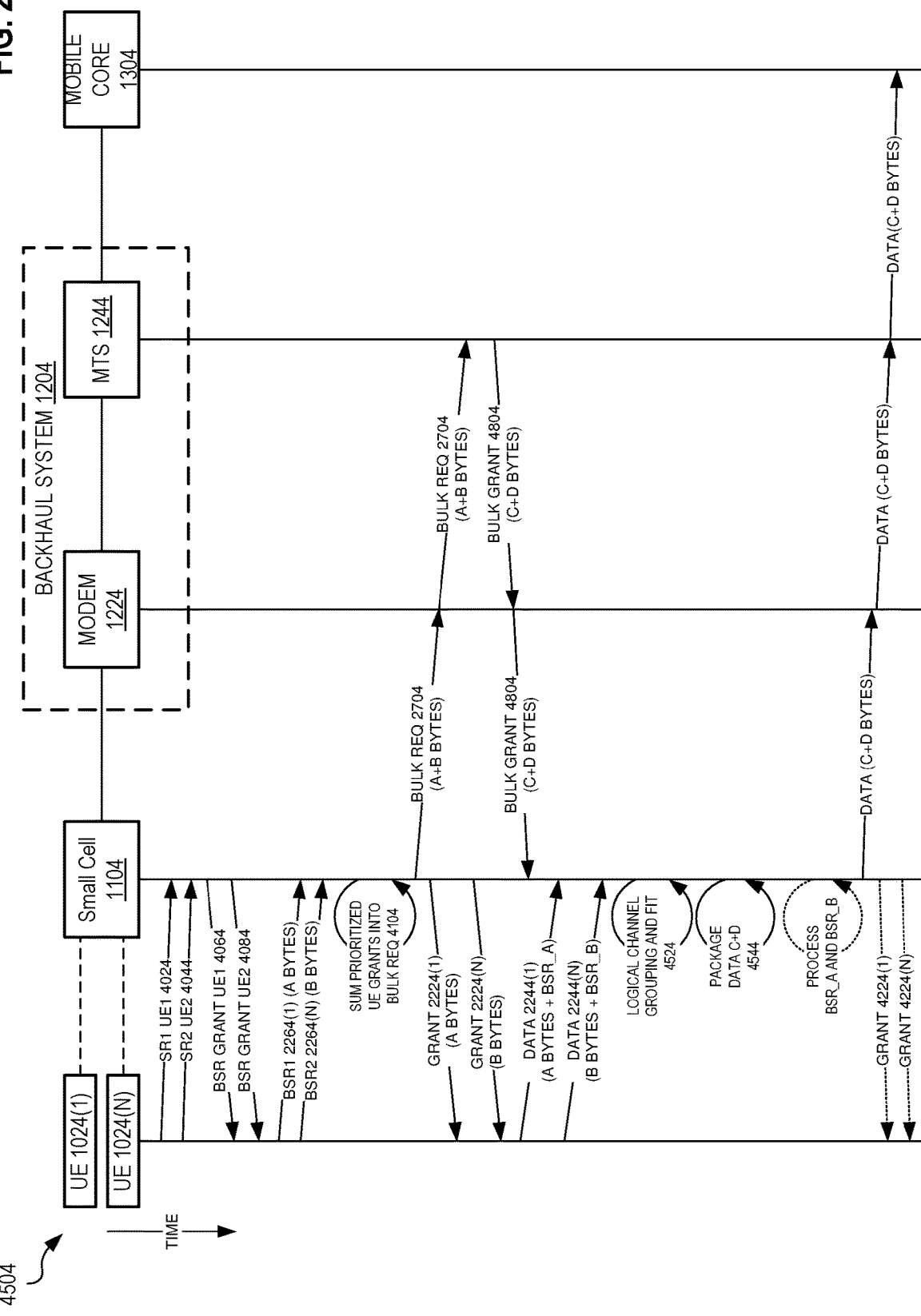
FIG. 28B is a communication diagram for the present grant assignment process wherein a portion of the request (REQ) is granted, in an embodiment.

Bulk REQ module 2594 combines each BSR 2264(1)-(n) received from UEs 1024(1)-(n) into a single BSR, a bulk REQ 2704, for transmission to backhaul system 1204's MTS 1244 which results in a backhaul grant to modem 1224, discussed later. This ensures the backhaul system 1204 is prepared to forward all or a portion of data 2244(1)-(n) upon receipt at modem 1224. MTS 1244 processes bulk REQ 2704 and, based on network parameters such as available capacity, rate limits based on Service Level Agreements for the UEs being serviced on the small cell, or prioritization of traffic of the small cell compared to other small cells provides small cell 1104 a grant that accommodates all or a portion of the request for resources defined by bulk REQ 2704. FIGS. 27 and 28A describe an instance where processing bulk REQ 2704 results in a grant that completely satisfies the request. FIG. 28B describe an instance where processing bulk REQ 2704 results in a grant that partially satisfies the request.

The remaining description for FIG. 26A will focus on UE 1024(1), although it will be understood that the description is equally relevant to any of UEs 1024(2)-1024(n). UE 1024(1) is shown having data 2244(1), which is ready for transmission to core 1304, stored in memory 2204(1). As described above, BSR 2264(1) is also stored in memory 2204, describes data 2244. In its most basic implementation, BSR 2264(1) describes the amount of data in data 2244, e.g., A bytes of data. In a more detailed embodiment, BSR 2264(1) may describe the amount of data in each LCG0-LCG3. For example, data 2244(1)'s LCG0 data may have X1 bytes of data, LCG1 data may have Y1 bytes of data, LCG2 data may have Z1 bytes of data, and LCG3 data may have W1 bytes of data, such that X_1+Y_1+Z_1+W_1=A bytes of data at a minimum. Upon receiving a grant to transmit it BSR 2264(1), UE 1024(1) sends BSR 2264(1) to small cell 1104 via wireless connection 1404. Small cell 1104 receives BSR 2264(1) at downstream receiver 2564 at which point it is moved to memory 2604 as BSR 2264(1). As described above, UE 1024(n) utilizes the same process, which results in BSR 2264(n) being stored in memory 2604 with BSR 2264(1).

Small cell 1104 then process BSRs 2264(1)-(n) to generate wireless grants 2224(1) and 2224(n) and sends these back to UEs 1024(1) and 1024(n) respectively.

Substantially close in time to the generation and transmission of wireless grants 2224(1) and 2224(n) to UE 1024(1) and UE 1024(n), respectively, bulk REQ module 2594 takes BSR 2264(1)-2264(n) as inputs and combines them to produce bulk REQ 2704. Bulk REQ 2704 is then transmitted to MTS 1244 in backhaul system 1204 via upstream transceiver 2574, communication link 1424, and modem 1224. MTS 1244 processes bulk REQ 2704 to produce bulk grant bulk grant 2804 (see FIGS. 27 and 28A-28B). Bulk grant 2804 is sent to small cell 1104 via modem 1224 and link 1424. Bulk grant 2804 may accommodate all or a portion of the data within data 2244(1)-(n), depending on network resources available. As described above, this ensures the backhaul system 1204 is prepared to forward the allotted amount of data 2244(1)-(n) upon receipt at modem 1224. Small cell 1104 processes bulk grant 2804 to ascertain the resources available to it.

If bulk grant 2804 only provides resources for small cell 1104 to transmit only a portion of data 2224(1)-(n) then the present system and method operates to ensure the highest priority data, namely LCG0 data, is prioritized first, followed by LCG1, then LCG2, and finally LCG3. This will be discussed in more detail below.

In an embodiment, not shown here, the functionality and associated hardware and/or software described above for small cell 1104 may alternatively be configured with and implemented by modem 1224. That is, modem 1224 may by formed with I/O 2524, CPU 2544, downstream transceiver 2564, upstream transceiver 2574, priority processor 2584, bulk request (REQ) module 2594, and memory 2604 such that modem 1224 performs the operations described above and below with modification that would be obvious to the skilled artisan. It will be understood that such an embodiment does not preclude modem 1224 from being a virtualized modem 1224, in whole or in part. Furthermore, it will be understood that a small cell 1104 implementation does not preclude small cell 1104 from also being a virtualized at least in part.

Figure 26B:
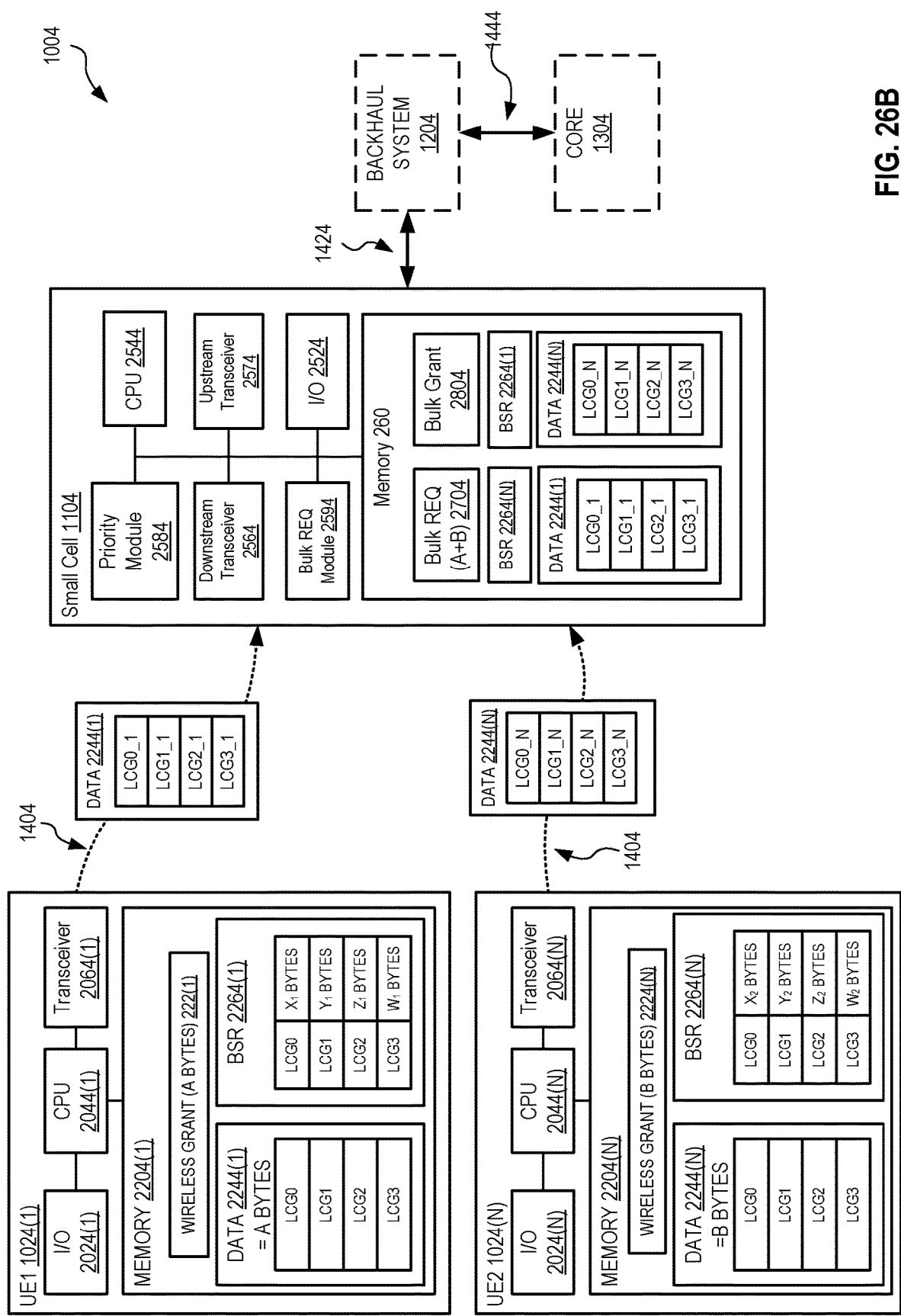
FIG. 26B is a more detailed view of the grant assignment system of FIGS. 25 and 26B processing multiple logical channel groups (LCGs) from a plurality of user equipment (UEs) based on prioritization, in an embodiment.

FIG. 26B shows system 1004 of FIG. 26A after the receipt of wireless grant 2224(1) and 2224(n) at UES 1024(1) and 1024(n), respectively, and bulk grant 2804 at small cell 1104. Furthermore, system 1004 of FIG. 26B is shown transmitting data 2244(1) and (n) from UEs 1024(1) and 1024(n) to small cell 1104. Data 2244(1) and 2244(n) are stored in memory 2604. Because bulk grant 280 is in place when data 2244(1)-(n) arrives at small cell 1104 all or a portion of that data, depending on the grant, may be transmitted to core 1304 vie backhaul system 1204.

If bulk grant 2804 can accommodate all of data 2244(1) and 2244(n), that is A bytes+B bytes, then no further processing is requires and data 224(1)-2244(n) is transmitted to core 1304 via backhaul system 1204 utilizing standard methods of repackaging or translating wireless data 2244 (1)-2244(n) in to a backhaul compatible container or data.

Alternatively, if bulk grant 2804 cannot accommodate all of data 2244(1)-2244(n), then priority process 258 acts on data 2244(1)-2244(n), discussed in more detail in at least FIG. 27.

FIG. 27 shows one exemplary priority processing module 2584 configured within small cell 1104, which processes upstream data for transmission after the receipt of bulk grant 2804, which is only a partial grant.

Priority module 2584 is shown including a priority processor 3004 and a prioritized data-grant fit module 3204. Priority processing 2584, priority processor 3004, and prioritized data-grant fit module 3204 may be implemented as a single combined device or component, as standalone devices, or may be implemented, separately or together, as functionality executed by CPU 2544.

Priority processor 3004 is represented to include a logical channel (LC) grouper 3044 and LCG0 3064-LCG3 3094.

LCG0 3064 is a buffer or temporary data storage for UE 1024(1)-1024(n)'s LCG0 data. LCG1 3074 is a buffer or temporary data storage for UE 1024(1)-1024(n)'s LCG1 data. LCG2 3084 is a buffer or temporary data storage for UE 1024(1)-1024(n)'s LCG2 data. LCG3 3094 is buffer or temporary data storage for UE 1024(1)-1024(n)'s LCG3 data.

LC grouper 3044 takes all data 2244 at its input and stores, copies or otherwise records each UE 1024's LCG data into the appropriate LCG0 3064-LCG3 3094 temporary storage. For example, LC grouper 304 process data 224(1) and data 2244(n) and copies all LCG0 data to LCG0 3064. That is, LC grouper 3044 copies data 2244(1)'s LCG0_1 data and data 2244(n)'s LCG_N data in LCG0 3064. LC grouper 3044 similarly copies all data 2244(1)'s and data 2244(n)'s LCG1 data to LCG1 3074, all data 2244(1)'s and data 2244(n)'s LCG2 data to LCG2 3084, and all data 2244(1)'s and data 2244(n)'s LCG3 data to LCG3 3094. CLG0 3064-LCG3 3094 are then copied to prioritized data-grant fit 3224 as LCG0 3364-LCG3 3394.

Prioritized data-grant fit module 3224 is shown to be configured with a memory 3244, an upstream fit calculator (UFC) 3264, and a transmit buffer 3284. Memory 3244 has stored with in it bulk grant 2804 which was generated by MTS 1244, and LCG0 3364-LCG3 3394. Bulk grant 2804 of FIG. 27 is a grant for an amount of data equal to C+D bytes of data, which is a portion of that requested, namely A+B bytes of data. C+D bytes of data and A+B bytes of data are symbolically represented in transmit buffer 3284, more on this below.

Transmit buffer is shown including LCG0_1, LCG0_N, LCG1_1, LCG1_N, LCG2_1, LCG2_N, LCG3_1, and LCG3_N. The size of LCG0_1, LCG0_N, LCG1_1, LCG1_N, LCG2_1, LCG2_N, LCG3_1, and LCG3_N is equal to A+B bytes, the size of the bulk REQ 270. The size of LCG0_1, LCG0_N, LCG1_1, LCG1_N, LCG2_1, and LCG2_N is equal to C+D bytes, the size of the bulk grant 2804. C+D<A+B.

UFC 3264 takes as inputs bulk grant 2804 and LCG0 3364, LCG1 3374, LCG2 3384, and LCG3 3394. UFC 3264 then process the LCG0 3364, LCG1 3374, LCG2 3384, LCG3 3394 data, and bulk grant 2804 to determine which data can be accommodated by bulk grant 2804 for the related transmission. This process may be as simple as determining the size of bulk grant 2804 (C+D bytes) and perform arithmetic calculations to with LCG0, LCG1, LCG2, LCG3 in order of priority to determine which data packages can be accommodated by the bulk grant 2804. Another exemplary process is a UE prioritization process, which may order LCG data based on Service Level Agreement or priority, such that if C+D bytes of data provided by bulk grant 4804 is not sufficient to serve all UE logical channel group data, then LCG data is prioritized by UEs such that higher priority UEs have their data accommodated first. Furthermore, UE prioritization may be multi-tiered such that LCG0 data from first priority UEs are handled first, then LCG0 data from second priority UEs are handled next, and so forth. In an embodiment, LCG1 data originating from a highest priority UE is handled before LCG0 data from a second tier UE. Determining the priority of UEs may be based on the type of device (e.g., emergency services devices autonomous vehicles have a higher priority than standard user devices and IoT devices), a user or user account associated with the device (e.g., a business or premium account versus an individual account or lower tier account, or military account versus a civilian account), order of association with the small cell, etc. Other processes are detail below.

In the embodiment of FIG. 27 bulk grant 2804 may accommodate C+D bytes of data, which provides for the transmission of LCG0_1, LCG0_N, LCG1_1, LCG1_N, LCG2_1, and LCG2_N over backhaul system 120. LCG3_1 and LCG3_N may be shifted the next or subsequent bulk request and upstream transmission. Alternatively, LCG3_1 and LCG3_N may be dropped, for example, if that data is determined to be stale.

FIG. 28A is a communication diagram 4004 for system 1004 in the situation where all of a request conveyed by a Bulk REQ 2704 is granted, in an embodiment. In the present embodiment two UEs are shown, UEs 1024(1) and 1024(n). As discussed above, it will be understood that more UEs may participate in the present system and method without departing from the scope here and only two are shown and described here to reduce complexity and increase understanding. FIG. 28A is best understood when read in combination with FIGS. 26A-B and 27.

In diagram 4004 UEs 1024(1) and 1024(n) transmit service requests (SRs) SR1 UE1 4024 and SR2 UE2 4044 to small cell 1104 to request a grant for the transmission of each UEs buffer status report (BSR), BSR 2264(1) and BSR 2264(n), see FIGS. 26A, 26B, and 3. Small cell 1104 receives and processes SR1 UE1 4024 and SR2 UE2 4044, producing two BSR grants, BSR Grant UE1 4064 and BSR Grant UE2 4084, which are sent back to the respective UE. UE 1024(1) and 1024(n) receive and process the BSR grants 4064, 4084 and transmit BSR 2264(1) and BSR 2264(n). BSR 2264(1) conveys to small cell 1104 that UE 1024(1) has A bytes of data in its buffer where and BSR 2264(n) conveys to small cell 1104 that UE 1024(n) has B bytes of date in its buffer. A and B, which describe the A and B bytes of data, are numeric variables which designate the size or amount of data stored in the respective buffers. Small cell 1104 processes BSR 2264(1) and 2264(n) and produces a grant for each UE 1024, grant 2224(1) and grant 2224(n). In addition, small cell 1104 generates bulk REQ 2704. Bulk REQ 2704 is a request for backhaul system 1204 resources to transmit the combination of at least data 2244(1) and 2244(n) (or any data 2244(1)-(n) if more UEs 1104 are associated with small cell 1104 and have data in their buffers to transmit). Small cell 1104 transmits grants 2224(1) and 2224(n) to UEs 1024(1) and 1024(n), respectively, and bulk REQ 2704 to MTS 1244 via modem 1224 within backhaul system 1204. The order the UE Grants 2224 and the bulk REQ 2704 are produced and transmitted by small cell 1004 may vary according to implementation as long as they occur substantially close enough in time such that a bulk grant, one example of which is bulk grant 2804 as shown in FIGS. 26B, 27 and 28A, may be received and processed by small cell 1104 prior to the receipt of data from the UEs, such as data 2244(1)-(n) discussed in more detail below. Although not ideal, it will be consistent with the present invention if bulk grant 2804 is received at small cell 1104 after the receipt of data 2244(1) and 2244(n) at small cell 1104 as long as it is not so long after that there is no reduction in latency over the serial grant assignment utilized in the prior art. Upon receipt of the grants 2224(1) and 2224(n), UE 1024(1) and UE 1024(n) prepare data 2244(1) and 2244(n), respectively, for transmission.

In an embodiment, UEs 1024(1) and 1024(n) also include new BSRs in data 2244(1) and 2244(n), shown in diagram 4004 as BSR_A and BSR_B. In such an embodiment grants 2224(1) and 2224(n) include additional resources to accommodate BSR_A and BSR_B. BSR_A and BSR_B are requests for resources to transmit new data in UE 1024(a) and 1024(n)'s buffers that was generated after the transmission of SR1 UE1 4024 and SR2 UE2 4044. This "piggy backing" process reduces the need to go through the SR/BSR-grant process (described above) for the next and potentially subsequent data transmissions.

Upon receipt of data 2244(1) and 2244(n) and bulk grant 2804 at small cell 1104 the small cell packages 4124 data 2244(1) and 2244(n), for example in a manner similar to that shown and described for FIG. 27, for transmission to core 1304 via backhaul system 1204. In an embodiment that includes BSR_A and BSR_B, small cell 1104 may also process BSR_A and BSR_B in a similar fashion as described above for BSR 2264(1) and 2264(n), producing new grants 4224(1) and 4224(n) and a second bulk REQ 4704.

This second bulk REQ 4704 may be transmitted separately from (as shown in FIG. 28) or packaged with the upstream transmission of data 2244(1) and 2244(n) (not shown) to MTS 2244 on its way to core 1304. If second bulk REQ 4704 is transmitted separately from the upstream transmission of data 224(1) and 2244(n) to core 1304, as shown is in FIG. 28, then BSR_A and BSR_B may be processed before or after the upstream transmission of data 2244(1) and 2244(n) from small cell 1104 to core 1304.

If the second bulk REQ 4704 is sent with the upstream transmission of data 2244(1) and 2244(n) then bulk grant 2804 must include additional resources to accommodate bulk REQ 4704, that is bulk grant 2804 must be capable of accommodating at least A bytes+B bytes+X bytes, where X bytes is at least the amount of data need to accommodate bulk REQ 4704, e.g., a summary of BSR_A and BSR_B. With bulk REQ 4704 sent with or proximate in time to the upstream transmission of data 2244(1) and 2244(n), MTS 1244 may read or extract bulk REQ 4704 upon receipt of the upstream transmission of data 2244(1), data 2244(n), and the bulk REQ 4704. Bulk REQ 4704 may be packaged with data 2244(1) and 2244(n) such that MTS 1244 can only read bulk REQ 4704, which utilizes a backhaul 1204 format or protocol, and MTS 1244 may not read data 2244(1) and 2244(n), which utilizes a core 1304 format or protocol different from that of backhaul 1204's format or protocol.

FIG. 28B is a communication diagram 4504 for the present grant assignment process wherein only a portion of the request conveyed by a Bulk REQ is granted, in an embodiment.

Communication diagram 4504 is similar to communication diagram 4004 up until the receipt of bulk REQ 2704 by MTS 1244 from small cell 1104. As such all steps prior to the receipt of bulk REQ 2704 by MTS 1244 in diagram 4504 are not described here for the sake of brevity. Diagram 4504 differs from diagram 4004 in that MTS 1244 processes the received bulk REQ 2704 to produce a bulk grant 4804 which accommodates less data than that requested in bulk REQ 2704. That is diagram 4504 shows a scenario where backhaul system 1204 can only accommodate a portion of bulk REQ 2704, which requests resources to transmit A+B bytes of data. Thus MTS 1244 generates a bulk grant 4804, similar to bulk grant 2804 of FIG. 27, which accommodates C+D bytes of data, which is less A+B bytes: (C+D<A+B).

Bulk grant 4804 is transmitted to small cell 1104 via modem 1224. Substantially concurrently to the transmission and processing of bulk REQ 2704 and generation of bulk grant 4804, UEs 1024(1) and 1024(n) process grants 2224(1) and 2224(n), prepare data 2244(1) and 2244(n) and optionally new BSRs BSR_A and BSR_B, and transmits these to small cell 110, as similarly described from diagram 4004, FIG. 28A.

As similarly described in FIG. 27, small cell 1104 performs a logical channel grouping process ad prioritized grant fit process as described in FIG. 27. That is, the priority processor 3004 groups together all LCG 0 data from each UE 1024's data 2244, all LCG1 data from each UE 1024's data 2244, etc. The prioritized data-grant fit 3224 unit the fits the LCG data to the bulk grant 2804, 4804 such that data with the highest priority, LCG0 Data, is prioritized for transmission, followed by LCG1, LCG2, etc. In the situation of FIG. 28B (and FIG. 27) not all data can be transmitted under bulk grant 4804, namely LCG3_1 and LCG3_N data. As such, LCG3_1 and LCG3_N data are subsequently retained in the transmit buffer 3284, memory 2640, or a similar generic or dedicated memory, which may or may not be shown.

The remaining LCG data is then packaged 4544 and transmitted to mobile core 1304 via modem 1224 and MTS 1244 of backhaul system 1204. Optionally, and as similarly described for FIG. 28A, small cell 1104 may also process new BSRs, BSR_A and BSR_B, and provide grants 4224(1) and 4224(n) to UEs 1024(1) and 1024(n).

Figure 29A:
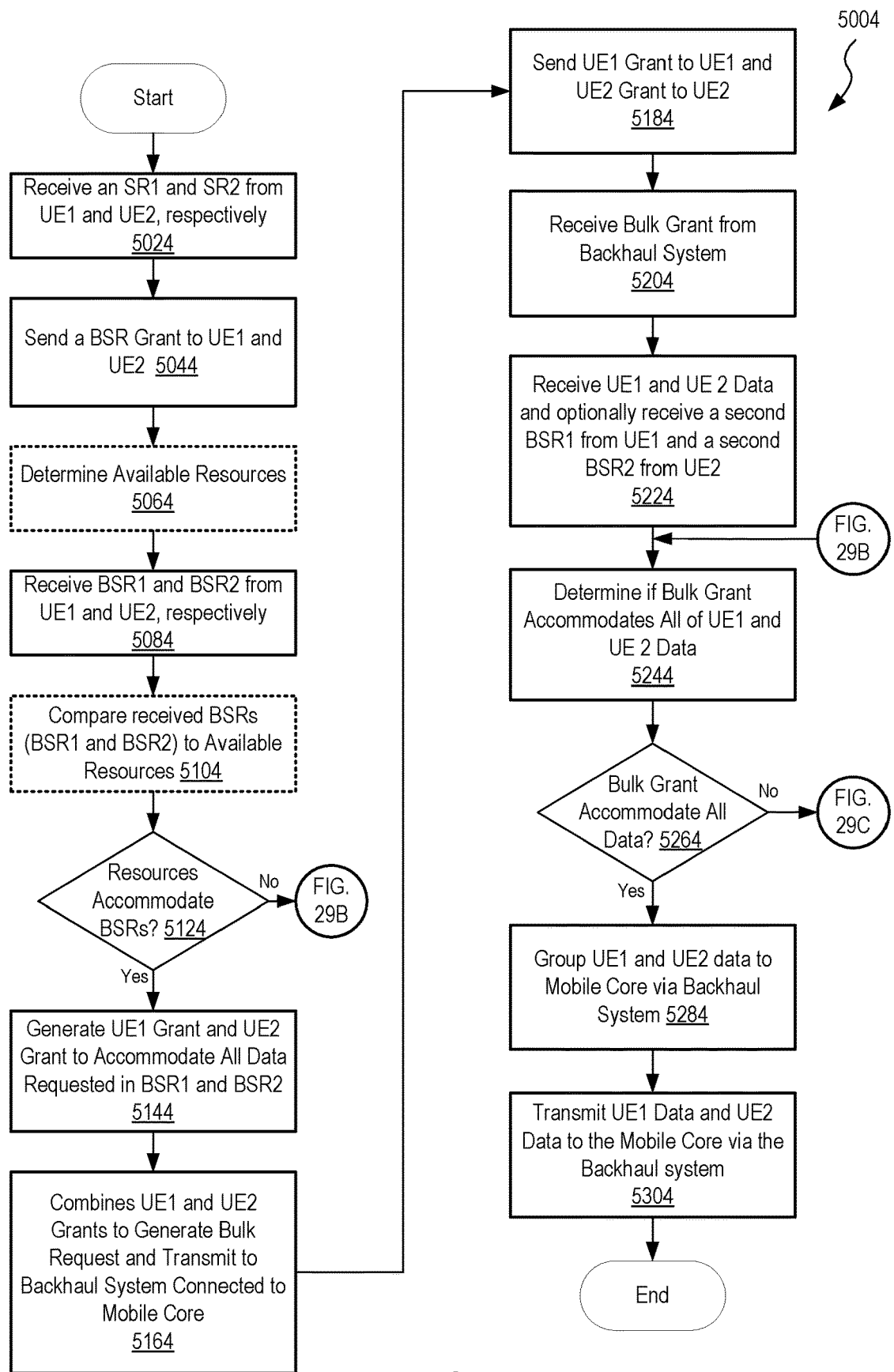
FIGS. 29A-C is a method flow detailing one exemplary process for generating a bulk request for resources, in an embodiment.
Figure 29B:
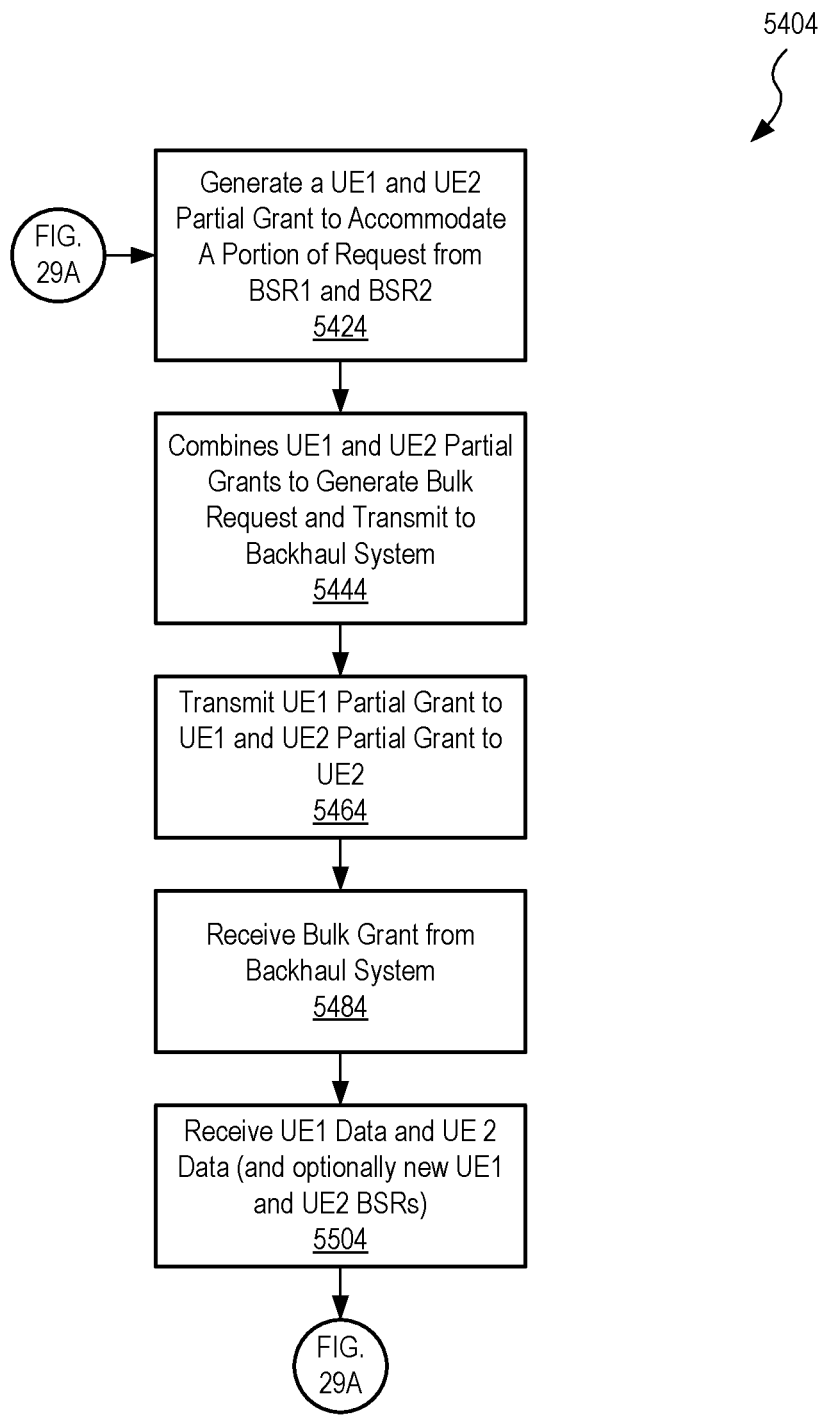
Figure 29C:
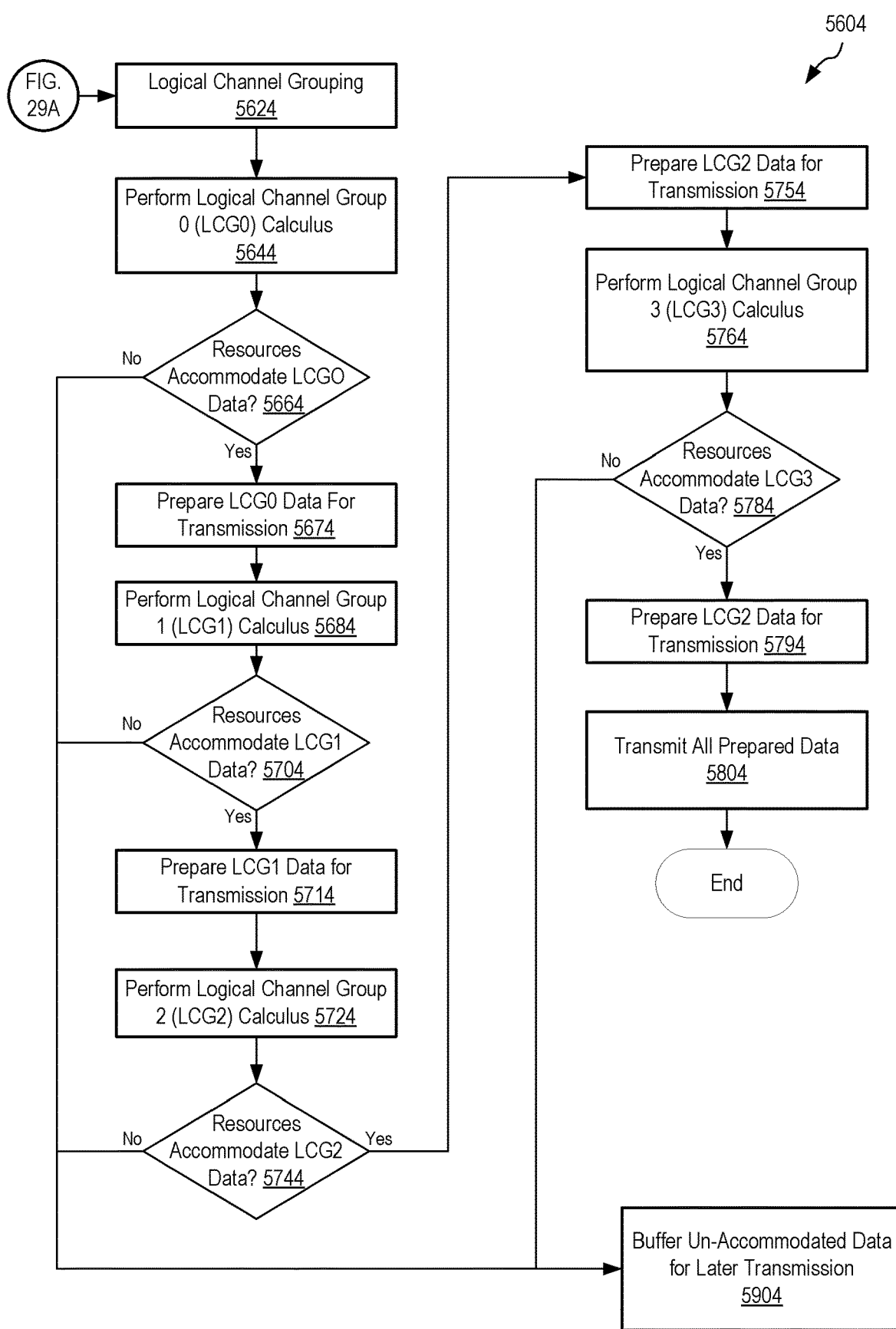

FIGS. 29A-C describe a method 5004 detailing one exemplary process for generating a bulk request for resources, in an embodiment. FIGS. 29A-C are best viewed together.

Step 5024 of method 5004 receives an SR1 and an SR2 from UE1 and UE2, respectively. An example of step 5024 is UEs 1024(1) and 1024(n) transmitting SR1 UE1 4024 and SR2 UE2 4044 to small cell 1104, as shown and described in FIGS. 28A and 28B.

Step 5044 of method 5004 sends a BSR Grant to both UE1 and UE2. An example of step 5044 is small cell 1104 transmitting BSR grant UE1 4064 and BSR grant UE2 4084 to UE 1024(1) and UE 1024(n), respectively.

Optional step 5064 of method 5004 determines what resources are available to small cell in preparation for processing the forthcoming BSRs from the UEs. An example of step 5064 is small cell 1104 analyzing its available resource for comparison to the BSRs received from UEs 1024(1) and 1024(n) in step 5084-5104.

Step 5084 of method 5400 receives BSR1 and BSR2 from UE1 and UE2, respectively. An example of step 5084 is small cell 1104 receiving BSR 2264(1) and 2264(n) from UEs 1024(1) and 1024(n), respectively.

Optional step 5104 of method 5004 compares the optional step 5064 determined available resources to the step 5084 received BSRs (BSR1 and BSR2) to determine if the small cell has resources to accommodate the UE requests. An example of step 5104 is small cell comparing its predetermined available resources with the received BSRs 2264(1) and 2246(n) to determine if resources are available and when they are available.

Decision step 5124 of method 5004 determines if and when resources are available to accommodate the BSRs. If resources are available method 5004 moves to step 5144. If resources are not available, method 5004 moves to step 5424 of FIG. 29B, described below. An example of step 5124 is small cell 1104 producing a result as to the available resources and acting on that result by initiating either the process of step 5144 or 5404, FIG. 29B.

Step 5144 of method 5004 generates a UE1 Grant and a UE2 Grant to accommodate all data requested by BSR1 and BSR2. An example of step 5144 is small cell 1104 producing a grant 2224(1) for UE 1024(1) and a grant 2224(n) for UE 1024(n).

Step 5164 of method 5004 combines all grants, e.g., UE1 grant and UE2 grant, to generate a bulk backhaul request and transmits the bulk backhaul request to the processing aspect of the backhaul system. An example of step 5164 is small cell 1104 combining grants 2224(1) and 2224(n) as described, for example, in FIGS. 27 and 28A and 4B, to produce and transmit bulk REQ 270 to MTS 1244 via modem 1224. It will be understood that other backhaul components may be involved in the process, for example, if alternative backhaul systems are used, e.g., any backhaul system that relies on a request grant protocol.

Step 5184 of method 5004 sends UE1 grant to UE1 and UE2 grant to UE2. An example of step 5184 is small cell 1104 transmitting grant 2224(1) and 2224(n) to UE 1024(1) and 1024(N), respectively.

Step 5204 of method 5004 receives bulk grant from backhaul system. An example of step 5204 is MTS generating a bulk grant 2804 is then received by small cell 1104 from MTS 1244 via modem 1224.

Step 5224 of method 5004 receives UE1 and UE 2 data and optionally receive a second BSR1 from UE1 and a second BSR2 from UE2. An example of step S204 is small cell 1104 receiving data 2244(1) and 2244(n) from UEs 1024(1) and 1024(n), respectively. Optionally, small cell 1104 may also receive a new BSR from UE 1024(1), BSR_A, and a new BSR from UE 1024(n), BSR_B.

Step 5244 of method 5004 process bulk grant and bulk request to determine if the bulk grant accommodates all of UE1 and UE 2 Data. An example of step 5224 is small cell 1004 determining if the bulk grant received in step 5204 satisfies the bulk REQ 2704, sent is step 5164.

Decision step 5264 of method 5004 provides a decision based on the results of step 5244, determining if the bulk grant accommodates all of UE1 and UE 2 Data. If it is determined that the bulk grant does not accommodate all of the data described in the bulk request, decision method 5004 moves to step 5504 of FIG. 29C, described further below. If step 5264 determines that the bulk grant satisfies the bulk request, then method 5004 moves to step 5284. An example of step 5244 is small cell 1104 processing the result of a comparison between the bulk grant and the bulk request.

Step 5284 of method 5004 groups UE1 data and UE2 data for transmission to the mobile core via backhaul system. One example of step 5284 is small cell 1104 packaging data A+B 412, as described in FIG. 28A.

Step 5304 of method 5004 transmits UE1 Data and UE2 Data to the Mobile Core via the Backhaul system. One example of step 530 is small cell 110 transmitting data 2244(1)+2244(n) to mobile core via modem 2224, MTS 2244, and core 1304, as described in FIG. 28A.

FIG. 29B shows a method 5404, which branches from step 5124 of method 5004, FIG. 29A, for handling a partial small cell grant.

In step 5424 method 5404 generate a UE1 and UE2 partial grant to accommodate a portion of the request resources as described in BSR1 and BSR2. One example of step 5424 is small cell processing the results of step 506 and BSR 2264(1) and BSR 2264(n) to generate a partial grant for BSR 2264(1) and a partial grant for BSR 2264(n).

In step 5444 method 5404 combines UE1 and UE2 partial grants to generate bulk request and transmits the bulk request to the backhaul system for processing. One example of step 5444 is small cell 1104 combining partial grants (not shown) to produce a bulk request, similar to bulk REQ 2704, and transmitting it to MTS 1244 via modem 1224.

In Step 5464 method 5404 transmits the partial grants, generated in step 5424, to UE1 UE2. One example of step 5464 is small cell 1104 transmitting partial grants, similar to grants 2224(1) and 2224(n), to UEs 1024(1) and 1024(n).

In step 5484 method 5404 receives a bulk grant from the backhaul system. Now example of step 5484 is small cell 1104 receives a bulk grant, similar to bulk grant 2804 of FIG. 28A, from MTS 1244 via modem 1224.

In step 5504 method 5404 receive data and optionally new BSRs from the UEs. One example of step 5504 is small cell 1104 receiving data, similar to data 2244(1) and 2244(n) from UEs 1024(1) and 1024(n). Method 5404 then moves to step 5244 of FIG. 28B.

FIG. 29B shows a method 5604, which branches from step 5264 of method 5004, FIG. 29A, for handling a partial backhaul grant.

In step 5624 method 5604 performs a logical channel grouping by grouping together all UE data by Logical Channel Group (LCG) such that, for example, all UE1-UEn data designated as Logical Channel Group 0 (LCG0) are grouped together, all UE1-UEn data designated as Logical Channel Group 1 (LCG1) are grouped together, etc. One example of step 5624 LC grouper 3044 taking in data 2244(1) and 2244(n) and placing LCG0_1 data with LCG0_n data in LCG0 3064, placing LCG1_1 data with LCG1_n data in LCG1 3074, placing LCG2_1 data with LCG2_n data in LCG2 3084, placing LCG3_1 data with LCG3_n data in LCG3 3094, as described in FIGS. 27 and 28B. Alternatively, metadata describing LCG0-LCG3 may be grouped together or otherwise organized for analysis in the later steps of method 5604 to determine what LCG data the grant may accommodate.

In step 5644 method 5604 performs an upstream fit calculus by analyzing if the bulk grant can accommodate the LCG0 data. Method 5604 then moves to decision step 5664 where method 5604 makes a decision based on the result of step 5644. If the bulk grant cannot accommodate all of the LCG0 data then method 5604 moves to step 5904, where method 5604 buffers any un-accommodated LCG data for later transmission.

Alternatively, if the bulk grant cannot accommodate all of the LCG0 data then method 5604 may perform a second analysis (not shown) to determine if the bulk grant can accommodate LCG0 data from a UE in order of priority. For example, UE1 (e.g., a medical device) may have a higher priority than UE2 (e.g., a gaming device) such that if the bulk grant cannot accommodate all of LCG0 data (e.g., UE1 LCG0 data plus UE2 LCG0 data) then method 5604 may determine if the bulk grant can accommodate LCG0 data from high priority UE1 only. If the bulk grant can only accommodate UE1 LCG0 data, then method 5604 moves UE2 LCG0 data to step 5904, buffering it for later transmission and UE1 LCG0 data is moved through the rest of method 5604 or just prepared for transmission if the bulk grant cannot accommodate any other data. Although it will not be repeated again, the above alternative process may be included with any similar steps described below.

If it is determined in step 5664 that the bulk grant can accommodate all of the LCG0 data then decision step 5664 moves to step 5674.

In step 5674 method 5604 prepares the LCG0 data for transmission. One example of step 5674 is LCG0_1 and LCG0_n data sent to transmit buffer 3284, FIG. 27.

In step 5684 method 5604 performs an upstream fit calculus by analyzing if the bulk grant can accommodate the LCG1 data. Method 5604 then moves to decision step 5704 where method 5604 makes a decision based on the result of step 5684. If the bulk grant cannot accommodate all of the LCG1 data then method 5604 moves to step 5904, where method 5604 buffers any un-accommodated LCG data for later transmission. If it is determined in step 5704 that the bulk grant can accommodate all of the LCG1 data then decision step 5704 moves to step 5714.

In step 5714 method 5604 prepares the LCG1 data for transmission. One example of step 5714 is LCG1_1 and LCG1_n data sent to transmit buffer 3284, FIG. 27.

In step 5724 method 5604 performs an upstream fit calculus by analyzing if the bulk grant can accommodate the LCG2 data. Method 5604 then moves to decision step 5744 where method 5604 makes a decision based on the result of step 5724. If the bulk grant cannot accommodate all of the LCG2 data then method 5604 moves to step 5904, where method 5604 buffers any un-accommodated LCG data for later transmission. If it is determined in step 5744 that the bulk grant can accommodate all of the LCG1 data then decision step 5744 moves to step 5754.

In step 5754 method 5604 prepares the LCG2 data for transmission. One example of step 5754 is LCG2_1 and LCG2_n data sent to transmit buffer 3284, FIG. 27.

In step 5764 method 5604 performs an upstream fit calculus by analyzing if the bulk grant can accommodate the LCG3 data. Method 5604 then moves to decision step 5784 where method 5604 makes a decision based on the result of step 5764. If the bulk grant cannot accommodate all of the LCG3 data then method 5604 moves to step 5904, where method 5604 buffers any un-accommodated LCG data for later transmission. If it is determined in step 5784 that the bulk grant can accommodate all of the LCG3 data then decision step 5784 moves to step 579.4

In step 5794 method 5604 prepares the LCG3 data for transmission. One example of step 5794 is LCG3_1 and LCG3_n data sent to transmit buffer 3284, FIG. 27.

In step 5804 all data that can be accommodated by the bulk grant is sent, via the backhaul system to its destination, e.g., a mobile or Wi-Fi core.

It is not necessary that the steps described here for method 5604 be performed in the order described. For example, all processing steps may be performed prior to all decision steps. Furthermore, additional steps may be included that are not shown. For example, the method and associated system may package any buffered un-accommodated data such that the packaged data may be easily added to a forth coming backhaul bulk request. The method and associated system may also monitor the portions of data within the buffered un-accommodated data to determine if any of that data has become "stale." Any stale data may be removed and the remaining data may be repackaged so it may be added to any forth coming backhaul bulk request.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for prioritized data handling in a communication system, the method comprising:
    receiving, at a wireless base station, first uplink data from a first user equipment (UE) and second uplink data from a second UE;
    receiving, at the wireless base station, a bulk grant from a communication node upstream of the wireless base station, the bulk grant identifying resources available to the wireless base station for transmitting data from the wireless base station to the communication node upstream of the wireless base station;
    grouping at least a first subset of the first uplink data and a first subset of the second uplink data into a combined package of data that may be accommodated by the resources available to the wireless base station for transmitting data from the wireless base station to the communication node upstream of the wireless base station; and
    sending the combined package of data from the wireless base station to the communication node upstream of the wireless base station.

2. The method of claim 1, further comprising grouping at least the first subset of the first uplink data and the first subset of the second uplink data into the combined package of data at least partially based on respective priorities of each of the first subset of the first uplink data and the first subset of the second uplink data.

3. The method of claim 1, wherein the first subset of the first uplink data has a higher priority than a second subset of the first uplink data that is not included in the combined package of data.

4. The method of claim 3, wherein the first subset of the second uplink data has a higher priority than a second subset of the second uplink data that is not included in the combined package of data.

5. The method of claim 1, wherein the resources available to wireless base station for transmitting data from the wireless base station to the communication node upstream of the wireless base station are insufficient to accommodate all of the first uplink data and all of the second uplink data.

6. The method of claim 1, further comprising, after receiving the bulk grant at wireless base station but before grouping at least the first subset of the first uplink data and the first subset of the second uplink data into the combined package of data, determining that the resources available to wireless base station for transmitting data from the wireless base station to the communication node upstream of the wireless base station are insufficient to accommodate all of the first uplink data and all of the second uplink data.

7. The method of claim 1, further comprising, sending, from the wireless access point to the communication node upstream of wireless base station, a bulk request for sufficient resources for transmitting at least the first uplink data and the second uplink data from the wireless base station to the communication node upstream of wireless base station.

8. The method of claim 1, further comprising, before receiving the first uplink data and the second uplink data at the wireless base station:
    sending a first grant from the wireless base station to the first UE for the first UE to send the first uplink data to the wireless base station; and
    sending a second grant from the wireless base station to the second UE for the second UE to send the second uplink data to the wireless base station.

9. The method of claim 1, wherein the communication node upstream of the wireless base station comprises a wireless communication network mobile core.

10. The method of claim 9, wherein the wireless base station is communicatively coupled to the wireless communication network mobile core at least partially via a backhaul system.

11. The method of claim 1, wherein the wireless base station is selected from the group consisting of a cellular wireless base station and a Wi-Fi wireless base station.

12. A method for prioritized data handling in a communication system, the method comprising:
    receiving, at a wireless base station, first uplink data from a first user equipment (UE) and second uplink data from a second UE;
    receiving, at the wireless base station, a bulk grant from a communication node upstream of the wireless base station, the bulk grant identifying resources available to wireless base station for transmitting data from the wireless base station to the communication node upstream of the wireless base station;
    determining that the resources available to wireless base station for transmitting data from the wireless base station to the communication node upstream of the wireless base station are sufficient to accommodate all of the first uplink data and all of the second uplink data;
    in response to determining that the resources available to wireless base station for transmitting data from the wireless base station to the communication node upstream of the wireless base station are sufficient to accommodate all of the first uplink data and all of the second uplink data, grouping all of the first uplink data and all of the second uplink data into a combined package of data; and sending the combined package of data from the wireless base station to the communication node upstream of the wireless base station.

13. The method of claim 12, wherein the first uplink data includes at least a first subset of the first uplink data and a second subset of the first uplink data, the first subset of the first uplink data having a higher priority than the second subset of the first uplink data.

14. The method of claim 12, further comprising, sending, from the wireless access point to the communication node upstream of wireless base station, a bulk request for sufficient resources for transmitting at least the first uplink data and the second uplink data from the wireless base station to the communication node upstream of wireless base station.

15. The method of claim 12, further comprising, before receiving the first uplink data and the second uplink data at the wireless base station:
sending a first grant from the wireless base station to the first UE for the first UE to send the first uplink data to the wireless base station; and
sending a second grant from the wireless base station to the second UE for the second UE to send the second uplink data to the wireless base station.

16. A wireless base station, comprising:
a priority module configured to:
receive first uplink data from a first user equipment (UE) and a second uplink data from a second UE,
receive a bulk grant from a communication node upstream of the wireless base station, the bulk grant identifying resources available to the wireless base station for transmitting data from the wireless base station to the communication node upstream of the wireless base station, and
group at least a first subset of the first uplink data and a first subset of the second uplink data into a combined package of data that may be accommodated by the resources available to the wireless base station for transmitting data from the wireless base station to the communication node upstream of the wireless base station; and
a transceiver configured to send the combined package of data from the wireless base station to the communication node upstream of the wireless base station.

17. The wireless base station of claim 16, wherein the wireless base station is one of a cellular wireless base station and a Wi-Fi wireless base station.

18. The wireless base station of claim 16, wherein the priority module is further configured to group at least the first subset of the first uplink data and the first subset of the second uplink data into the combined package of data at least partially based on respective priorities of each of the first subset of the first uplink data and the first subset of the second uplink data.

19. The wireless base station of claim 16, further comprising a memory configured to store at least each of the first uplink data and the second uplink data.

20. The wireless base station of claim 16, further comprising a bulk request module configured to generate a bulk request to the communication node upstream of the wireless base station for sufficient resources for transmitting at least the first uplink data and the second uplink data from the wireless base station to the communication node upstream of wireless base station.

* * * * *